United States Patent
Yi et al.

(10) Patent No.: US 12,335,601 B2
(45) Date of Patent: Jun. 17, 2025

(54) IMAGE CAPTURE METHOD, GRAPHIC USER INTERFACE, AND ELECTRONIC DEVICE

(71) Applicant: Honor Device Co., Ltd., Shenzhen (CN)

(72) Inventors: Jie Yi, Shenzhen (CN); Zuochao Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 50 days.

(21) Appl. No.: 18/025,726

(22) PCT Filed: May 10, 2022

(86) PCT No.: PCT/CN2022/091838
§ 371 (c)(1),
(2) Date: Mar. 10, 2023

(87) PCT Pub. No.: WO2022/262475
PCT Pub. Date: Dec. 22, 2022

(65) Prior Publication Data
US 2023/0353862 A1 Nov. 2, 2023

(30) Foreign Application Priority Data
Jun. 16, 2021 (CN) .......................... 202110669622.3

(51) Int. Cl.
*G06F 3/01* (2006.01)
*G06F 3/04845* (2022.01)
*H04N 23/63* (2023.01)

(52) U.S. Cl.
CPC .......... *H04N 23/632* (2023.01); *G06F 3/017* (2013.01); *G06F 3/04845* (2013.01); *G06F 2203/04803* (2013.01)

(58) Field of Classification Search
CPC .. H04N 23/632; H04N 5/2624; H04N 23/611; H04N 23/45; H04N 23/631; H04N 23/635; H04N 23/65; H04N 23/667; H04N 23/90; G06F 3/017; G06F 3/04845; G06F 2203/04803; G06F 1/1686; G06F 3/016
See application file for complete search history.

(56) References Cited

U.S. PATENT DOCUMENTS

| | | | |
|---|---|---|---|
| 9,584,718 B2 | 2/2017 | Lee et al. | |
| 10,057,483 B2 | 8/2018 | Her et al. | |
| 10,735,642 B1 * | 8/2020 | Manzari | ............... H04N 23/631 |
| 2012/0281129 A1 | 11/2012 | Wang et al. | |

(Continued)

FOREIGN PATENT DOCUMENTS

| | | |
|---|---|---|
| CN | 103227869 A | 7/2013 |
| CN | 106899765 A | 6/2017 |

(Continued)

*Primary Examiner* — Mekonnen D Dagnew
(74) *Attorney, Agent, or Firm* — Leydig, Voit & Mayer, Ltd.

(57) ABSTRACT

This application discloses an image capture method, a graphic user interface, and an electronic device. The image capture method can support a user in implementing switching between image capture modes such as single-lens image capture and multi-lens image capture through an air gesture without touching a display screen, so that user operations are convenient.

18 Claims, 36 Drawing Sheets

(56) References Cited

U.S. PATENT DOCUMENTS

| | | | |
|---|---|---|---|
| 2014/0192245 A1 | 7/2014 | Lee et al. | |
| 2014/0359651 A1* | 12/2014 | Lee | H04N 21/472 |
| | | | 725/25 |
| 2017/0013179 A1 | 1/2017 | Kang et al. | |
| 2020/0104581 A1 | 4/2020 | Lee et al. | |
| 2021/0247896 A1* | 8/2021 | Tanemura | G06F 3/0304 |
| 2022/0321795 A1 | 10/2022 | Jiang et al. | |

FOREIGN PATENT DOCUMENTS

| | | |
|---|---|---|
| CN | 107395969 A | 11/2017 |
| CN | 108111758 A | 6/2018 |
| CN | 108419016 A | 8/2018 |
| CN | 110209268 A | 9/2019 |
| CN | 110401766 A | 11/2019 |
| CN | 110798615 A | 2/2020 |
| CN | 111614891 A | 9/2020 |
| EP | 2908217 A1 | 8/2015 |
| EP | 3189407 B1 | 7/2020 |

\* cited by examiner

IMAGE CAPTURE METHOD, GRAPHIC USER INTERFACE, AND ELECTRONIC DEVICE

CROSS-REFERENCE TO RELATED APPLICATIONS

This application is a national stage of International Application No. PCT/CN2022/091838, filed on May 10, 2022, which claims priority to Chinese Patent Application No. 202110669622.3, filed on Jun. 16, 2021. The disclosures of both of the aforementioned applications are hereby incorporated by reference in their entireties.

TECHNICAL FIELD

This application relates to the field of terminals, and in particular, to an image capture method, a graphic user interface, and an electronic device.

BACKGROUND

With the development of electronic technologies, an electronic device such as a mobile phone or a tablet computer is generally configured with a plurality of cameras, for example, a front-facing camera, a rear-facing camera, and a wide-angle camera. To bring further image capture creation experience, more and more electronic devices can support a plurality of cameras to simultaneously perform image capture, to record wonderful moments, touching scenes, and other beautiful pictures.

SUMMARY

This application discloses an image capture method, a graphic interface, and a related apparatus. In this image capture method, an electronic device can support a user in implementing switching between image capture modes of the electronic device such as single-lens image capture and multi-lens image capture through an air gesture without touching a display screen, so that user operations are convenient.

According to a first aspect, this application provides an image capture method, applied to an electronic device including a display screen, a first camera, and a second camera. The method specifically includes the following steps: enabling, by the electronic device, the first camera: displaying, by the electronic device, a first image from the first camera in a first region of a preview interface of the display screen, where the first region is an entire region of the preview interface: detecting, by the electronic device, a first gesture inputted by a user without being in contact with the display screen, and enabling, by the electronic device, the second camera in response to the first gesture; and dividing, by the electronic device in response to the first gesture, the first region of the preview interface into a second region and a third region, displaying the first image from the first camera in the second region, and displaying a second image from the second camera in the third region, where the second region and the third region do not overlap.

By implementing the method provided in the first aspect, the electronic device can implement free switching between image capture modes such as single-lens image capture and multi-lens image capture through an air gesture, and does not need to implement switching between the image capture modes through an operation of touching a display screen, so that user operations are convenient.

With reference to the first aspect, in an implementation, the dividing, by the electronic device, the first region of the preview interface into a second region and a third region specifically includes: controlling, by the electronic device, a display region corresponding to the first camera in the preview interface to narrow from the first region to the second region, where a region other than the second region in the preview interface is the third region.

In this way, in a process of switching single-lens image capture to multi-lens image capture, the electronic device gradually narrows an image displayed in the preview interface before switching from an original entire region to a region in the preview interface, and gradually enlarges a display region of a newly added image after switching in the preview interface, so that a switching effect is smooth and conforms to visual experience of the user.

With reference to the first aspect, in an implementation, the first gesture is a gesture moving from a first side to a second side; and herein, a movement direction from the first side to the second side may be, for example, a movement direction from left to right or from right to left for the user. In the process of controlling, by the electronic device, a display region corresponding to the first camera in the preview interface to narrow from the first region to the second region, the electronic device may control, according to the movement direction of the first gesture, the second region to move in the direction from the first side to the second side, and control the third region to move in the direction from the first side to the second side.

In this way, in a process of switching single-lens image capture to multi-lens image capture, the electronic device can customize a corresponding switching effect according to a first air gesture inputted by the user, to meet individual needs of the user and conform to visual experience of the user.

With reference to the first aspect, in an implementation, the electronic device further includes a third camera; and the detecting, by the electronic device, a first gesture inputted by a user without being in contact with the display screen specifically includes: detecting, by the electronic device, the first gesture by using the third camera, where a frame rate of the third camera is lower than frame rates of the first camera and the second camera, or a quantity of pixels of the third camera is lower than quantities of pixels of the first camera and the second camera, or the third camera outputs an image whose colors are black and white. In this application, the third camera is a low-power-consumption camera.

In this way, the electronic device can acquire an image corresponding to an air gesture of the user by using the low-power-consumption camera, so that the electronic device recognizes the air gesture and then performs a corresponding operation, thereby reducing a function of the electronic device, and improving user experience.

With reference to the first aspect, in an implementation, after the displaying, by the electronic device, the first image from the first camera in the second region, and displaying a second image from the second camera in the third region, the method further includes: detecting, by the electronic device, a first operation: starting, by the electronic device in response to the first operation, to record a video, and displaying an image capture interface, where the image capture interface includes the first region and the second region: detecting, by the electronic device, a second operation; and finishing, by the electronic device in response to the second operation, recording the video, and generating a video file.

In this way, the electronic device can record, according to user operations, images acquired by a plurality of cameras in a multi-lens image capture mode as a video file.

With reference to the first aspect, in an implementation, before the detecting, by the electronic device, a first gesture inputted by a user without being in contact with the display screen, the method further includes: displaying, by the electronic device, first prompt information in the preview interface, where the first prompt information displays a hand image, and the hand image indicates the gesture moving from the first side to the second side.

In this way, in a process in which the user experiences photographing, the electronic device can display corresponding prompt information, to guide the user to input corresponding air gestures to experience different image capture modes, thereby improving user experience.

With reference to the first aspect, in an implementation, after the displaying, by the electronic device, the first image from the first camera in the second region, and displaying a second image from the second camera in the third region, the method further includes: detecting, by the electronic device, a second gesture inputted by the user without being in contact with the display screen: displaying, by the electronic device in response to the second gesture, the first image from the first camera in a fourth region of the preview interface, and displaying the second image from the second camera in a fifth region, where the fourth region is located in the fifth region.

In this way, in a multi-lens image capture state, for example, in a front-rear image capture state, the electronic device can switch the two images captured by the two cameras from an original left-right splicing form to a picture-in-picture display form, thereby meeting individual demands of the user, and improving user experience.

With reference to the first aspect, in an implementation, after the displaying, by the electronic device, the first image from the first camera in the first region, and displaying a second image from the second camera in the second region, the method further includes: detecting, by the electronic device, a third gesture inputted by the user without being in contact with the display screen; and stopping, by the electronic device in response to the third gesture, displaying the second image from the second camera, and displaying the first image from the first camera in the first region of the preview interface.

In this way, in a multi-lens image capture state, the electronic device can switch the electronic device to a single-lens image capture mode according to an air gesture inputted by the user, to meet individual demands of the user and simplify a switching operation, thereby improving user experience.

With reference to the first aspect, in an implementation, the electronic device further includes a fourth camera; and after the displaying, by the electronic device, the first image from the first camera in the second region, and displaying a second image from the second camera in the third region, the method further includes: detecting, by the electronic device, a fourth gesture inputted by the user without being in contact with the display screen: enabling, by the electronic device, the fourth camera; and switching, by the electronic device, the second image from the second camera displayed in the third region to a third image from the fourth camera.

In this way, in a multi-lens image capture state, the electronic device can switch, according to an air gesture inputted by the user, one camera in a plurality of cameras in a multi-lens mode to another new camera for work, and display an image acquired by the newly added working camera in the preview interface, to meet individual demands of the user and simplify a switching operation, thereby improving user experience.

With reference to the first aspect, in an implementation, before the enabling, by the electronic device, the first camera, the method further includes: displaying, by the electronic device, a fourth image from a fifth camera in the first region of the preview interface; and detecting, by the electronic device, a fourth gesture inputted by the user, and stopping, by the electronic device, displaying the fourth image in the first region of the preview interface.

In this way, in a single-lens image capture state, the electronic device can switch, according to an air gesture inputted by the user, a working camera in a single-lens mode to another new camera for work, for example, switch a front-facing camera to a rear-facing camera, to meet individual demands of the user and simplify a switching operation, thereby improving user experience.

According to a second aspect, this application provides an electronic device. The electronic device includes: a display screen, M cameras, one or more processors, and one or more memories, where M≥2, and M is a positive integer; and the one or more memories are coupled to the one or more processors, the one or more memories are configured to store computer program code, the computer program code includes computer instructions, and when the one or more processors execute the computer instructions, the electronic device is enabled to perform the method described in the implementations of the first aspect.

In this way, the electronic device can implement free switching between image capture modes such as single-lens image capture and multi-lens image capture through an air gesture, and does not need to implement switching between the image capture modes through an operation of touching the display screen, so that user operations are convenient.

According to a third aspect, this application provides a computer program product including instructions, and the computer program product, when run on an electronic device, enables the electronic device to perform the method described in the implementations of the first aspect.

In this way, when the computer program product is run on the electronic device, the electronic device can implement free switching between image capture modes such as single-lens image capture and multi-lens image capture through an air gesture, and does not need to implement switching between the image capture modes through an operation of touching a display screen, so that user operations are convenient.

According to a fourth aspect, this application provides a computer-readable storage medium including instructions, and the instructions, when run on an electronic device, enable the electronic device to perform the method described in the implementations of the first aspect.

In this way, when the instructions are run on the electronic device, the electronic device can implement free switching between image capture modes such as single-lens image capture and multi-lens image capture through an air gesture, and does not need to implement switching between the image capture modes through an operation of touching a display screen, so that user operations are convenient.

DESCRIPTION OF EMBODIMENTS

Figure 1A:
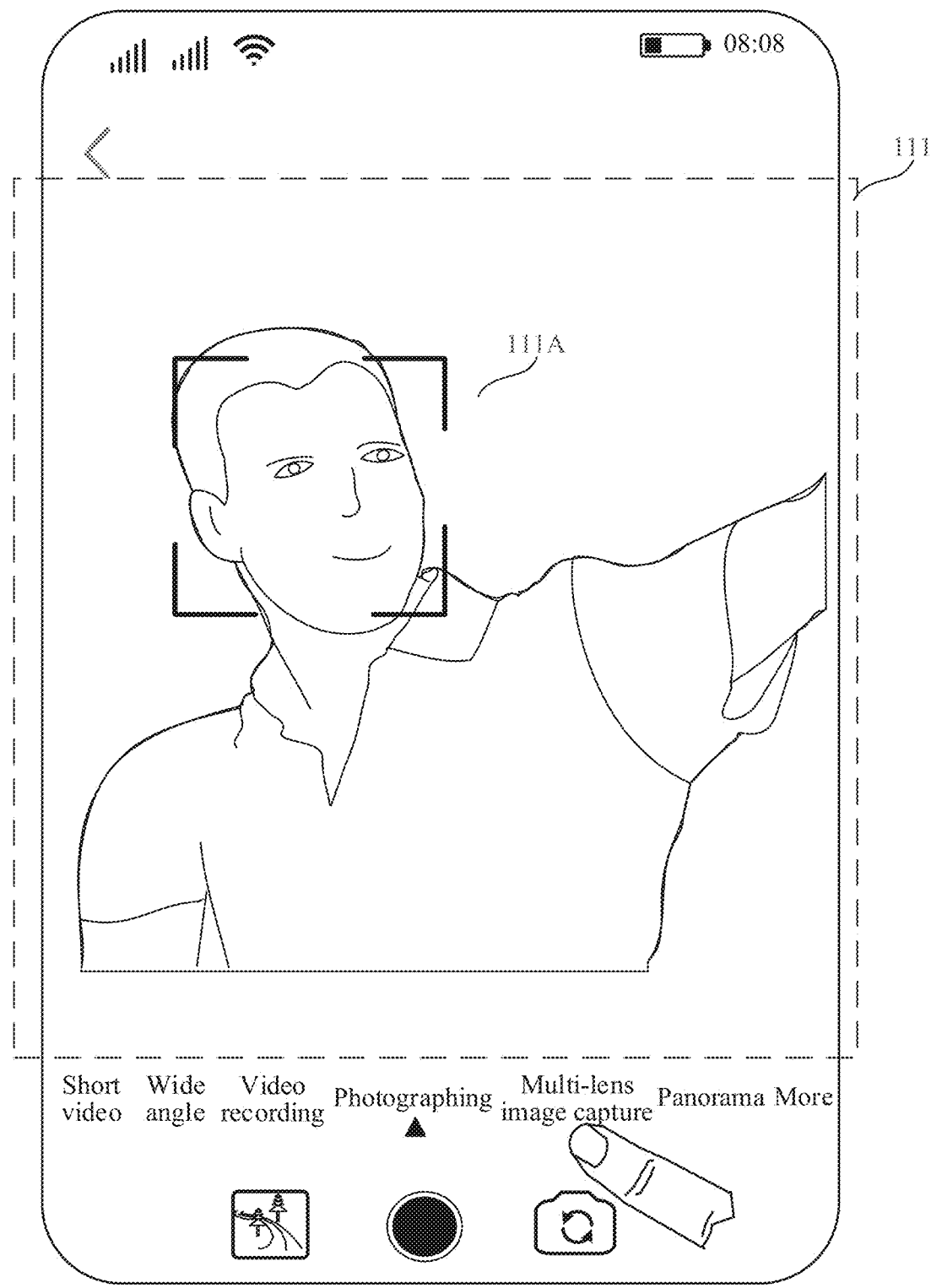
FIG. 1A and FIG. 1B are schematic diagrams of a group of user interfaces according to an embodiment of this application.

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be understood that, "/" indicates or. For example, A/B may indicate A or B. The term "and/or" in this specification describes only an association relationship for describing associated objects and represents that three relationships may exist. For example, A and/or B may represent the following three cases: only A exists, both A and B exist, and only B exists.

The following clearly and thoroughly describes technical solutions in embodiments of this application with reference to the accompanying drawings.

"Embodiment" mentioned in this application means that particular features, structures, or characteristics described with reference to the embodiment may be included in at least one embodiment of this application. The term appearing at different locations of the specification may not refer to the same embodiment or an independent or alternative embodiment that is mutually exclusive with another embodiment. A person skilled in the art explicitly or implicitly understands that the embodiments described in this application may be combined with other embodiments.

In the following embodiments of this application, terms "first" and "second" are used merely for the purpose of description, and shall not be construed as indicating or implying relative importance or implying a quantity of indicated technical features. Therefore, a feature defined to be "first" or "second" may explicitly or implicitly include one or more features. In the description of the embodiments of this application, unless otherwise stated, "a plurality of" means two or more.

A term "user interface (UI)" in the following embodiments of this application is a medium interface for interaction and information exchange between an application or operating system and a user, and implements the conversion between an internal form of information and a form of the information acceptable to the user. The user interface is source code written in a specific computer language such as java and the extensible markup language (XML). The interface source code is parsed and rendered on an electronic device, and is finally presented as content that can be recognized by the user. A commonly used form of the user interface is a graphical user interface (GUI), which refers to a user interface that is related to computer operations and that is displayed in a graphic manner. The graphic user interface may be visible interface elements such as text, icons, buttons, menus, tabs, text boxes, dialog boxes, status bars, navigation bars, and Widgets that are displayed on a display screen of the electronic device.

In some implementations, the electronic device may provide a multi-lens image capture function for the user. However, when the user switches single-lens image capture/multi-lens image capture to multi-lens image capture/single-lens image capture, the user needs to click a specific control in a camera to implement switching of the foregoing image capture modes.

In the embodiments of this application, the foregoing single-lens image capture mode is also a common photographing mode for users, and includes front-facing camera image capture or rear-facing camera image capture. Multi-lens image capture is also a common dual-view image capture mode for the users, for example, a front-rear image capture mode. Alternatively, when the electronic device has a plurality of cameras, multi-lens image capture may also include a rear-rear image capture mode, a front-rear image capture mode, or the like. An image capture mode included in the multi-lens image capture is not limited in the embodiments of this application. If there is no special description, an example in which multi-lens image capture is front-rear image capture is used for introduction in the following embodiments.

Figure 1B:
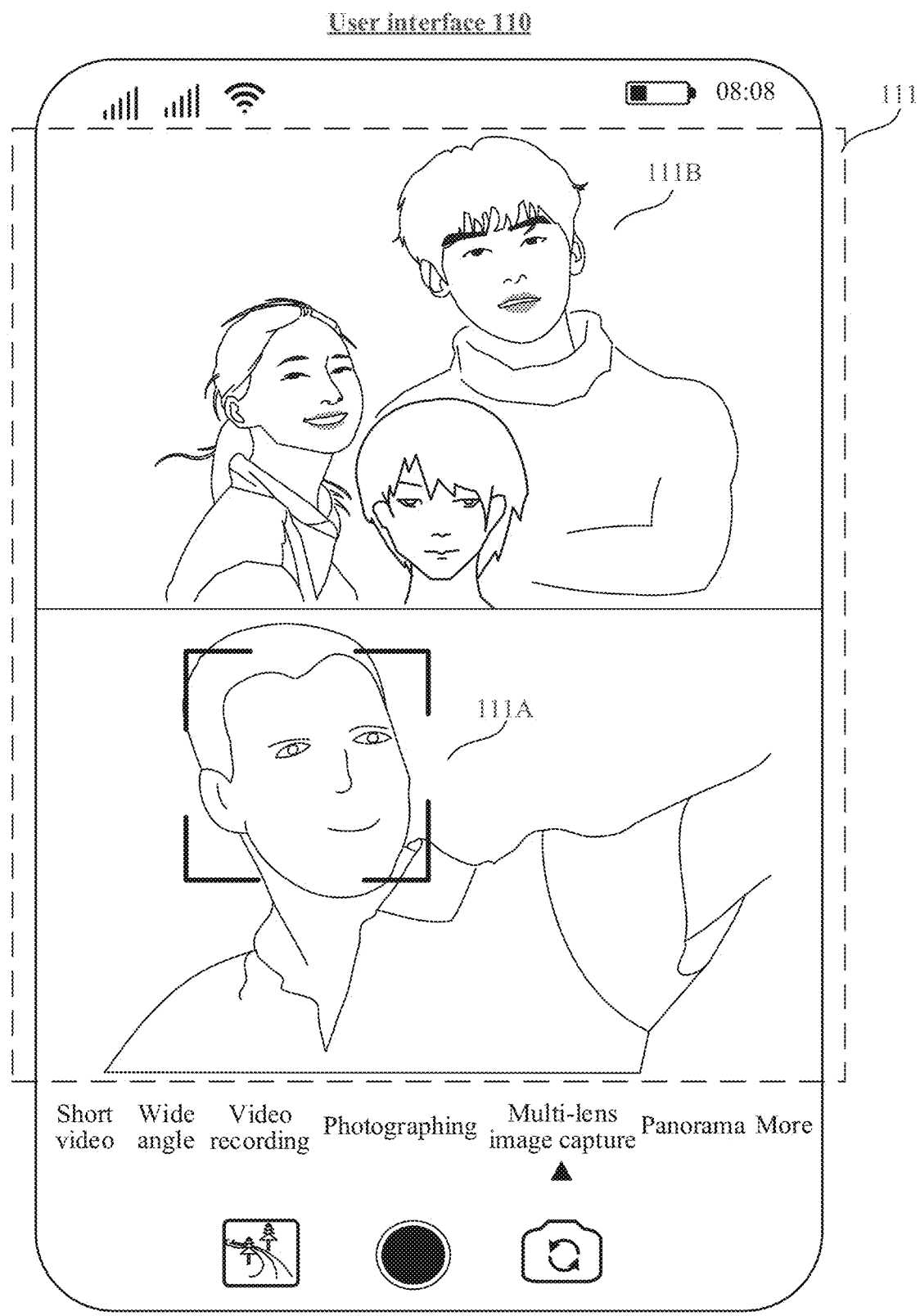

FIG. 1A and FIG. 1B exemplarily show an operation for which an electronic device switches from single-lens image capture to multi-lens image capture.

As shown in FIG. 1A, a user interface 110 is provided by a camera installed in the electronic device, where a preview box 111 in the user interface 110 displays an image 111A captured by a front-facing camera of the electronic device by default. In this case, the camera of the electronic device is in single-lens image capture, and is specifically in front-facing camera image capture.

When the electronic device detects that a user clicks a multi-lens image capture control shown in FIG. 1A, the camera switches from single-lens image capture to multi-lens image capture shown in FIG. 1B, and specifically, to front-rear double-lens image capture.

As shown in FIG. 1B, the preview box 111 displayed in the user interface 110 simultaneously displays the image 111A captured by the front-facing camera and an image 111B captured by a rear-facing camera.

It can be seen that, in a process in which the foregoing electronic device performs single-lens image capture, the electronic device needs to receive a touch operation that is acted on the multi-lens image capture control on a display screen and that is inputted by the user, so that single-lens image capture can be switched to multi-lens image capture. However, when the user holds a selfie stick and is inconvenient to click the display screen, or the electronic device is far away from the user, or fingers of the user are water-stained and are inconvenient to touch the display screen, switching between single-lens image capture and multi-lens image capture cannot be implemented.

To resolve the foregoing problems, an embodiment of this application provides an image capture method. The image capture method can support a user in implementing switching between image capture modes of the electronic device such as single-lens image capture and multi-lens image capture through an air gesture without touching a display screen, so that user operations are convenient.

The image capture method provided in this embodiment of this application may be applied to an electronic device including a plurality of cameras. The electronic device may recognize an air gesture of the user by using any camera in front-facing cameras. An air gesture for switching an image capture mode is not limited in this embodiment of this application. The foregoing air gesture is only a name used in this embodiment of this application, may also be referred to as a hanging gesture, a hover gesture, or the like, and specifically refers to a gesture that is inputted without touching the electronic device. A meaning of the gesture has been described in this embodiment of this application, and the name thereof does not constitute any limitation to this embodiment.

In a single-lens image capture mode, the foregoing electronic device only displays an image captured by one camera in a preview box (also referred to as a view finder box) of the display screen.

The foregoing single-lens image capture may include single-lens video recording and single-lens photographing, that is, when the electronic device is in the single-lens image capture mode, the electronic device may perform single-lens video recording and single-lens photographing. Single-lens video recording means that a camera of the electronic device, for example, a front-facing camera or a rear-facing camera records a video. In a single-lens video recording mode, in the preview box or in a video recording process or in a process of playing a recorded video, the display screen may only display a plurality of frames of images captured by the foregoing one camera in a same interface. Single-lens photographing means that a camera of the electronic device, for example, a front-facing camera or a rear-facing camera captures an image. In a single-lens photographing mode, the display screen may only display a plurality of frames of images captured by one camera in the preview box, and during photographing or in a process of viewing captured photos, the display screen may only display an image captured by one camera in a same interface.

In a multi-lens image capture mode, the display screen displays images respectively captured by a plurality of cameras in the preview box, and images captured by different cameras may be displayed in a splicing manner or in a picture-in-picture manner.

The foregoing multi-lens image capture may include multi-lens video recording and multi-lens photographing, that is, when the electronic device is in the multi-lens image capture mode, the electronic device may perform multi-lens video recording and multi-lens photographing. Multi-lens video recording means that the plurality of cameras in the electronic device, for example, a front-facing camera and a rear-facing camera simultaneously record a plurality of videos. In a multi-lens video recording mode, in the preview box or in a video recording process or in a process of playing a recorded video, the display screen may display a plurality of frames of images respectively captured by the plurality of cameras in a same interface. The images respectively captured by the plurality of cameras may be displayed in the same interface in the splicing manner or in the picture-in-picture manner. Multi-lens photographing means that the plurality of cameras in the electronic device, for example, a front-facing camera and a rear-facing camera may simultaneously capture a plurality of images. In a multi-lens photographing mode, the display screen may display a plurality of frames of images respectively captured by the plurality of cameras in the preview box, and the plurality of frames of images may be displayed in the splicing manner or in the picture-in-picture manner. During photographing or in a process of viewing captured photos, the display screen may only display the plurality of images captured by the plurality of cameras in a same interface, and the plurality of images may be displayed in the splicing manner or in the picture-in-picture manner.

When the electronic device recognizes a specific air gesture, an original image obtained by one camera/original images respectively obtained by a plurality of cameras may be switched to the images respectively obtained by the plurality of cameras/the image obtained by the one camera to be displayed in the preview box. The image obtained by the one camera may be an image obtained by a front-facing camera of the electronic device or a rear-facing camera of the electronic device; and the images respectively obtained by the plurality of cameras may include an image obtained by a front-facing camera and images obtained by any quantity of scene cameras in rear-facing cameras.

In this embodiment of this application, the foregoing "single-lens image capture". "multi-lens image capture", "single-lens video recording", "single-lens photographing", "multi-lens video recording", and "multi-lens photographing" are only some names used in this embodiment of this application. Meanings of the names have been described in this embodiment of this application, and the names thereof do not constitute any limitation to this embodiment.

It can be seen from the foregoing image capture method that, the user can switch an image capture mode of the electronic device through an air gesture, so that an image displayed in the preview box can be switched between an image captured by one camera and images captured by a plurality of cameras. Especially for a scene in which a camera such as a front-facing camera is used to perform image capture, a user generally stretches out his arm or uses a selfie stick to perform image capture. In this case, when the user intends to switch to front-rear multi-lens image capture and capture himself and others or himself and a scenery simultaneously to record beautiful moments, the image capture method provided in this embodiment of this application is implemented, so that the user does not need to adjust an image capture mode of an electronic device by repeatedly bringing the electronic device close and touching a screen of the electronic device with a finger, so that the user can conveniently switch the image capture mode through an air gesture, so that an image displayed in a preview box changes from an original image captured by a front-facing camera to an image including images simultaneously captured by a front-facing camera and a rear-facing camera.

To introduce the image capture method provided in this embodiment of this application in more clear and detailed manner, an electronic device involved in implementing the method provided in this embodiment of this application is introduced below first.

The electronic device may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, an in-vehicle device, or a smart home device and/or a smart city device. A specific type of the electronic device is not specifically limited in this embodiment of this application.

Figure 2A:
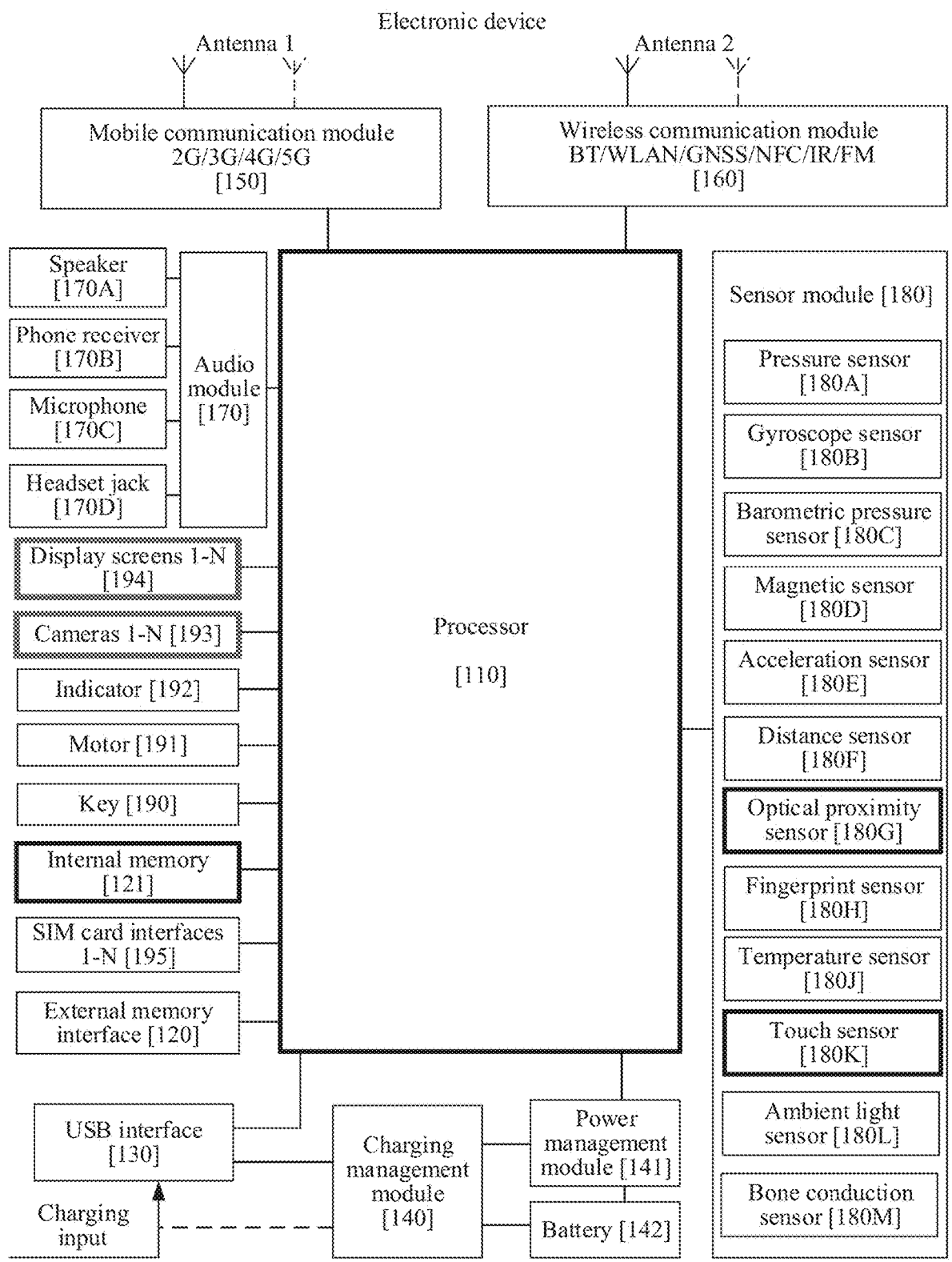
FIG. 2A and FIG. 2B are diagrams of software and hardware architectures of an electronic device according to an embodiment of this application.

FIG. 2A exemplarily shows a schematic structural diagram of hardware of an electronic device.

As shown in FIG. 2A, the electronic device may have a plurality of cameras 193, for example, a front-facing ordinary camera, a front-facing low-power-consumption camera, a rear-facing ordinary camera, a rear-facing wide-angle camera, and the like. The electronic device may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present disclosure does not constitute a specific limitation on the electronic device. In some other embodiments of this application, the electronic device may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors. The controller may generate an operation control signal according to instruction operation code and a time-sequence signal, to implement control of fetching an instruction and executing the instruction.

The processor 110 may be further configured with a memory, to store an instruction and data. In some embodiments, the memory in the processor 110 is a cache memory. The memory may store an instruction or data that is just used or used cyclically by the processor 110. If the processor 110 needs to use the instruction or the data again, the processor 110 may directly invoke the instruction or the data from the memory, which avoids repeated access, and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. It may be understood that an interface connection relationship between the modules illustrated in this embodiment of the present disclosure is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

In this embodiment of this application, the processor 110 may receive a plurality of consecutive images that correspond to a specific air gesture inputted by the user such as a "palm" and that are captured by a camera, then the processor 110 may perform a comparative analysis on the plurality of consecutive images, to determine that the air gesture corresponding to the plurality of consecutive images is the "palm", and determine that an operation corresponding to the air gesture is, for example, switching an image capture mode from original single-lens image capture to multi-lens image capture, and then the processor 110 may control a camera application to perform corresponding operations. The corresponding operations may include: for example, mobilizing a plurality of cameras to simultaneously acquire images, then compositing the images acquired by the plurality of cameras through a GPU in a splicing or picture-in-picture (partial superimposition) manner or the like, and invoking the display screen 194 to display a composite image in a preview box of the electronic device.

The external memory interface 120 may be configured to connect to an external non-volatile memory, to expand a storage capability of the electronic device. The external non-volatile memory communicates with the processor 110 through the external memory interface 120, to implement a data storage function, for example, storing a file such as a music or a video in the external non-volatile memory.

The internal memory 121 may be one or more random access memories (RAMs), and one or more non-volatile memories (NVMs). The random access memory may be directly read and written by the processor 110, may be configured to store executable programs (such as machine instructions) of an operating system or another running program, and may also be configured to store data of users and applications. The non-volatile memory may also store the executable programs, the data of the users and the applications, and the like, and may be loaded into the random access memory in advance, to be directly read and written by the processor 110.

The random access memory may include a static random access memory (SRAM), a dynamic random access memory (DRAM), a synchronous dynamic random access memory (SDRAM), a double data rate synchronous dynamic random access memory (DDR SDRAM, such as a $5^{th}$ generation DDR SDRAM generally referred to as DDR5 SDRAM), or the like.

The non-volatile memory may include a disk storage device and a flash memory. According to an operating principle, the flash memory may be divided into NOR FLASH, NAND FLASH, 3D NAND FLASH, and the like:

according to potential orders of storage cells, the flash memory may be divided into a single-level storage cell (single-level cell, SLC), a multi-level storage cell (multi-level cell, MLC), a triple-level cell (TLC), a quad-level cell (QLC), and the like; and according to storage specifications, the flash memory may be divided into a universal flash storage (UFS), an embedded multi media memory card (eMMC), and the like.

In this embodiment of this application, the internal memory 121 may store picture files captured by the electronic device or video files recorded by the electronic device in a single-lens image capture or multi-lens image capture mode, or the like.

The charging management module 140 is configured to receive a charging input from a charger. The charger may be a wireless charger or a wired charger. In some embodiments of wired charging, the charging management module 140 may receive charging input of the wired charger through the USB interface 130. In some embodiments of wireless charging, the charging management module 140 may receive a wireless charging input by using a wireless charging coil of the electronic device. The charging management module 140 may further supply power to the electronic device by using the power management module 141 while charging the battery 142.

The power management module 141 is configured to be connected to the battery 142, the charging management module 140, and the processor 110. The power management module 141 receives input of the battery 142 and/or the charging management module 140, and supplies power for the processor 110, the internal memory 121, the display screen 194, the camera 193, the wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may also be multiplexed to improve utilization of the antennas. For example, the antenna 1 may be multiplexed into a diversity antenna of a wireless local area network. In some other embodiments, the antenna may be used in combination with a tuning switch.

The mobile communication module 150 may provide a solution to wireless communication such as 2G/3G/4G/5G applied to the electronic device. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and is then transferred to the application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150) or another function module.

The wireless communication module 160 may provide a solution for wireless communication including a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like to be applied to the electronic device. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, in the electronic device, the antenna 1 is coupled to the mobile communication module 150, and the antenna 2 is coupled to the wireless communication module 160, so that the electronic device may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The electronic device may implement an audio function, for example, music playback or recording, by using the audio module 170, the speaker 170A, the phone receiver 170B, the microphone 170C, the headset jack 170D, the application processor, and the like. The audio module 170 is configured to convert digital audio information into an analog audio signal output, and is further configured to convert an analog audio input into a digital audio signal. The audio module 170 may be further configured to encode and decode an audio signal.

In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device may be used to listen to music or answer a call in a hands-free mode by using the speaker 170A.

The phone receiver 170B, also referred to as a "receiver", is configured to convert an audio electrical signal into a sound signal. When the electronic device is configured to answer a call or receive voice information, the phone receiver 170B may be put close to a human ear to receive a voice.

The microphone 170C, also referred to as a "mic" and a "mike", is configured to convert a sound signal into an electrical signal. When making a call or sending voice information, a user can make a sound near the microphone 170C through the mouth of the user to input a sound signal to the microphone 170C. At least one microphone 170C may be disposed in the electronic device. In some other embodiments, two microphones 170C may be disposed in the electronic device, to acquire a sound signal and implement a noise reduction function. In some other embodiments, three, four, or more microphones 170C may be alternatively disposed in the electronic device, to acquire a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (OMTP) standard interface, or cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The electronic device determines pressure strength according to a change in the capacitance. When a touch operation is acted on the display screen 194, the electronic device detects strength of the touch operation by using the pressure sensor 180A. The electronic device may further calculate a location of the touch according to a detection signal of the pressure sensor 180A. In some embodiments, the touch operations that are acted at a same touch location but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device. In some embodiments, an angular velocity of the electronic device around three axes (namely, x, y, and z axes) may be determined by using the gyroscope sensor 180B. The gyroscope sensor 180B may be used for image stabilization in image capture. For example, when the shutter is pressed, the gyroscope sensor 180B detects an angle at which the electronic device jitters, and calculates, based on the angle, a distance for which a lens module needs to compensate, and allows the lens to cancel the jitter of the electronic device through reverse motion, thereby implementing image stabilization. The gyroscope sensor 180B may also be used in navigation and a motion sensing game scene.

The barometric pressure sensor 180C is configured to measure barometric pressure. In some embodiments, the electronic device calculates an altitude by using a barometric pressure value measured by the barometric pressure sensor 180C, to assist in positioning and navigation.

The magnetic sensor 180D includes a Hall sensor. The electronic device may detect an opening state or a closing state of a flip leather case by using the magnetic sensor 180D. In some embodiments, when the electronic device is a clamshell phone, the electronic device may detect an opening state or a closing state of a flip cover according to the magnetic sensor 180D. Further, according to a detected opening or closing state of the leather case or a detected opening or closing state of the flip cover, a feature such as automatic unlocking of the flip cover is set.

The acceleration sensor 180E may detect an acceleration value of the electronic device in each direction (generally in three axes). When the electronic device is stationary, a magnitude and a direction of a gravity may be detected. The acceleration sensor may be further configured to recognize a posture of the electronic device, and is applied to an application such as switching between landscape orientation and portrait orientation or a pedometer.

The distance sensor 180F is configured to measure a distance. The electronic device may measure a distance through infrared or laser. In some embodiments, in an image capture scene, the electronic device may measure a distance by using the distance sensor 180F, to implement quick focusing.

The optical proximity sensor 180G may include, for example, a light-emitting diode (LED) and an optical detector such as a photodiode. The light-emitting diode may be an infrared light emitting diode. The electronic device may emit infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that a user holds the electronic device close to an ear for a call, so that automatic screen-off is implemented to achieve power saving. The optical proximity sensor 180G may also be used in a smart cover mode or a pocket mode to automatically unlock or lock the screen.

The ambient light sensor 180L is configured to perceive ambient light brightness. The electronic device may adaptively adjust a luminance of the display screen 194 according to the perceived brightness of the ambient light. The ambient light sensor 180L may also be configured to automatically adjust white balance during photographing. The ambient light sensor 180L may further cooperate with the optical proximity sensor 180G to detect whether the electronic device is in a pocket, so as to prevent an accidental touch.

The fingerprint sensor 180H is configured to acquire a fingerprint. The electronic device may implement fingerprint unlock, application lock accessing, fingerprint photographing, fingerprint-based call answering, and the like by using a feature of the acquired fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to prevent the low temperature from causing the electronic device to shut down abnormally. In some other embodiments, when the temperature is lower than still another threshold, the electronic device boosts an output voltage of the battery 142, to avoid an abnormal shutdown caused by a low temperature.

The touch sensor 180K is also referred to as a "touch device". The touch sensor 180K may be disposed on the display screen 194. The touch sensor 180K and the display screen 194 form a touchscreen, which is also referred to as a "touch control screen". The touch sensor 180K is configured to detect a touch operation on or near the touch sensor 180K. The touch sensor may transmit the detected touch operation to the application processor, to determine a touch event type. Visual output related to the touch operation may be provided by using the display screen 194. In some other embodiments, the touch sensor 180K may alternatively be disposed on a surface of the electronic device, and is located on a location different from that of the display screen 194.

In this embodiment of this application, the touch sensor 180K may detect a touch operation acted by a user on a location in which an icon of a camera application is located, and transmit information about the touch operation to the processor 110, and the processor analyzes a function corresponding to the touch operation, for example, opening the camera application.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may be alternatively disposed in a headset, to form a bone conduction headset. The audio module 170 may parse out a voice signal based on the vibration signal of a vibration bone block of the vocal-cord part that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power button, a volume button, and the like. The key 190 may be a mechanical key, or a touch-type key. The electronic device may receive a key input, and generate a button signal input related to user setting and function control of the electronic device.

The motor 191 may generate a vibration prompt. The motor 191 may be used for an incoming call vibration prompt and a touch vibration feedback. For example, touch operations performed on different applications (for example, photographing and audio playback) may correspond to different vibration feedback effects. For touch operations acted on different regions of the display screen 194, the motor 191 may also correspond to different vibration feedback effects. Different application scenes (for example, a time prompt, information receiving, an alarm clock, and a game) may also correspond to different vibration feedback effects. Customization of a touch vibration feedback effect may also be supported.

The indicator 192 may be an indicator light, may be configured to indicate a charging state and a battery change, and may be further configured to indicate a message, a missed call, a notification, and the like.

The electronic device may implement an image capture function by using the camera 193, the ISP, the video codec, the GPU, the display screen 194, the application processor, and the like.

The camera 193 is configured to acquire an image. Specifically, an optical image of an object is generated through a lens and is projected to a photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as RGB or YUV.

In this embodiment of this application, a quantity of cameras 193 may be M, M≥2, and M is a positive integer. A quantity of cameras enabled by the electronic device in multi-lens image capture may be N, 2≤N≤M, and N is a positive integer.

In this embodiment of this application, types of the cameras 193 may be distinguished according to hardware configurations and physical locations. For example, a plurality of cameras included in the camera 193 may be respectively placed on front and rear surfaces of the electronic device, a camera disposed on a surface of the display screen 194 of the electronic device may be referred to as a front-facing camera, and a camera disposed on a surface of a rear cover of the electronic device may be referred to as a rear-facing camera. In another example, a plurality of cameras included in the camera 193 have different focal lengths and viewing angles, a camera with a short focal length and a larger viewing angle may be referred to as a wide-angle camera, and a camera with a long focal length and a smaller viewing angle may be referred to as an ordinary camera. Differences of content of images acquired by different cameras lie in that: the front-facing camera is configured to acquire a scenery facing the front surface of the electronic device, while the rear-facing camera is configured to acquire a scenery facing the back surface of the electronic device; and the wide-angle camera can capture a larger area of scene within a shorter image capture distance range, and at a same image capture distance, an image in a picture captured by the wide-angle camera is smaller than an image in a picture captured by an ordinary lens. A length of a focal length and a size of a viewing angle are relative concepts, and there are no specific parameter limitations. Therefore, the wide-angle camera and the ordinary camera are also relative concepts, and can be specifically distinguished according to physical parameters such as the focal length and the viewing angle.

Particularly, in this embodiment of this application, the camera 193 includes at least one camera that may obtain 3D data of an object in a captured image, so that the processor 110 can recognize an operation instruction corresponding to an air gesture of the user according to the 3D data of the object.

The camera configured to obtain the 3D data of the object may be an independent low-power-consumption camera, or may be another ordinary front-facing camera or rear-facing camera, and the ordinary front-facing camera or rear-facing camera supports a low-power-consumption mode. When the low-power-consumption camera works or the ordinary front-facing camera or rear-facing camera works in the low-power-consumption mode, a frame rate of the camera is lower than a frame rate of the ordinary camera that works in a non-low-power-consumption mode, and an outputted image is in a format of black and white. Generally, the ordinary camera may output 30 frames of images, 60 frames of images, 90 frames of images, and 240) frames of images in 1 second. However, when the low-power-consumption camera or the ordinary front-facing camera or rear-facing camera runs in the low-power-consumption mode, the camera may output, for example, 2.5 frames of images in 1 second, and when the camera captures a first image representing a same air gesture, the foregoing camera may switch to output 10 frames of images in 1 second, so as to accurately recognize an operation instruction corresponding to the air gesture through a plurality of consecutive images. In addition, a quantity of pixels of an image acquired by the low-power-consumption camera is lower than a quantity of pixels of an image acquired by the ordinary camera. In addition, the low-power-consumption camera reduces power consumption compared with the ordinary camera when working in the low-power-consumption mode.

An output ratio of the camera 193 may be different or the same. An output ratio of a camera refers to a ratio of a length of an image acquired by the camera to a width thereof. Both the length and the width of the image may be measured in a quantity of pixels. The output ratio of the camera may also be referred to as an output size, an image scale, an image size, a pixel size, or an image resolution. An output ratio of a common camera may include: 4:3, 16:9, 3:2, or the like. The output ratio refers an approximate ratio of quantities of pixels in the length and the width of the image acquired by the camera. In this embodiment of this application, when the electronic device is in the multi-lens image capture mode, when images respectively acquired by a plurality of cameras are displayed in a left-right splicing or up-down splicing form, sizes of the images captured by different cameras displayed in a preview box may be the same; and when the images respectively acquired by the plurality of cameras are displayed in a picture-in-picture form, the sizes of the images captured by different cameras displayed in the preview box may be different. A specific size of an image captured by a front-facing camera is less than a size of an image captured by a rear-facing camera. For details, reference may be made to related descriptions of the following UI embodiments. Details are not described herein again.

In some embodiments, the camera 193 may be configured to acquire depth data. For example, the camera 193 may have a time of flight (TOF) 3D sensing module or a structured light 3D sensing module, to obtain depth information. The camera configured to acquire the depth data may be a front-facing camera, or may be a rear-facing camera.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further optimize an algorithm for noise, brightness, and complexion of an image. The ISP may further optimize parameters such as exposure and a color temperature of a photographing scene. In some embodiments, the ISP may be disposed in the camera 193.

The digital signal processor is configured to process a digital signal, and may further process another digital signal in addition to a digital image signal. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (MPEG) 1, MPEG 2, MPEG 3, and MPEG 4.

The NPU is a neural-network (NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The electronic device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, or the like. The display screen 194 includes a display panel. The display panel may use a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), and the like. In some embodiments, the electronic device may include one or N display screens 194, and N is a positive integer greater than 1.

In this embodiment of this application, the display screen 194 may be configured to display an image captured by any camera 193, for example, display a plurality of frames of images captured by a camera in the preview box, or display a plurality of frames of images from a camera 193 in a saved video file, or display a photo from a camera 193 in a saved picture file.

When the electronic device displays a plurality of frames of images captured by a camera in the preview box of the camera and receives a specific air gesture inputted by the user such as a "palm", the display screen 194 may display a plurality of frames of images captured by a plurality of cameras in the preview box. After the electronic device saves a video file or a picture file captured by the plurality of cameras, the display screen may display a plurality of frames of images from a plurality of cameras 193 in the saved video file, or display a photo composited by a plurality of photos from the plurality of cameras 193 in the saved picture file.

In some embodiments, in the multi-lens image capture mode, the display screen 194 may display the plurality of images from the plurality of cameras 193 in a splicing or picture-in-picture manner or the like, so that the plurality of images from the plurality of cameras 193 can be simultaneously present to the user.

In some embodiments, in the multi-lens image capture mode, the processor 110 (such as the controller or the GPU) may composite the plurality of frames of images from the plurality of cameras 193. For example, a plurality of video streams from the plurality of cameras 193 are composited into a video stream, and the video codec in the processor 110 may encode data of the composite video stream, to generate a video file. In this way, each frame of image in the video file may include a plurality of images from the plurality of cameras 193. When a frame of image of the video file is played, the display screen 194 may display the plurality of images from the plurality of camera 193, to present a plurality of image pictures with different ranges, different resolutions, or different detailed information at a same moment or in a same scene to the user.

In some embodiments, in the multi-lens image capture mode, the processor 110 may correlate image frames from different cameras 193, so that when a captured picture or video is played, the display screen 194 can simultaneously display the correlated image frames in a viewfinder box. In this case, videos simultaneously recorded by different cameras 193 may be stored as different videos respectively, and pictures simultaneously recorded by different cameras 193 may be stored as different pictures respectively.

In some embodiments, in a multi-channel video recording mode, the plurality of cameras 193 may respectively acquire images at a same frame rate, that is, the plurality of cameras 193 acquire a same quantity of image frames within a same time. Videos from different cameras 193 may be stored as different video files respectively, and the different video files are correlated. The image frames are stored in the video file according to a sequence of which the image frames are acquired, and the different video files include a same quantity of image frames. When a recorded video is played, the display screen 194 may display, according to a preset or user-instructed layout mode, image frames according to a sequence of the image frames included in correlated video files, so that a plurality of frames of images corresponding to a same sequence in different video files are displayed in a same interface.

In some embodiments, in a multi-channel video recording mode, the plurality of cameras 193 may respectively acquire images at a same frame rate, that is, the plurality of cameras 193 acquire a same quantity of image frames within a same time. The processor 110 may add a time stamp to each frame of image from different cameras 193, so that when the recorded video is played, the display screen 194 can simultaneously display the plurality of frames of images from the plurality of cameras 193 in the same interface according to the time stamp.

In some embodiments, in a multi-lens image capture scene, the display screen 194 may simultaneously display different images from the plurality of cameras 193 in a left-right splicing, up-down splicing, or picture-in-picture manner or the like, so that different images from the plurality of cameras 193 can be simultaneously present to the user. For details, reference may be made to related descriptions of the following UI embodiments. Details are not described herein again.

In some embodiments, in the multi-lens image capture mode, the processor 110 such as the controller or the GPU, may composite different images from the plurality of cameras 193. For example, a plurality of video streams from the plurality of cameras 193 are composited into one video stream, and the video codec in the processor 110 may encode data of the composite video stream, to generate a video file. In this way, each frame of image in the video file may include a plurality of images from the plurality of cameras 193. When a frame of image of the video file is played, the display screen 194 may display the plurality of images from the plurality of cameras 193, to present a plurality of image pictures with different content, different depths, or different pixel quantities at a same moment or in a same scene to the user. In another example, a plurality of photos from the plurality of cameras 193 are composited into one photo, and the video codec in the processor 110 may encode data of the composited photo, to generate a picture file. In this way, a photo in the picture file may include the plurality of photos from the plurality of cameras 193. When the photo is viewed, the display screen 194 may display the plurality of photos from the plurality of cameras 193, to present a plurality of image pictures with different content, different depths, or different pixel quantities at a same moment or in a same scene to the user.

In some embodiments, in the multi-lens image capture mode, the processor 110 may correlate image frames from different cameras 193 respectively, so that when a captured picture or video is played, the display screen 194 can simultaneously display the correlated image frames in the preview box. In this case, videos simultaneously recorded by different cameras 193 may be stored as different video files respectively, and photos simultaneously recorded by different cameras 193 may be stored as different picture files respectively.

In some embodiments, in a multi-lens video recording mode, the plurality of cameras 193 may respectively acquire images at a same frame rate, that is, the plurality of cameras 193 acquire a same quantity of image frames within a same time. Videos from different cameras 193 may be stored as different video files respectively, and the different video files are correlated. The image frames are stored in the video file according to a sequence of which the image frames are acquired, and the different video files include a same quantity of image frames. When a recorded video is played, the display screen 194 may display, according to a preset or user-instructed layout mode, image frames according to a sequence of the image frames included in correlated video files, so that a plurality of frames of images corresponding to a same sequence in different video files are displayed in a same interface.

In some embodiments, in a multi-lens video recording mode, the plurality of cameras 193 may respectively acquire images at a same frame rate, that is, the plurality of cameras 193 acquire a same quantity of image frames within a same time. The processor 110 may add a time stamp to each frame of image from different cameras 193 respectively, so that when the recorded video is played, the display screen 194 can simultaneously display the plurality of frames of images from the plurality of cameras 193 in the same interface according to the time stamp.

For convenience of use, the electronic device usually performs image capture in a hand-held mode of the user, and the hand-held mode of the user usually makes a captured picture shake. In some embodiments, in the multi-lens image capture mode, the processor 110 may respectively perform anti-shake processing on the image frames acquired by different cameras 193. Afterwards, the display screen 194 displays according to the images after anti-shake processing.

The SIM card interface 195 is configured to connect to a SIM card. The SIM card may be inserted into the SIM card interface 195 or plugged from the SIM card interface 195, to come into contact with or be separated from the electronic device. The electronic device may support one or N SIM card interfaces, and N is a positive integer greater than 1. The SIM card interface 195 may support a nano-SIM card, a Micro-SIM card, a SIM card, and the like. A plurality of cards may be inserted into a same SIM card interface 195. The plurality of cards may be of a same type or different types. The SIM card interface 195 may also be compatible with different types of SIM cards. The SIM card interface 195 may also be compatible with an external storage card. The electronic device exchanges with a network by using a SIM card, to implement functions such as a call and data communication. In some embodiments, the electronic device uses an eSIM, that is, an embedded SIM card. The eSIM card may be embedded in the electronic device and cannot be separated from the electronic device.

A software system of the electronic device may use a layered architecture, an event-driven architecture, a micro core architecture, a micro service architecture, or a cloud architecture. In this embodiment of the present disclosure, an Android system with a layered architecture is used as an example to illustrate a software structure of the electronic device.

Figure 2B:
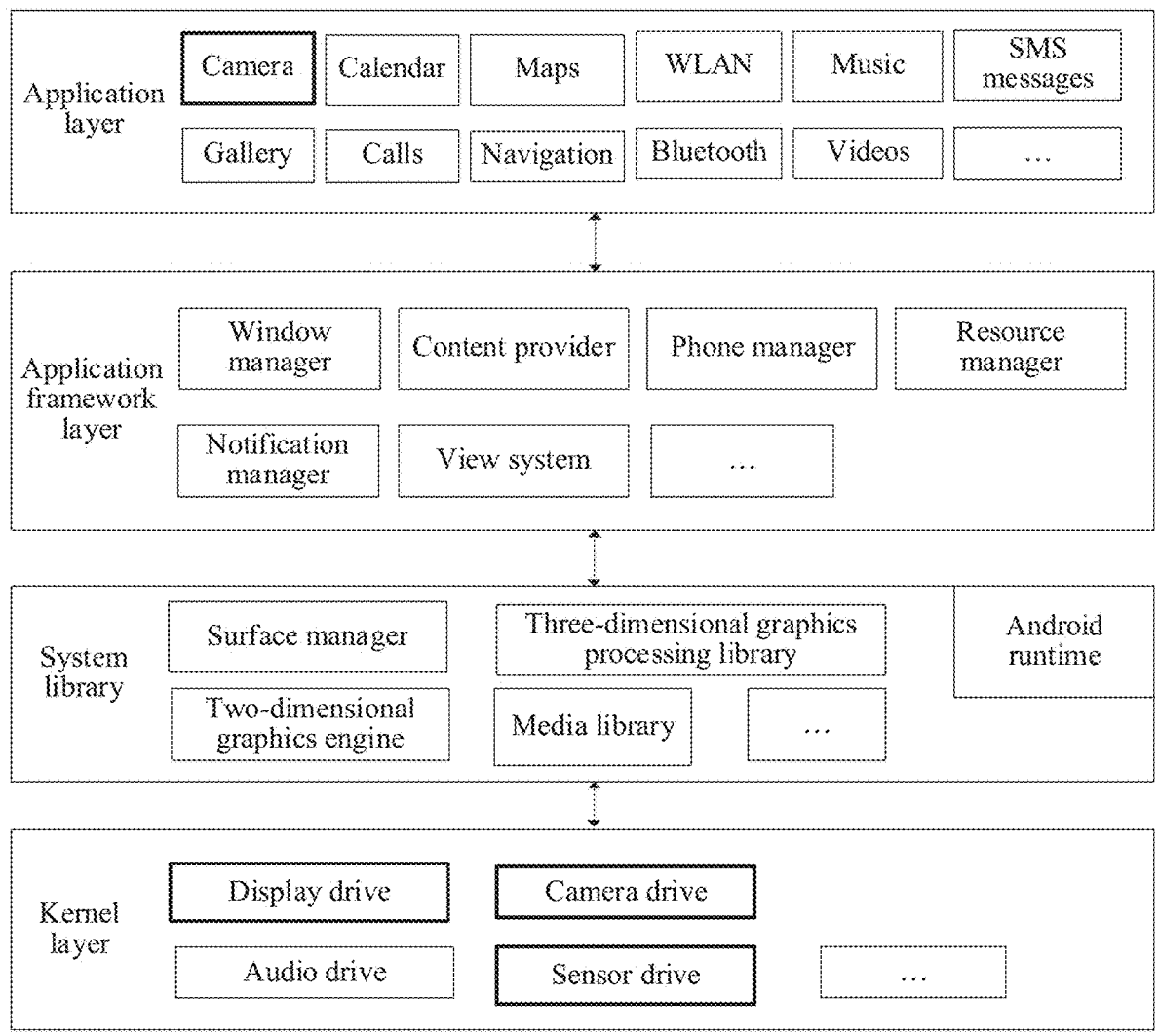

FIG. 2B is a block diagram of a software structure of an electronic device according to an embodiment of the present disclosure.

In a layered architecture, software is divided into several layers, and each layer has a clear role and task. The layers communicate with each other by using a software interface. In some embodiments, the Android system is divided into four layers that are respectively an application layer, an application framework layer, an Android runtime and system library, and a kernel layer from top to bottom.

The application layer may include a series of application packages.

As shown in FIG. 2B, the application packages may include applications such as camera, gallery, calendar, calls, maps, navigation, WLAN, Bluetooth, music, videos, and SMS messages.

The application framework layer provides an application programming interface (API) and a programming framework for applications at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display screen, determine whether there is a status bar, lock a screen, capture a screen, and the like.

The content provider is configured to store and obtain data and make the data accessible to an application. The data may include a video, an image, an audio, calls made and answered, a browsing history and bookmarks, an address book, and the like.

The view system includes visual controls such as a control for displaying a text and a control for display an image. The view system may be configured to construct an application. A display interface may be formed by one or more views. For example, a display interface including a short message notification icon may include a view for displaying a text and a view for displaying a picture.

The phone manager is configured to provide a communication function of the electronic device, for example, call state management (including getting through, hang-up, and the like).

The resource manager provides various resources such as a localized character string, an icon, a picture, a layout file, and a video file for an application.

The notification manager enables an application to display notification information in the status bar that may be used to convey a message of a notification type, where the message may disappear automatically after a short stay without user interaction. For example, the notification manager is configured to notify download completion, a message prompt, and the like. The notification manager may alternatively display a notification in a form of a chart or a scroll bar text in a status bar at the top of the system, for example, a notification of an application run in the background, or may display a notification in a form of a dialog window on the screen. For example, text information is prompted on a status bar, a prompt tone is made, the electronic device vibrates, or an indicator light flash.

The Android Runtime includes a core library and a virtual machine. The Android runtime is responsible for scheduling and management of the Android system.

The core library includes two parts: one is a function that needs to be called by a java language, and the other is a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, such as a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports play back and recording in a plurality of commonly used audio and video formats, and static image files. The media library may support a plurality of audio and video encoding formats, for example, MPEG4, H.264, MP3, AAC, AMR, JPG, and PNG.

The three-dimensional graphics processing library is configured to implement drawing of three-dimensional graphics, image rendering, synthesis, layer processing, and the like.

The 2D graphics engine is a drawing engine for 2D drawings.

The kernel layer is a layer between hardware and software. The kernel layer includes at least a display drive, a camera drive, an audio drive, and a sensor drive.

The following illustrates working processes of software and hardware of the electronic device with reference to an image capturing or photographing scene.

When the touch sensor 180K receives a touch operation, a corresponding hardware interrupt is sent to the kernel layer. The kernel layer processes the touch operation into an original input event (including information such as coordinates of a touch and a time stamp of the touch operation). The original input event is stored at the kernel layer. The application framework layer obtains the original input event from the kernel layer, and recognizes a control corresponding to the input event. Using an example in which the touch operation is a touch/click operation, and a control corresponding to the click operation is a control of a camera application icon. The camera application invokes an interface of the application framework layer to start a camera application, then starts a camera drive by invoking the kernel layer, and captures a static image or a video by using the camera 193. In this embodiment of this application, that the foregoing touch sensor 180K receives the touch operation may be replaced with an operation of the air gesture that is inputted by the user and acquired by the camera 193. Specifically, when the camera 193 acquires the operation of the air gesture, a corresponding hardware interrupt is sent to the kernel layer. The kernel layer processes the operation of the air gesture into an original input event (including information such as an image of the air gesture and a time stamp of the operation of the air gesture). The original input event is stored at the kernel layer. The application framework layer obtains the original input event from the kernel layer, and recognizes an operation corresponding to the input event. Using an example in which the operation of the air gesture is an operation of switching an image capture mode. The camera application invokes an interface of the application framework layer, to start another camera drive by invoking the kernel layer, so as to capture a static image or a video by using the camera 193.

A typical image capture scene involved in this application is introduced below.

Figure 3A:
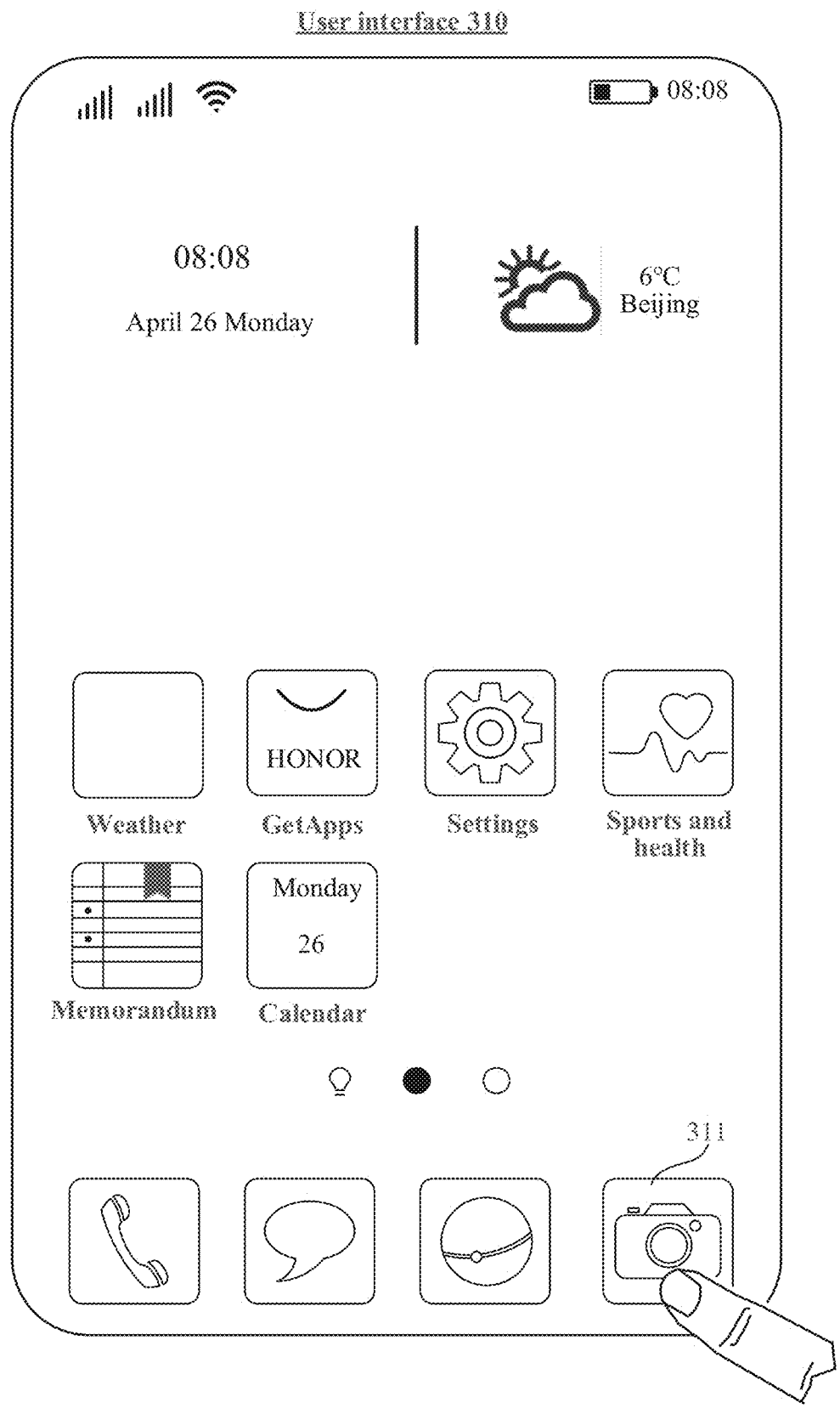
FIG. 3A and FIG. 3B are schematic diagrams of a group of user interfaces according to an embodiment of this application.

FIG. 3A exemplarily shows an exemplary user interface 310 on an electronic device for displaying an application menu.

As shown in FIG. 3A, a camera icon 311 is displayed in the user interface 310, and the electronic device may detect a touch operation acted on the camera icon 311. In response to the operation, the electronic device may enable a camera and display a user interface 320 exemplarily shown in FIG. 3B. It may be understood that a camera application is an application that performs image capture on an electronic device such as a smart phone or a tablet computer, and may be a system application or a third-party application. A name of the application is not limited in this application. That is, a user may click the camera icon 311 to open the user interface 320 of the camera application, which is not limited thereto. The user may also open the user interface 310 in another application, for example, the user clicks an image capture control in a social application to open the user interface 320. The social application may support the user in sharing a captured image with other people, and the like.

Figure 3B:
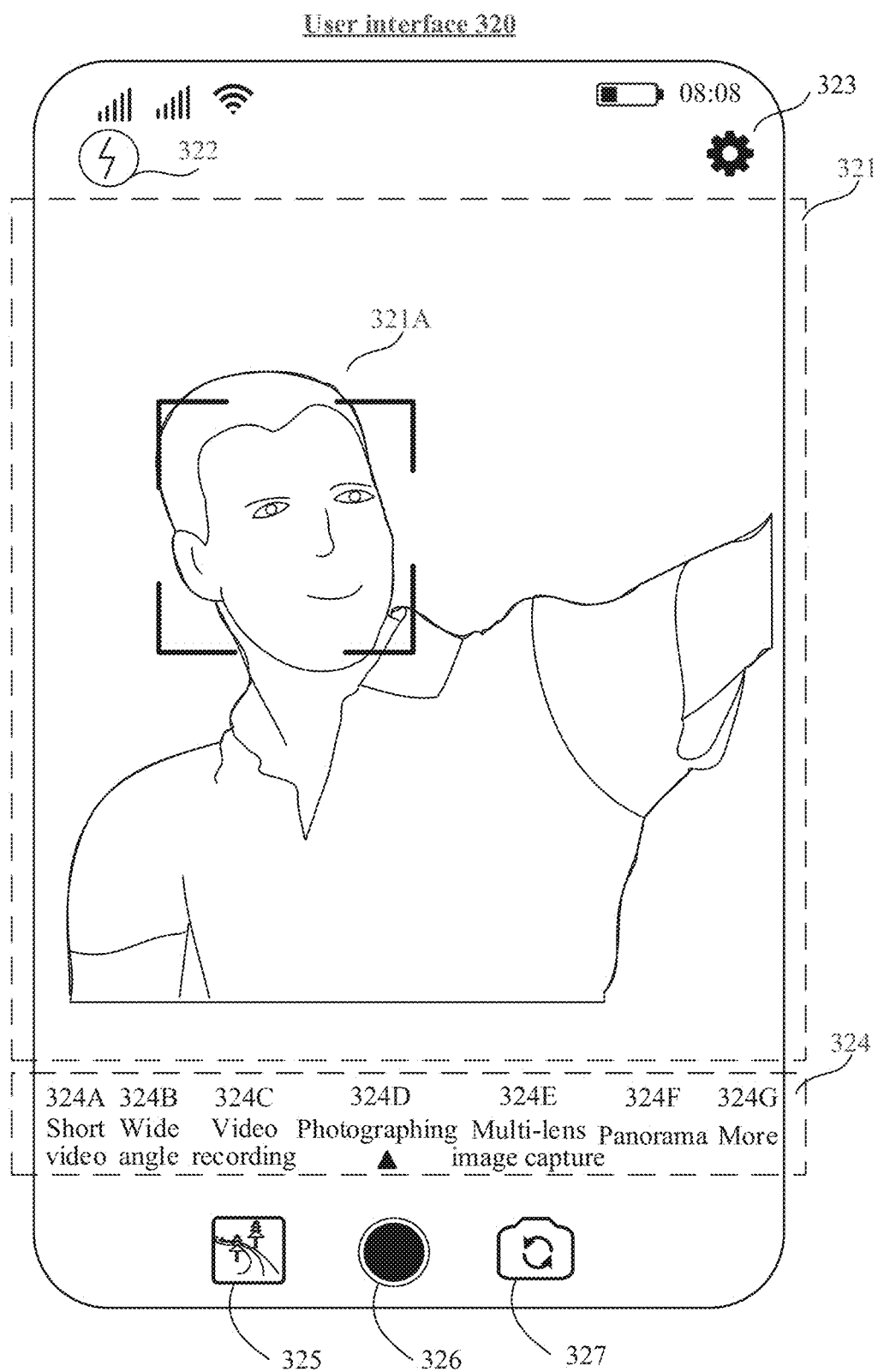

FIG. 3B exemplarily shows a user interface 320 provided by a camera application.

As shown in FIG. 3B, the user interface 320 may be a user interface of a default image capture mode of the camera application, for example, a user interface provided by the camera application when a front-facing camera is used for single-lens image capture. It may be understood that a default camera is not limited as the front-facing camera, and the electronic device may also set a rear-facing camera as the default camera. That is, when the camera application is enabled, the electronic device may display an image acquired by the rear-facing camera in a preview box 321, which can be used by the user to photograph by using the default rear-facing camera.

As shown in FIG. 3B, the user interface 320 may include: the preview box 321, a flashlight control 322, a setting control 323, an image capture mode option 324, a gallery shortcut control 325, a shutter control 326, and a camera switching control 327.

The preview box 321 may be used for displaying an image acquired by a camera 193 in real time, for example, an image 321A of the user currently acquired by a front-facing camera 193. The electronic device may refresh displayed content of the preview box 321 in real time, so that the user can preview the image currently acquired by the camera 193.

The flashlight control 322 is configured to turn on/off a flashlight.

The setting control 323 may be configured to adjust parameters (such as a resolution, a picture ratio, and the like) for photographing and enable or disable some manners for photographing (such as timing photographing, smile snapping, voice-activated photographing, and the like).

One or more image capture mode options may be displayed in the image capture mode option 324. The one or more image capture mode options may include: short video 324A, wide angle 324B, video recording 324C, photographing 324D, multi-lens image capture 324E, panorama 324F, and more options 324G. When a user operation acted on the image capture mode option is detected, the electronic device may enable an image capture mode selected by the user, or the user may browse other image capture mode options by sliding left/right in the image capture mode option 324. Particularly, when a user operation acted on the more options 324G is detected, the electronic device may further display more other image capture mode options, such as a slow-motion image capture mode option, which can present richer image capture functions to the user. This is not limited to what is shown in FIG. 3B, and the image capture mode option 324 may display more or fewer options than those shown in FIG. 3B.

An image capture mode corresponding to the photographing 324D is a default image capture mode when the electronic device enables the user interface of the camera. The image capture mode corresponding to the photographing 324D is commonly used single-lens image capture, which may include front-facing image capture and rear-facing image capture, specifically corresponding to single-lens image capture when the front-facing camera is set as the default camera described above or single-lens image capture when the rear-facing camera is set as the default camera.

For introduction of an image capture mode corresponding to the multi-lens image capture 324E, reference may be made to the foregoing detailed descriptions. Details are not described herein again.

A thumbnail of a saved image is displayed in the gallery shortcut key 325, and the gallery shortcut key 325 may also be configured to enable a gallery application. In response to a user operation acted on the gallery shortcut key 325, such as a click operation, the electronic device may enable the gallery application. In this way, the user can conveniently view captured photos and videos without first exiting the camera application and then enabling the gallery application. The gallery application is an application that performs picture management on an electronic device such as a smart phone or a tablet computer, and may also be referred to as an "album". A name of the application is not limited in this embodiment. The gallery application may support the user in performing various operations on pictures stored on the electronic device, including browsing, editing, deleting, selecting, and other operations.

The shutter control 326 may be configured to monitor a user operation of triggering photographing. The electronic device may detect a user operation acted on the shutter control 326, and in response to the operation, the electronic device may save an image in the preview box 321 as a picture file in the gallery application. That is, the user may click the shutter control 326 to trigger photographing.

The camera switching control 327 may be configured to monitor a user operation of triggering switching a camera. The electronic device may detect a user operation acted on the camera switching control 327, such as a click operation, and in response to the operation, the electronic device may switch a camera, for example, switch a front-facing camera to a rear-facing camera. In this case, as shown in FIG. 3B, an image acquired by the front-facing camera is shown in the preview box 321.

In this embodiment of this application, the preview box 321 shown in FIG. 3B may be referred to as a preview interface, and an entire region of the preview interface may also be referred to as a first region; and the image 321A may be referred to as a first image, a camera that acquires the first image may be referred to as a first camera.

Based on the typical image capture scene described in FIG. 3A and FIG. 3B, some user interfaces for switching from front-facing image capture to front-rear image capture on the electronic device are introduced below.

Figure 4A:
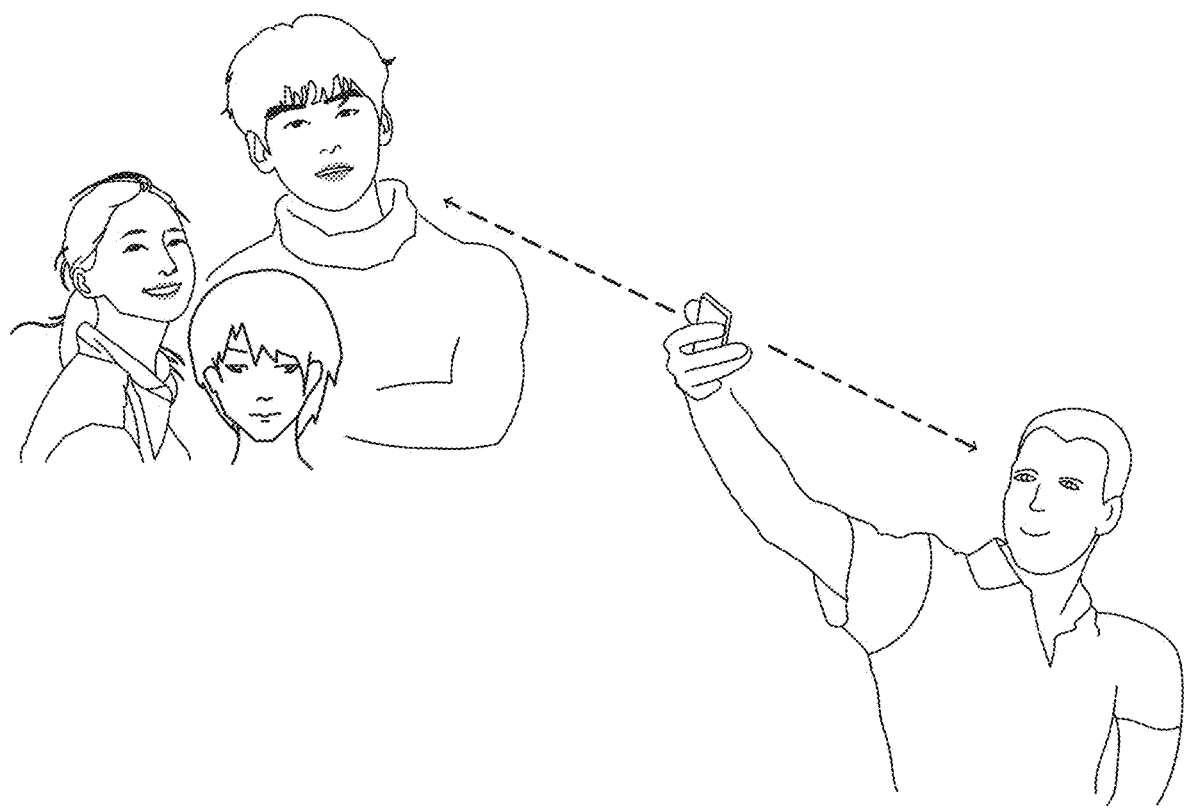
FIG. 4A to FIG. 4E are schematic diagrams of another group of interfaces according to an embodiment of this application.

FIG. 4A exemplarily shows a schematic diagram of a scene in which a user holds an electronic device and stretches out his arm to perform portrait-oriented image capture, where the electronic device may be placed in the user's hand in a portrait direction.

Assuming that the electronic device works in a single-lens image capture mode within a first time period during image capture, for example, a selfie is captured by using a front-facing camera, for content displayed in a preview box, reference may be made to the descriptions in FIG. 3B. However, when the user intends to switch to a multi-lens image capture mode during capturing a selfie or after completing a selfie, for example, captures a selfie by using a front-facing camera and simultaneously captures friends by using a rear-facing camera to record beautiful moments, for a specific implementation in which the electronic device switches the image capture mode in this case, reference may be made to detailed descriptions in FIG. 4B to FIG. 4E.

FIG. 4B to FIG. 4E exemplarily show a series of user interfaces displayed by the electronic device switching from front-facing image capture to front-rear image capture.

Figure 4B:
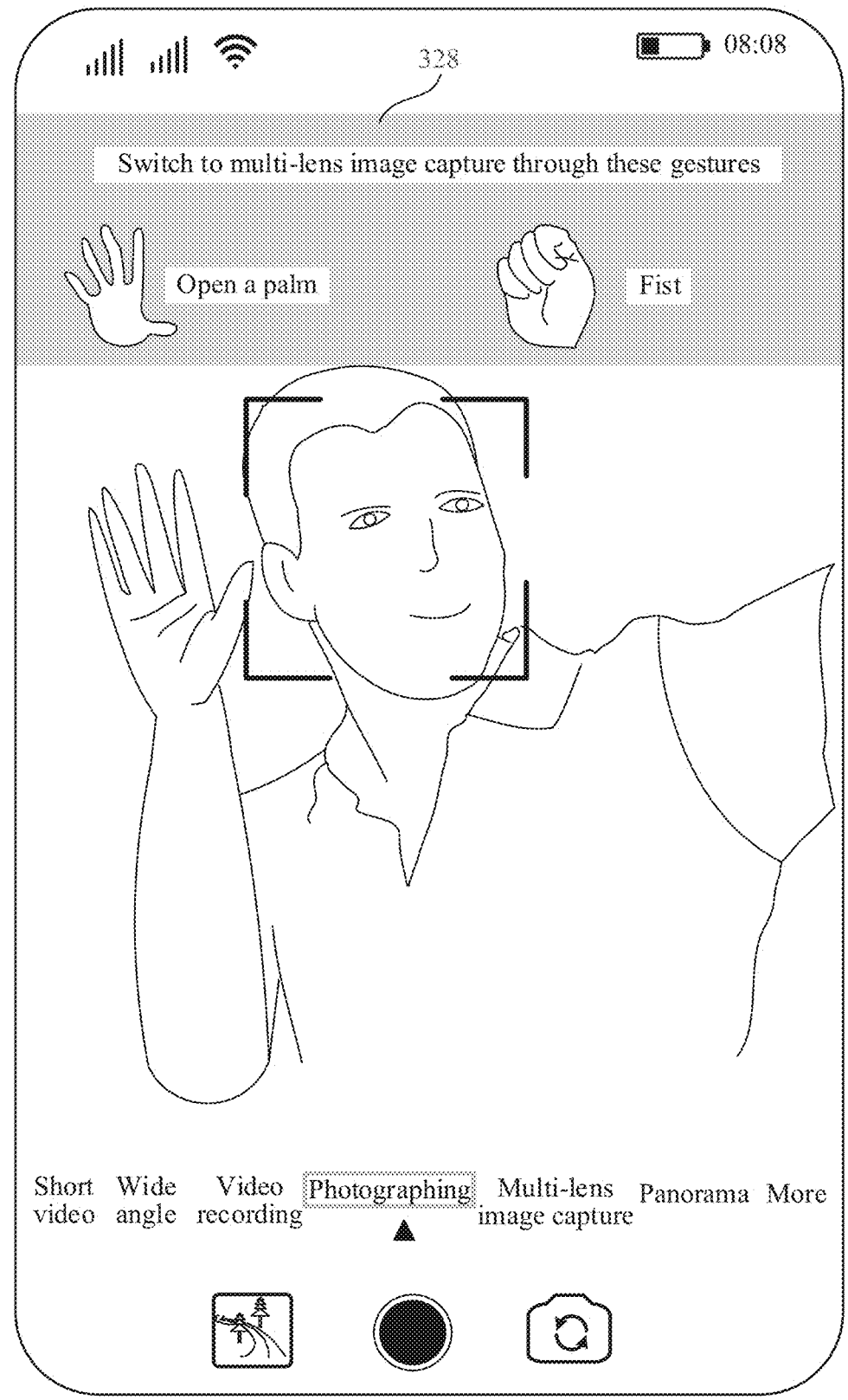

FIG. 4B exemplarily shows an air gesture for switching to front-rear image capture that is detected by the electronic device during front-facing image capture.

As shown in FIG. 4B, content included in a user interface 320 is similar to that of the user interface 320 shown in FIG. 3B, and a difference lies in that: prompt information 328 is displayed in the user interface 320 shown in FIG. 4B, and is used for prompting the user to switch an image capture mode of the electronic device through an air gesture operation, for example, texts "switch to multi-lens image capture through these air gestures", and some air gesture images such as a "palm" and a "fist" are displayed.

The electronic device may detect an air gesture such as the "palm" inputted by the user in the user interface 320 shown in FIG. 4B. In response to the operation, the electronic device switches the image capture mode from single-lens image capture to multi-lens image capture, and specifically switches front-facing image capture to front-rear image capture shown in FIG. 4C.

In this embodiment of this application, the foregoing air gesture such as the "palm" may be referred to as a first air gesture.

Figure 4C:
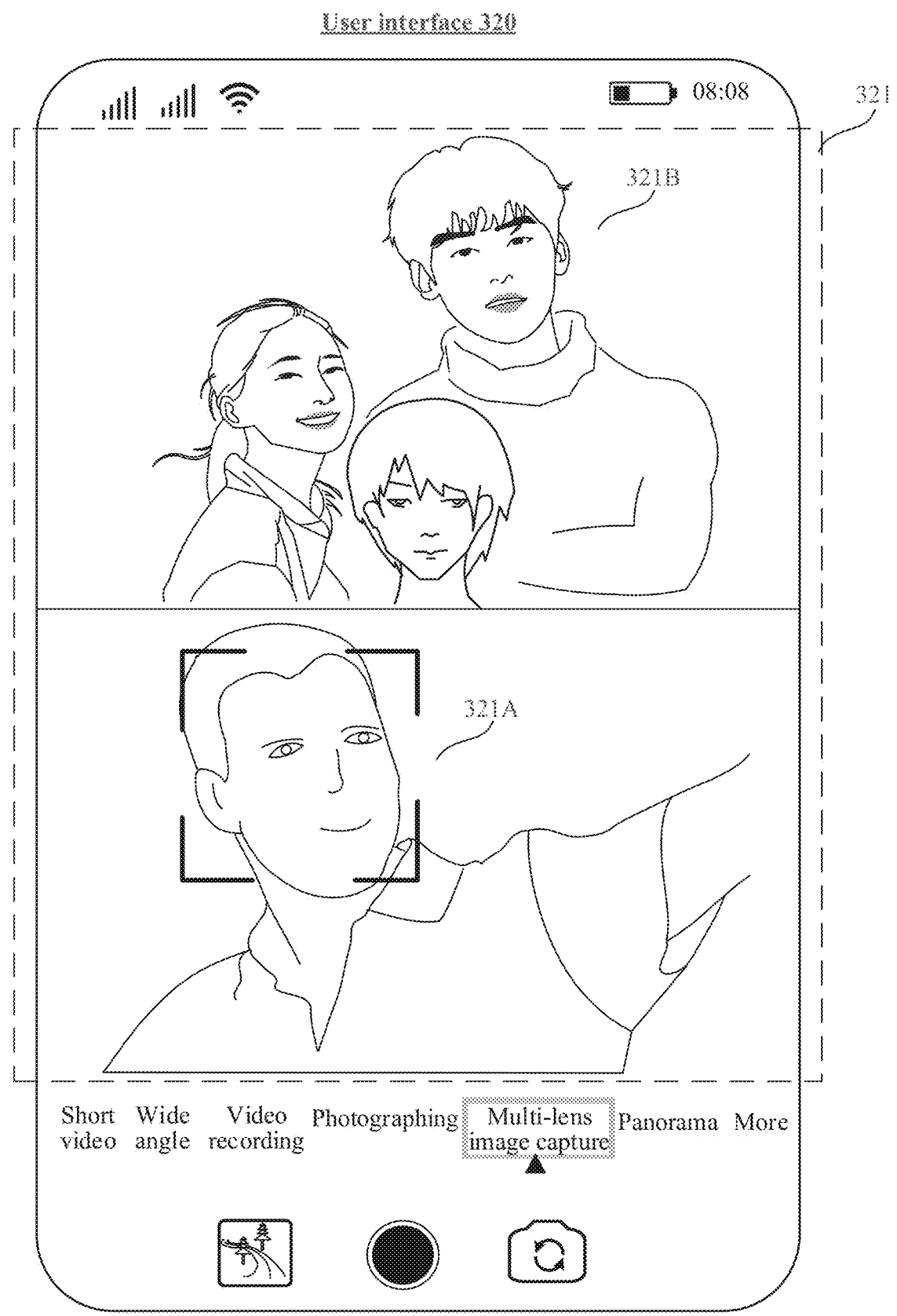

FIG. 4C exemplarily shows a user interface displayed by the electronic device in a front-rear image capture mode.

As shown in FIG. 4C, content included in a user interface 320 is similar to that of the user interface 320 shown in FIG. 3B, and a difference lies in that: an image capture mode of the electronic device has been switched to a multi-lens image capture mode, so that multi-lens image capture 324E in an image capture mode option 324 is displayed as being selected. In addition, images that are acquired by cameras 193 in real time and that are displayed in a preview box 321 displayed in the user interface 320 shown in FIG. 4C include: an image 321A of the user currently acquired by a front-facing camera and an image 321B of the friends of the user currently acquired by a rear-facing camera. A display form of the image 321B and the image 321A is an up-down splicing form. In some embodiments of this application, when content displayed in the preview box 321 is switched from an image 321A shown in FIG. 4B to the image 321B and the image 321A shown in FIG. 4C, the switching process may be direct switching, or a switching effect may also be displayed, for example, the image 321A gradually narrows and moves below the preview box, while the image 321B gradually enlarges and is displayed above the preview box. This is not limited in this embodiment of this application.

It may be understood that, when the electronic device is in a portrait-oriented state to perform image capture, images captured by a plurality of cameras and displayed by the electronic device may be in the foregoing up-down splicing display form shown in FIG. 4B and FIG. 4C; and when the electronic device is in a landscape-oriented image capture state, the display form of the image 321B and the image 321A may also be a left-right splicing form.

In this embodiment of this application, a display region of the image 321A in a preview interface shown in FIG. 4C may be referred to as a second region, and a display region of the image 321B in the preview interface may be referred to as a third region. The image 321B may be referred to as a second image, and a camera configured to acquire the image 321B may be referred to as a second camera.

In addition to the foregoing up-down splicing and left-right splicing display forms, the electronic device may also be superimposed and displayed in a picture-in-picture form. For a specific implementation, refer to the following descriptions.

Figure 4D:
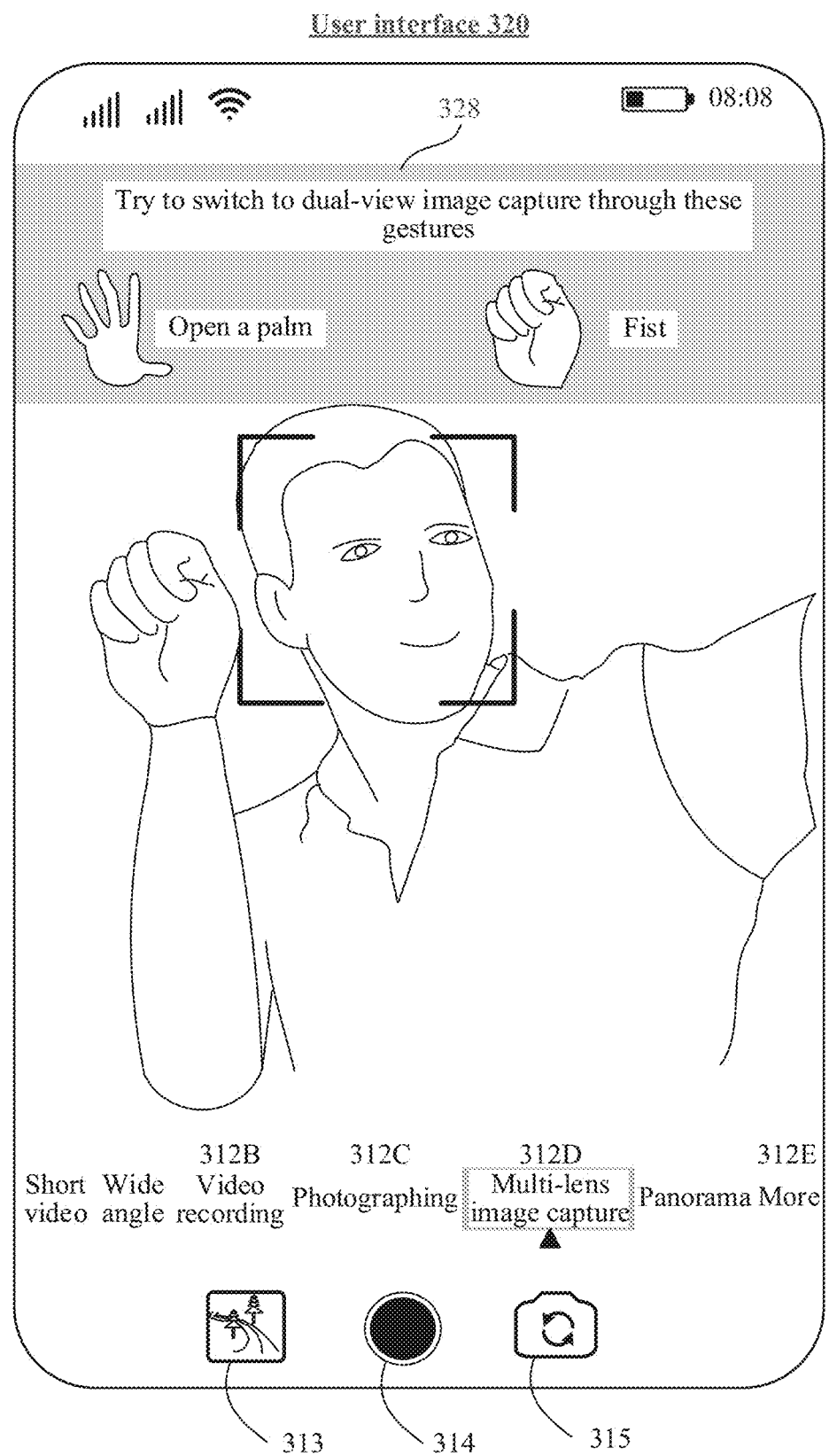

FIG. 4D exemplarily shows another air gesture for switching to front-rear image capture that is detected by the electronic device during front-facing image capture.

As shown in FIG. 4D, content included in a user interface 320 is similar to that of the user interface 320 shown in FIG. 3B, and a difference lies in that: prompt information 328 is displayed in the user interface 320 shown in FIG. 4B, and is used for prompting the user to switch an image capture mode of the electronic device through an air gesture operation, for example, texts "switch to multi-lens image capture through these air gestures", and some air gesture images such as a "palm" and a "fist" are displayed.

In this embodiment of this application, the foregoing prompt information 328 may also be referred to as first prompt information.

The electronic device may detect an air gesture such as the "fist" inputted by the user in the user interface 320 shown in FIG. 4D. In response to the operation, the electronic device switches the image capture mode from single-lens image capture to multi-lens image capture, and specifically switches front-facing image capture to front-rear image capture shown in FIG. 4E.

Figure 4E:
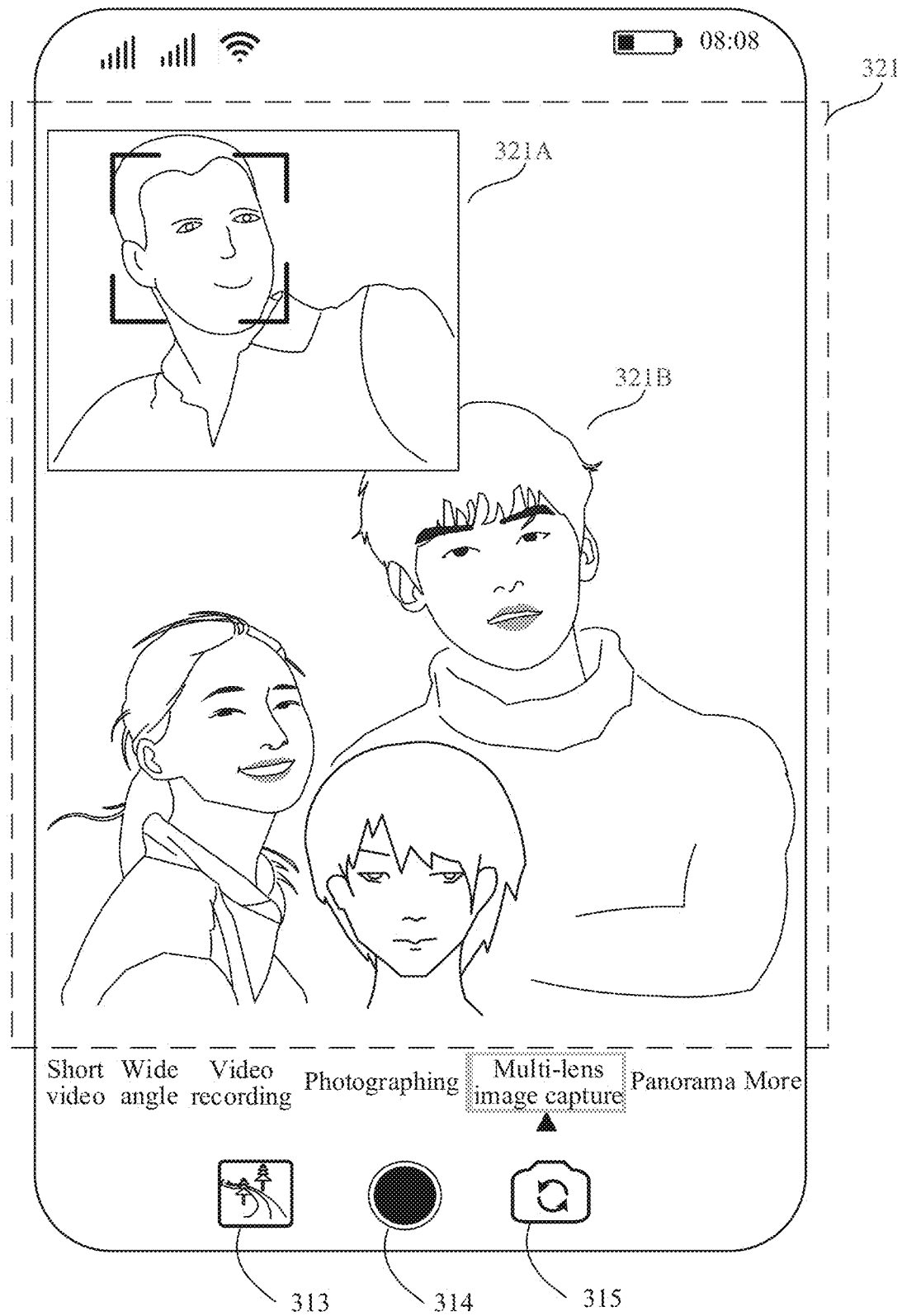

FIG. 4E exemplarily shows another user interface displayed by the electronic device in a front-rear image capture mode.

As shown in FIG. 4E, content included in a user interface 320 is similar to that of the user interface 320 shown in FIG. 3B, and a difference lies in that: an image capture mode of the electronic device has been switched to a multi-lens image capture mode, so that multi-lens image capture 324E in an image capture mode option 324 is displayed as being selected. In addition, images that are acquired by cameras 193 in real time and that are displayed in a preview box 321 displayed in the user interface 320 shown in FIG. 4E include: an image 321A of the user currently acquired by a front-facing camera and an image 321B of the friends of the user currently acquired by a rear-facing camera. A display form of the image 321B and the image 321A is a picture-in-picture form. Specifically, the image 321A is superimposed and displayed in an upper left corner of the image 321B.

In this embodiment of this application, a display region of the image 321A in a preview interface shown in FIG. 4E may be referred to as a fourth region, and a display region of the image 321B in the preview interface may be referred to as a fifth region.

In this embodiment of this application, when the electronic device displays images under front-rear image capture in the picture-in-picture form, an image captured by a front-facing camera is superimposed and displayed in an upper left corner of an image captured by a rear-facing camera by default, and a size of the image captured by the front-facing camera is less than a size of the image captured by the rear-facing camera. A display location of the image captured by the front-facing camera may also be a location such as an upper right corner, a lower left corner, or a middle location. The size of the image may be set by the electronic device by default, or the user may also redefine the size of the image through a setting interface. This is not limited in this embodiment of this application.

It may be understood that, in a process in which the electronic device switches from front-facing image capture to front-rear image capture, the electronic device may perform the foregoing direct switching shown in FIG. 4B to FIG. 4E, that is, an image 321A displayed in the preview box in the display screen may be directly switched to two images 321A and 321B for display: or the electronic device may use a default switching effect to switch, and the default switching effect may be that a display area of the image 321A captured by the front-facing camera is gradually narrowed from original full-screen display and the image 321A moves toward one side of the display screen, and a display area of the image 321B captured by the rear-facing camera is gradually increased and the image 321B moves toward another side of the display screen. The default switching effect may also be another effect, which is not limited in this embodiment of this application. Alternatively, the electronic device may also use a corresponding display effect for switching according to different air gestures inputted by the user. For details, reference may be made to FIG. 5A to FIG. 5H below.

Based on the image capture scene described in FIG. 3A and FIG. 3B, other user interfaces for switching from front-facing image capture to front-rear image capture on the electronic device are introduced below.

Figure 5A:
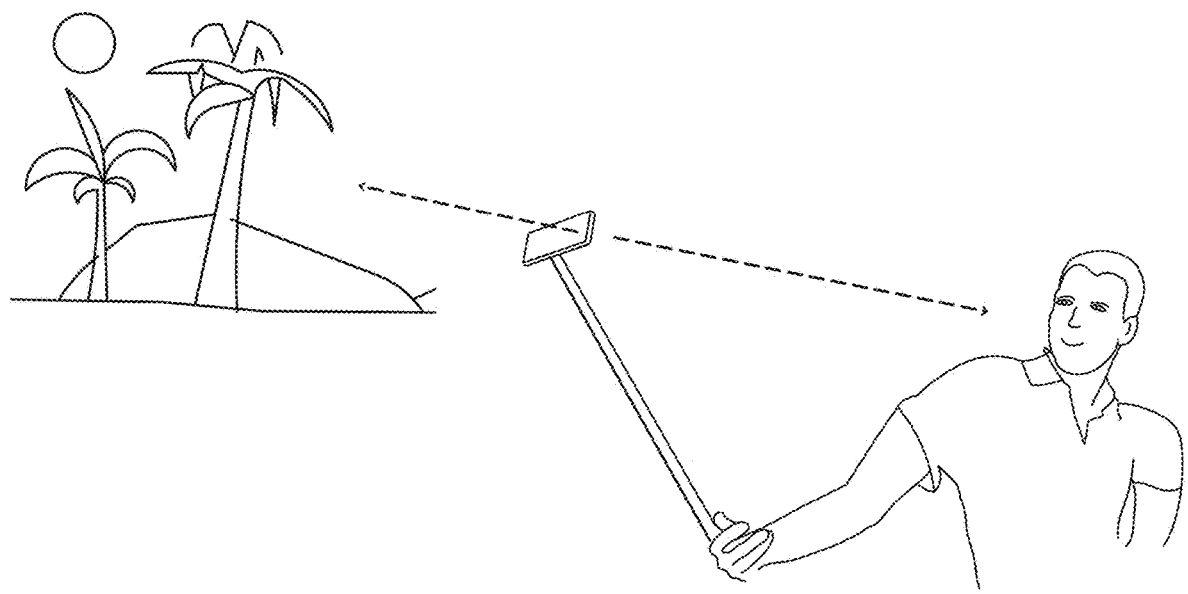
FIG. 5A to FIG. 5H are schematic diagrams of another group of interfaces according to an embodiment of this application.

FIG. 5A exemplarily shows a schematic diagram of a scene in which a user holds an electronic device to perform image capture.

FIG. 5A exemplarily shows a schematic diagram of a scene in which the user holds a selfie stick to hold the electronic device to perform landscape-oriented image capture, where the electronic device may be placed in the selfie stick in a landscape direction.

Assuming that the electronic device works in a single-lens image capture mode within a first time period during image capture, for example, a selfie is captured by using a front-facing camera, content displayed in a preview box is similar to the descriptions in FIG. 3B, but a difference lies in that an image displayed in a preview box 321 is in landscape-oriented display when the electronic device is in landscape-oriented image capture. However, when the user intends to switch to a multi-lens image capture mode during capturing a selfie or after completing a selfie, for example, captures a selfie by using a front-facing camera and simultaneously captures a scenery by using a rear-facing camera to record beautiful moments, for a specific implementation in which the electronic device switches the image capture mode in this case, reference may be made to detailed descriptions in FIG. 5B to FIG. 5E.

FIG. 5B to FIG. 5E exemplarily show a switching effect when the electronic device switches from front-facing image capture to front-rear image capture.

Figure 5B:
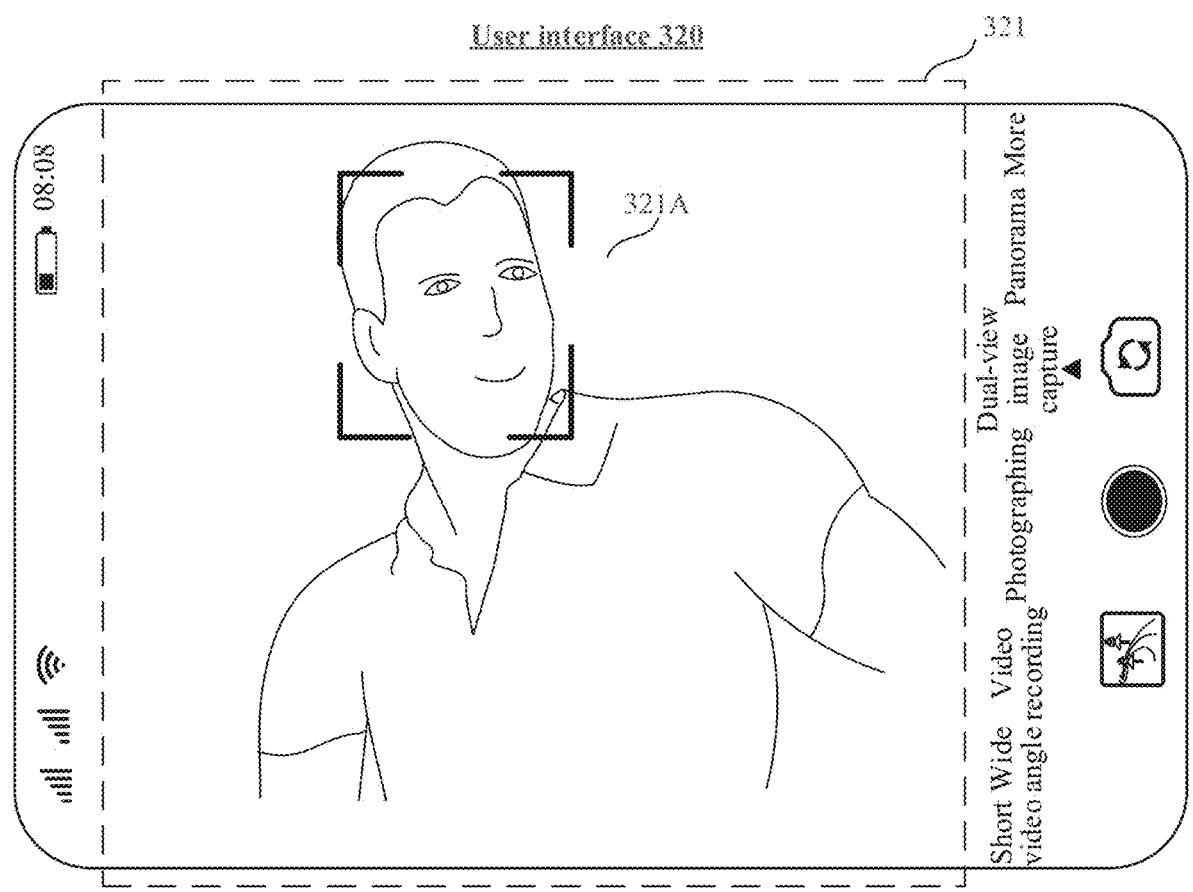

FIG. 5B exemplarily shows a user interface displayed by the electronic device during front-facing image capture.

As shown in FIG. 5B, content included in a user interface 320 is similar to that of the user interface 320 shown in FIG. 3B, and a difference lies in that: an image 321A in a preview box 321 in the user interface 320 shown in FIG. 5B is in landscape-oriented display because the electronic device is placed in the selfie stick in the landscape direction.

Figure 5C:
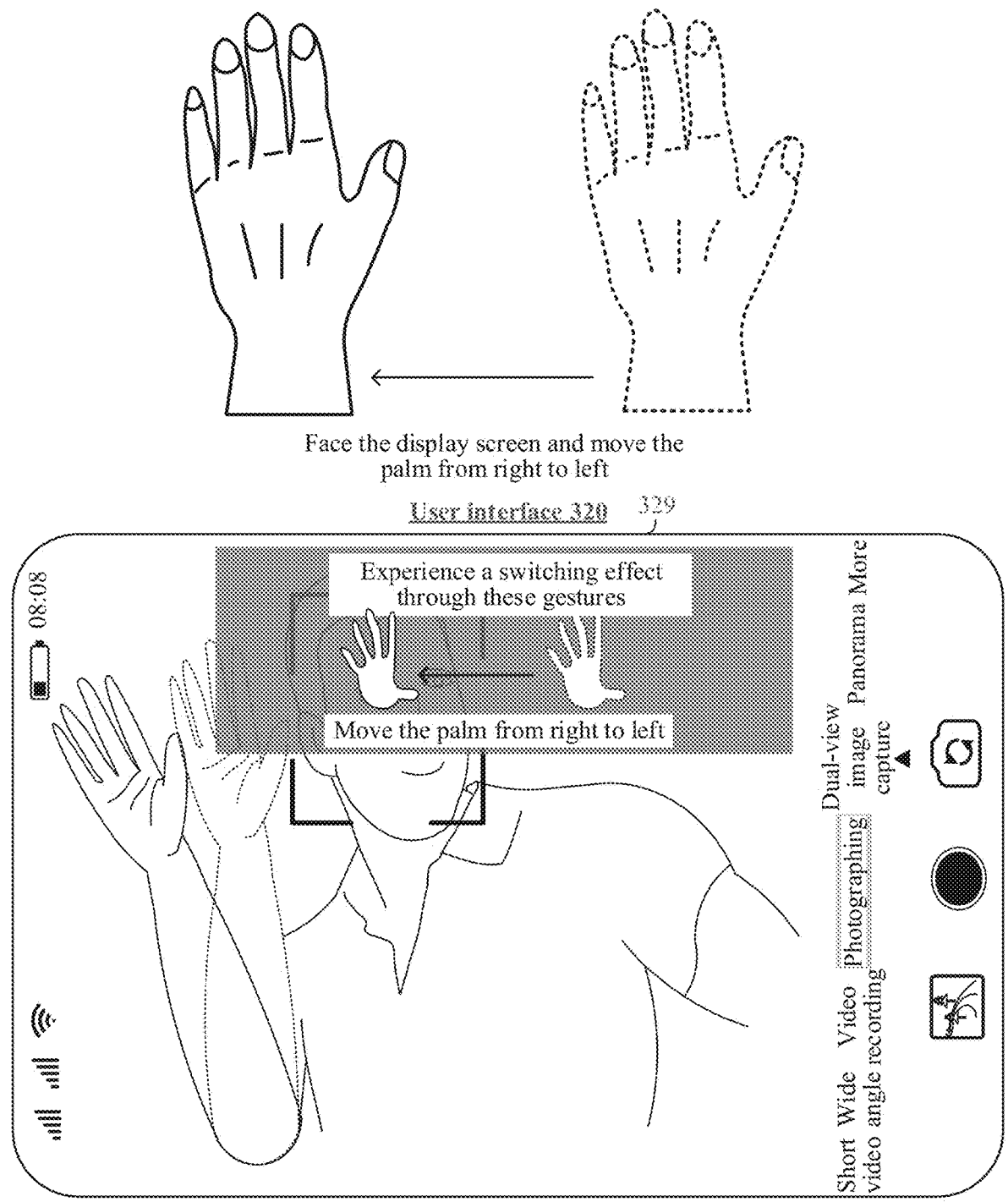

FIG. 5C exemplarily shows another air gesture for switching to front-rear image capture that is detected by the electronic device during front-facing image capture.

As shown in FIG. 5C, content included in a user interface 320 is similar to that of the user interface 320 shown in FIG. 5B, and a difference lies in that: prompt information 329 is displayed in the user interface 320 shown in FIG. 5C, and is used for prompting the user to experience a switching effect of switching an image capture mode of the electronic device through an air gesture, for example, texts "experience the switching effect through these air gestures", and images corresponding to some air gestures such as "an image of moving a palm from right to left" and "an image of moving a palm from left to right" are displayed. In some embodiments, the images of the air gestures displayed in the prompt information 329 may simultaneously include one or more images, or a plurality of images are periodically cycled and displayed. This is not limited in this embodiment of this application.

In this embodiment of this application, the foregoing "image of moving the palm from right to left". "image of moving the palm from left to right", or another air gesture may also be referred to as a second air gesture, and that the first air gesture moves in a direction from a first side to a second side may include moving the palm from right to left or from left to right.

The electronic device may detect an air gesture inputted by the user in the user interface 320 shown in FIG. 5C, such as an air gesture of "moving the palm from right to left" that is inputted by the user when facing a display screen. In response to the operation, the electronic device switches the image capture mode from single-lens image capture to multi-lens image capture, and specifically switches from front-facing image capture to front-rear image capture shown in FIG. 5D and FIG. 5E.

Figure 5D:
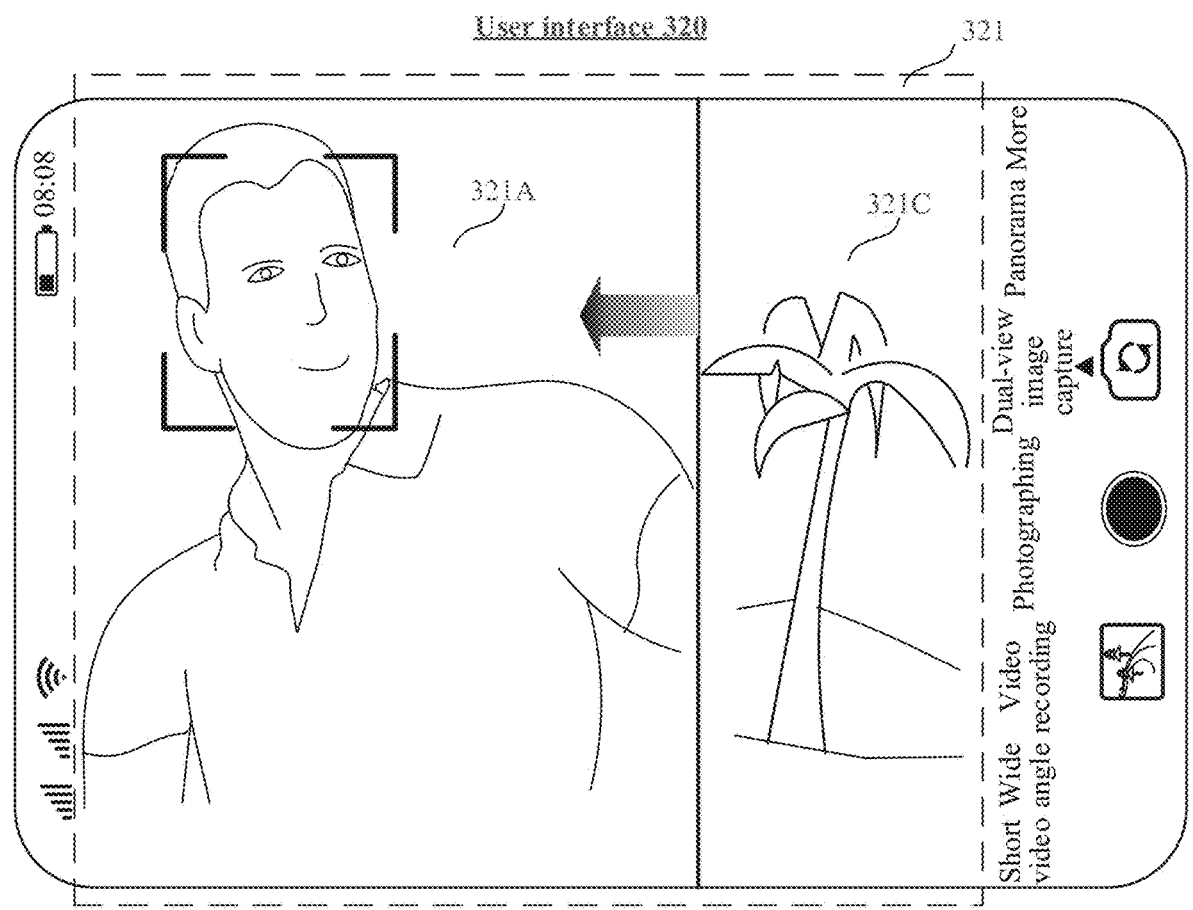

FIG. 5D exemplarily shows a user interface displayed by the electronic device when switching from front-facing image capture to front-rear image capture.

As shown in FIG. 5D, content included in a user interface 320 is similar to that of the user interface 320 shown in FIG. 5B, and a difference lies in that: an image capture mode of the electronic device has been switched to a multi-lens image capture mode, so that multi-lens image capture 324E in an image capture mode option 324 is displayed as being selected. In addition, images that are acquired by cameras 193 in real time and that are displayed in a preview box 321 displayed in the user interface 320 shown in FIG. 5C include: an image 321A of the user currently acquired by a front-facing camera and an image 321C of the scenery currently acquired by a rear-facing camera. A display form of the image 321A and the image 321C is a left-right splicing form. According to an air gesture from right to left inputted by the user, the image 321A correspondingly moves from right to left and gradually reduces a display area thereof, and is finally displayed on a left side of the preview box 321, while the image 321C correspondingly moves from right to left and gradually increases a display area thereof, and is finally displayed on a right side of the preview box 321.

Figure 5E:
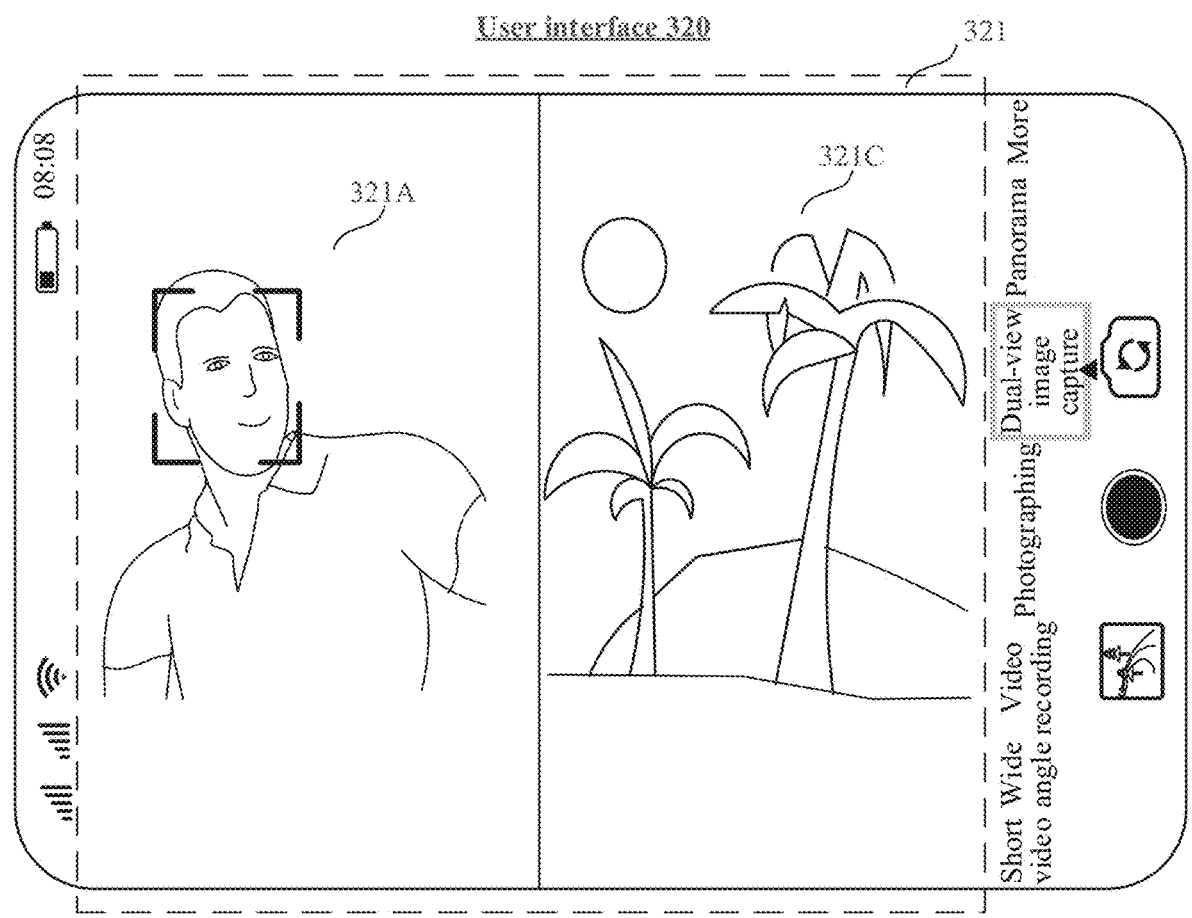

FIG. 5E exemplarily shows a user interface displayed by the electronic device after switching from front-facing image capture to front-rear image capture.

As shown in FIG. 5E, the image 321A is finally fixedly displayed on the left side of the preview box 321, and the image 321C is finally fixedly displayed on the right side of the preview box 321.

Figure 5F:
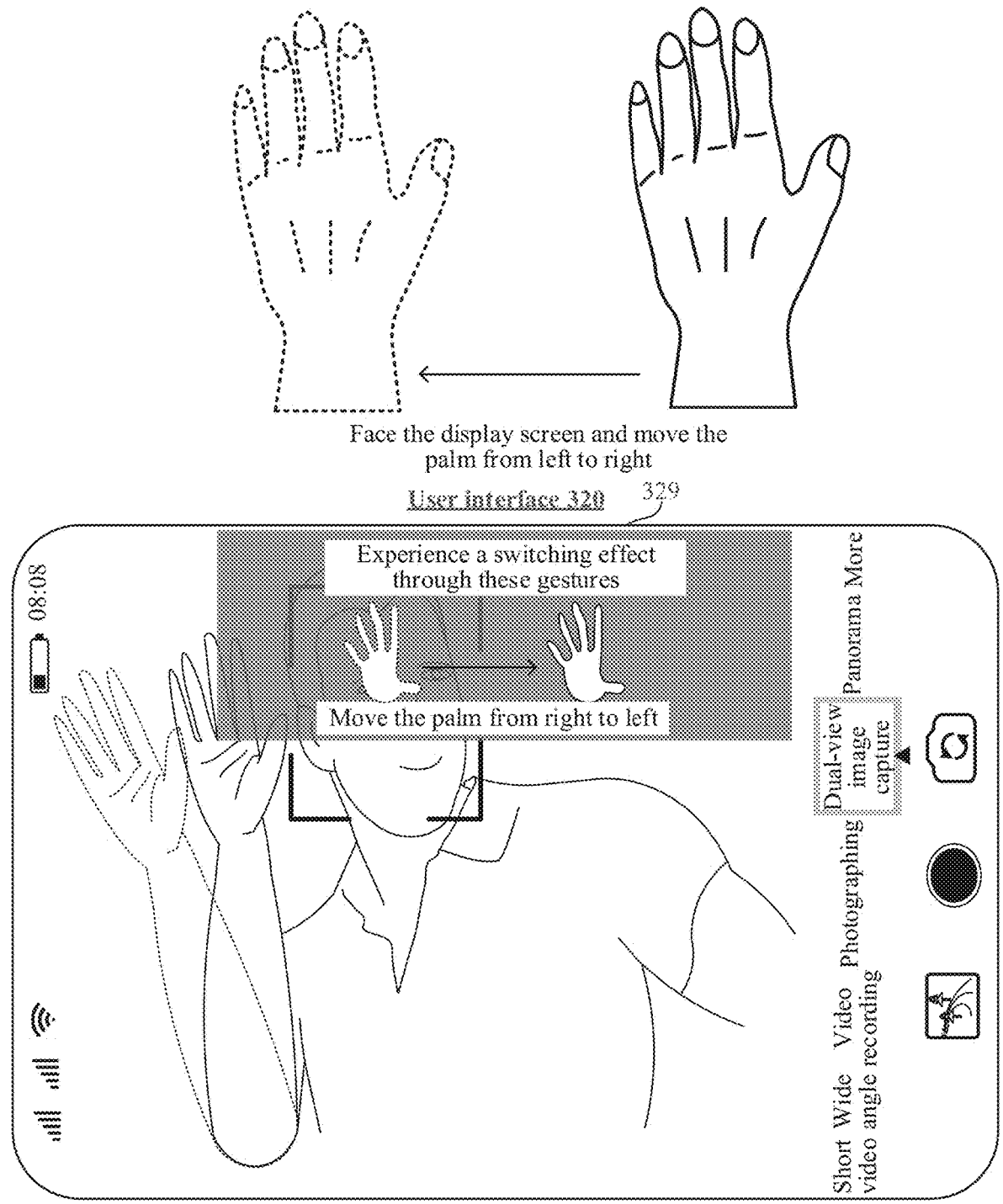
Figure 5G:
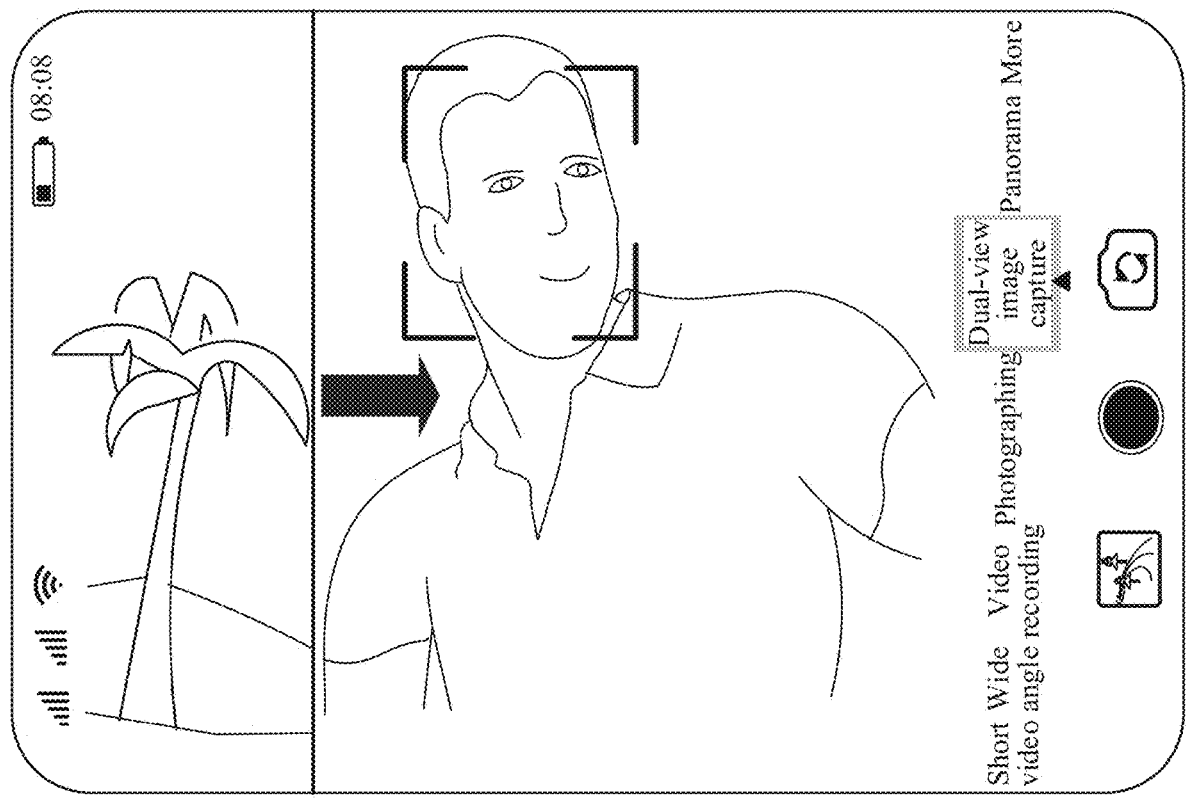
Figure 5H:
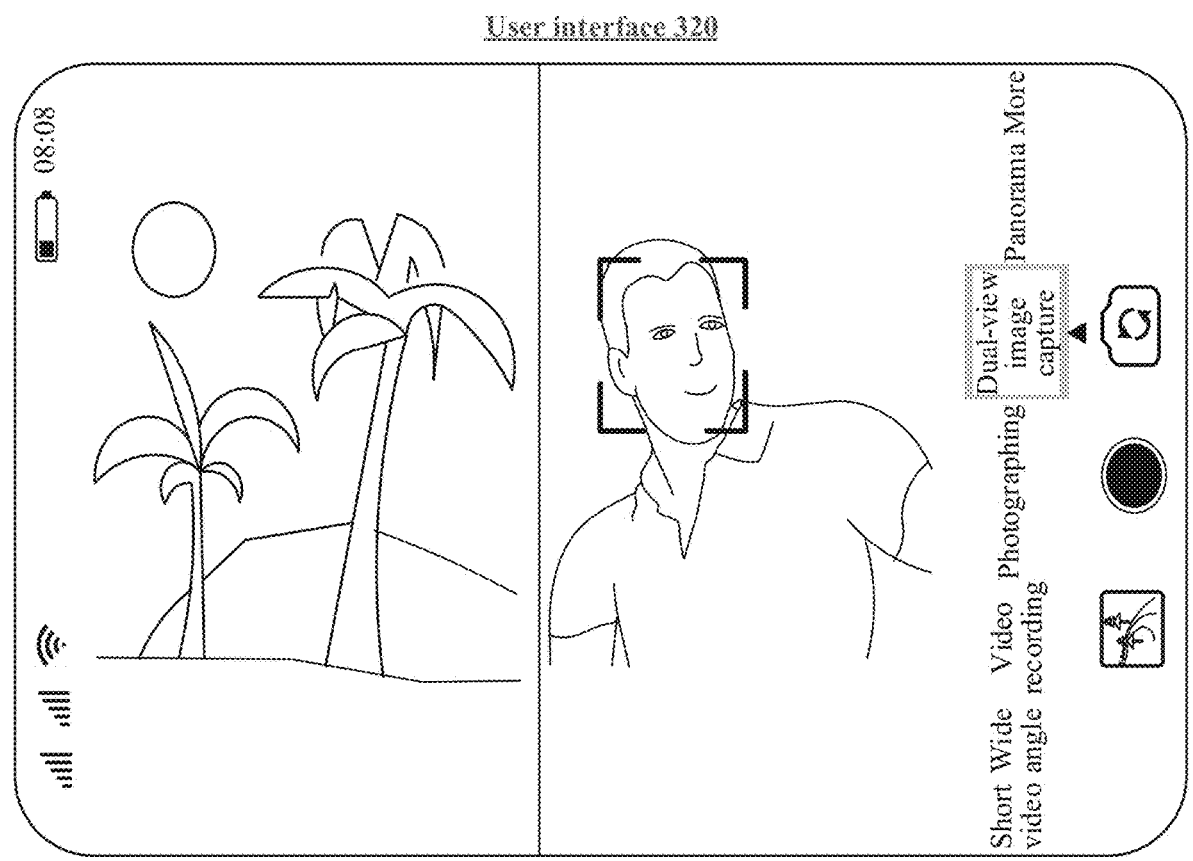

It may be understood that the switching effect of switching from front-facing image capture to front-rear image capture shown in FIG. 5B to FIG. 5E is only an example of this application, and there are other switching effects in addition to this, which are specifically as follows:

FIG. 5F to FIG. 5H exemplarily show another switching effect when the electronic device switches from front-facing image capture to front-rear image capture.

FIG. 5F exemplarily shows a user interface displayed by the electronic device during front-facing image capture.

As shown in FIG. 5F, a user interface 320 is similar to the user interface shown in FIG. 5C, so details are not described herein.

The electronic device may detect an air gesture inputted by the user in the user interface 320 shown in FIG. 5C, such as an air gesture of "moving the palm from left to right" that is inputted by the user when facing a display screen. In response to the operation, the electronic device switches the image capture mode from single-lens image capture to multi-lens image capture, and specifically switches front-facing image capture to front-rear image capture shown in FIG. 5G and FIG. 5H.

FIG. 5G exemplarily shows another user interface displayed by the electronic device when switching from front-facing image capture to front-rear image capture.

As shown in FIG. 5G, content included in a user interface 320 is similar to that of the user interface 320 shown in FIG. 5F, and a difference lies in that: an image capture mode of the electronic device has been switched to a multi-lens image capture mode, so that multi-lens image capture 324E in an image capture mode option 324 is displayed as being selected. In addition, images that are acquired by cameras 193 in real time and that are displayed in a preview box 321 displayed in the user interface 320 shown in FIG. 5C include: an image 321A of the user currently acquired by a front-facing camera and an image 321C of the scenery currently acquired by a rear-facing camera. A display form of the image 321A and the image 321C is a left-right splicing form. According to an air gesture from left to right inputted by the user, the image 321A correspondingly moves from left to right and gradually reduces a display area thereof, and is finally displayed on a right side of the preview box 321, while the image 321C correspondingly moves from left to right and gradually increases a display area thereof, and is finally displayed on a left side of the preview box 321.

FIG. 5H exemplarily shows another user interface displayed by the electronic device after switching from front-facing image capture to front-rear image capture.

As shown in FIG. 5H, the image 321A is finally fixedly displayed on the right side of the preview box 321, and the image 321C is finally fixedly displayed on the left side of the preview box 321.

It is worth noting that, switching from single-lens image capture to multi-lens image capture is specifically introduced by using an example of switching from front-facing image capture to front-rear image capture. In addition to this, rear-facing image capture may also be switched to front-rear image capture. This is not described in this embodiment of this application. The front-rear image capture may be a default image capture mode in the multi-lens image capture mode. However, when there are a plurality of rear-facing cameras, a rear-facing working camera in the front-rear image capture in this case is a rear-facing main camera defaulted by the electronic device.

It may be understood that the foregoing switching effects of switching from front-facing image capture to front-rear image capture shown in FIG. 5B to FIG. 5E and FIG. 5F to FIG. 5H are only two examples of this application, and there are other switching effects in addition to this, which are not limited in this embodiment of this application.

Based on an image capture scene described in FIG. 5H, user interfaces for switching a display form of a plurality of images during front-rear image capture on the electronic device are introduced below.

Figure 6A:
FIG. 6A to FIG. 6C are schematic diagrams of another group of interfaces according to an embodiment of this application.
Figure 6B:
Figure 6C:
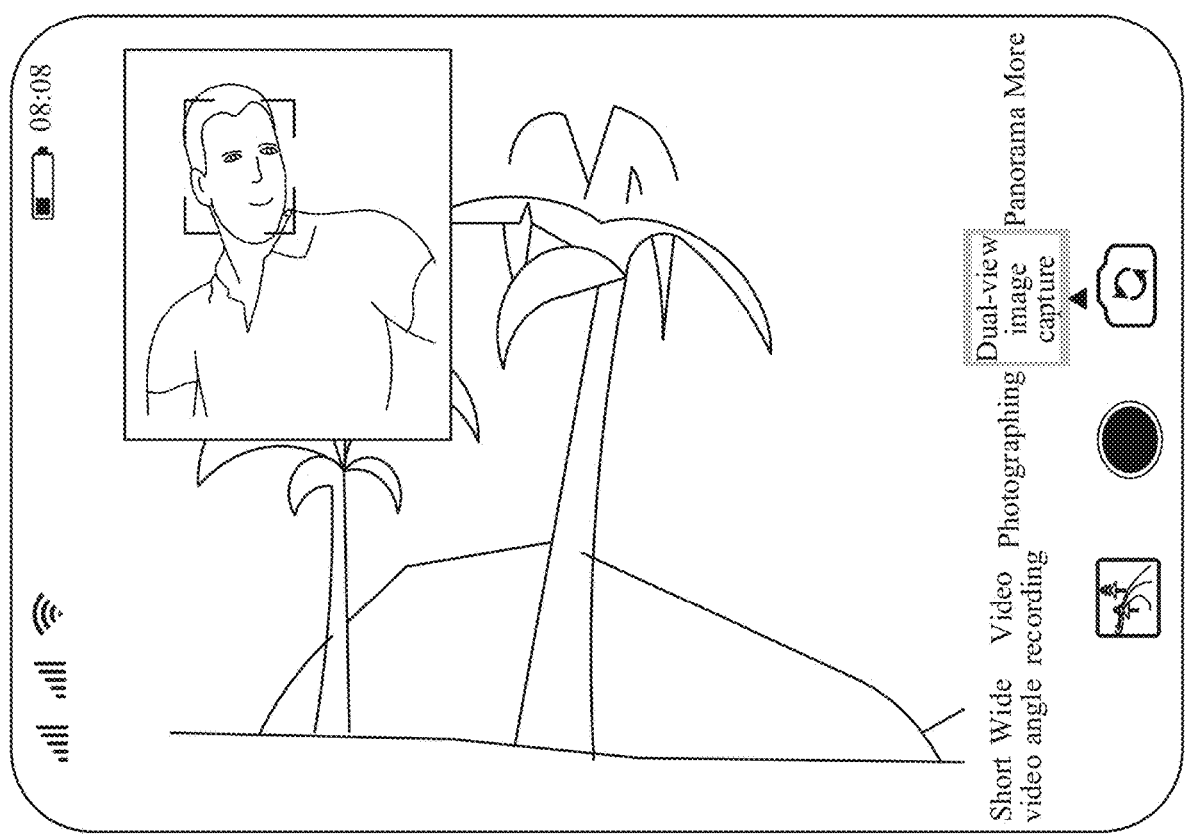

FIG. 6A to FIG. 6C exemplarily show a series of user interfaces when an electronic device switches images in a front-rear image capture scene from a left-right splicing form to a picture-in-picture form.

As shown in FIG. 6A, a user interface 320) is similar to the user interface shown in FIG. 5H, so details are not described herein.

The electronic device may detect an air gesture inputted by a user in the user interface 320 shown in FIG. 6A, such as an air gesture of "stretching out a palm and then fisting" that is inputted by the user when facing a display screen. In response to the operation, the electronic device switches images in the front-rear image capture scene from the original left-right splicing form shown in FIG. 6A to the picture-in-picture form. For details, refer to descriptions shown in FIG. 6B and FIG. 6C.

In this embodiment of this application, the foregoing air gesture of "stretching out the palm and then fisting" shown in FIG. 6A may be referred to as a second air gesture.

FIG. 6B exemplarily shows a user interface displayed by the electronic device when switching images in the front-rear image capture scene from the left-right splicing form to the picture-in-picture form.

As shown in FIG. 6B, a display form of an image 321A and an image 321C displayed in a preview box 321 in a user interface 320 changes, which specifically includes that: the image 321C and the image 321A change from being originally displayed half on left and right sides of the preview box 321 shown in FIG. 6A to that: a display area of the image 321A captured by a front-facing camera in the preview box 321 is gradually narrowed and the image 321A moves toward an upper left corner of the preview box 321, while a display area of the image 321C captured by a rear-facing camera in the preview box 321 is gradually enlarged and the image 321C moves toward the middle of the preview box 321 until the image 321C is finally displayed in an entire region of the preview box 321. It is worth noting that, in a process of switching the display form of the image 321C and the image 321A, the image 321A is superimposed and displayed in a partial region of the image 321C.

FIG. 6C exemplarily shows a user interface displayed by the electronic device when switching a display form of images in the front-rear image capture scene to the picture-in-picture form.

As shown in FIG. 6C, an image 321A and an image 321C are displayed in a preview box 321 in a user interface 320, where the image 321A is superimposed and displayed in the image 321C, a display location of the image 321C is the entire preview box 321, and a display location of the image 321A is an upper left corner of the preview box 321. It is worth noting that, when the images are displayed in the picture-in-picture form, the display location of the image 321A may be a display location defaulted by the electronic device, that is, the upper left corner of the preview box 321. Alternatively, the display location and a size of the image 321A may also be set by the user, for example, the electronic device may detect that the user acts on the image 321A and drags the image 321A to adjust the display location of the image 321A to any place in the preview box 321. In another example, the electronic device may detect that the user acts on the image 321A by two fingers, and then pinches inward or expands outward to enlarge or narrow the image 321A, that is, to adjust a size of a display area of the image 321A. The display location and the size of the display area of the image 321A are not limited in this embodiment of this application.

In this embodiment of this application, a region of the image 321A shown in FIG. 6C may be referred to as a fourth region, and a region of the image 321C may be referred to as a fifth region. The fifth region herein is the same as the first region described above, that is, the preview interface displayed by the electronic device.

It may be understood that, the electronic device may display the user interface shown in FIG. 6C after the air gesture of "stretching out the palm and then fisting" is detected in the user interface shown in FIG. 6A, or may also display the user interface shown in FIG. 6A after the air gesture of "stretching out the palm and then fisting" is detected in the user interface shown in FIG. 6C.

Based on an image capture scene described in FIG. 5H, some user interfaces for switching from front-rear image capture to front-facing image capture or rear-facing image capture on the electronic device are introduced below.

Figure 7A:
FIG. 7A to FIG. 7F are schematic diagrams of another group of interfaces according to an embodiment of this application.
Figure 7B:
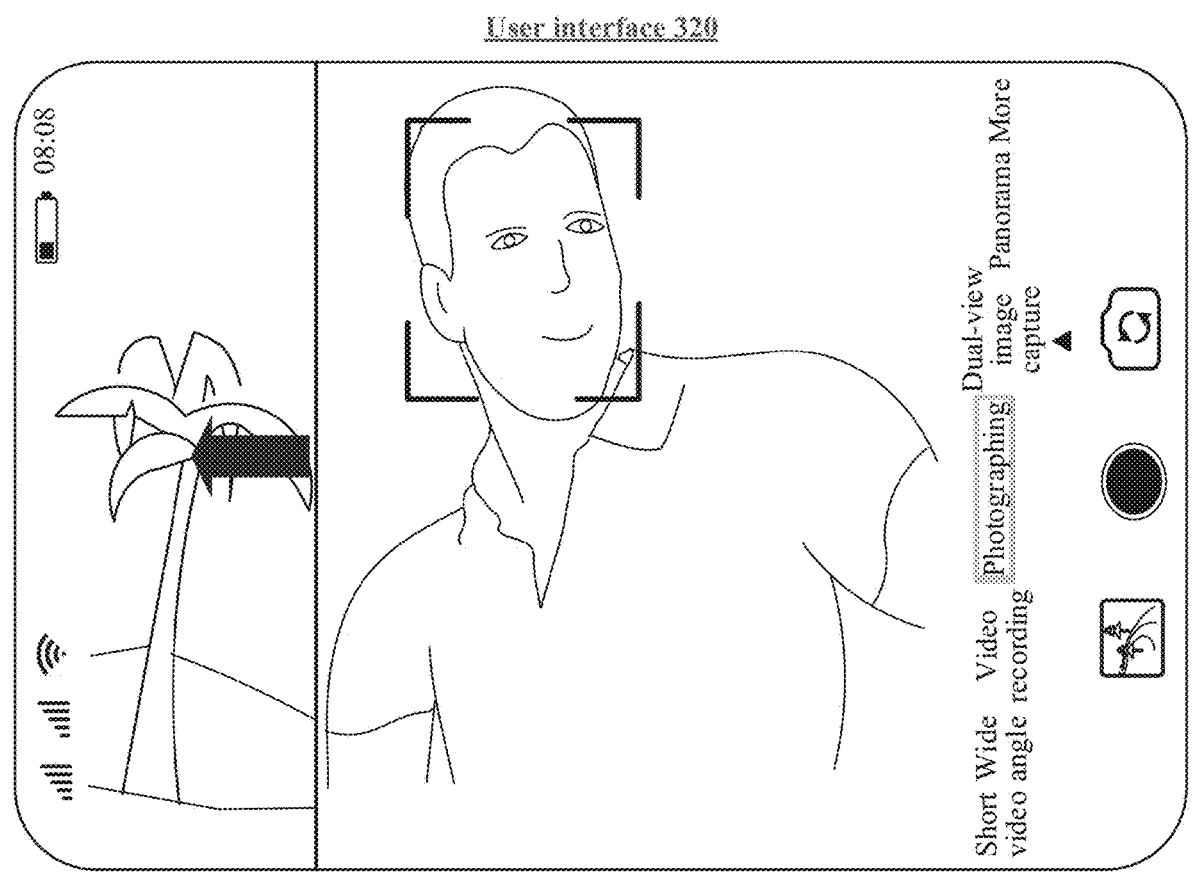
Figure 7C:
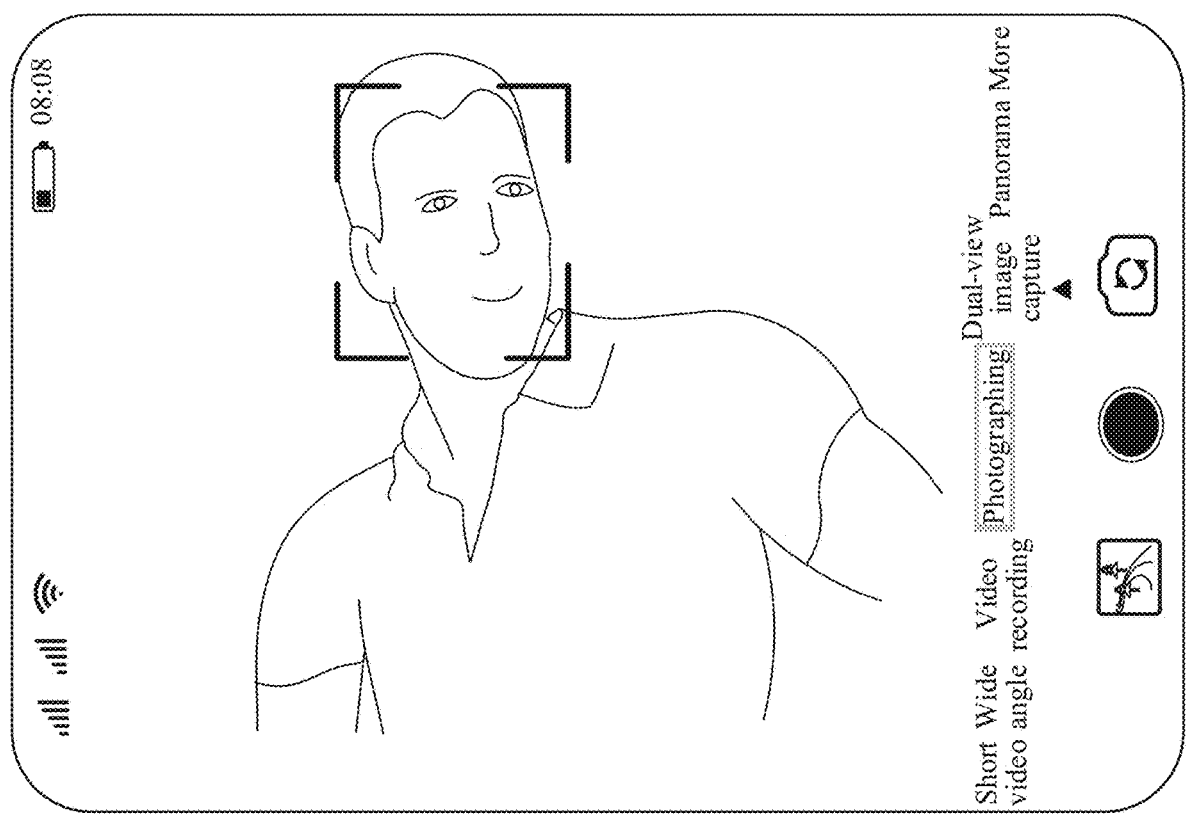

FIG. 7A to FIG. 7C exemplarily show a series of user interfaces displayed by an electronic device switching from front-rear image capture to front-facing image capture.

As shown in FIG. 7A, a user interface 320 is similar to the user interface shown in FIG. 5H, so details are not described herein.

The electronic device may detect an air gesture inputted by a user in the user interface 320 shown in FIG. 7A, such as an air gesture of "moving a palm from right to left" that is inputted by the user when facing a display screen. In response to the operation, the electronic device switches an image capture mode from multi-lens image capture to single-lens image capture, and specifically switches front-rear image capture to front-facing image capture shown in FIG. 7B.

In this embodiment of this application, the foregoing air gesture of "moving the palm from right to left" shown in FIG. 7A may be referred to as a third gesture.

FIG. 7B exemplarily shows a user interface displayed by the electronic device when switching from front-rear image capture to front-facing image capture.

As shown in FIG. 7B, an image capture mode option 324 in a user interface 320 changes from multi-lens image capture 324E in FIG. 7A to photographing 324D to be selected. In addition, a display form of an image 321A and an image 321C displayed in a preview box 321 shown in FIG. 7B changes, which specifically includes that: the image 321C and the image 321A change from being originally displayed half on left and right sides of the preview box 321 shown in FIG. 7A to that: according to the air gesture of "moving the palm from right to left" inputted by the user, the image 321C on the left side of the preview box 321 correspondingly moves from right to left and gradually narrows a display area thereof until the image 321C stops being displayed on the left side of the preview box 321, while the image 321C correspondingly moves from left to right and gradually enlarges a display area thereof until the image 321A is finally displayed in an entire region of the preview box 321.

FIG. 7C exemplarily shows a user interface displayed by the electronic device after switching from front-rear image capture to front-facing image capture.

As shown in FIG. 7C, the image 321A captured by a front-facing camera is displayed in the preview box 321 in the user interface 320.

Figure 7D:
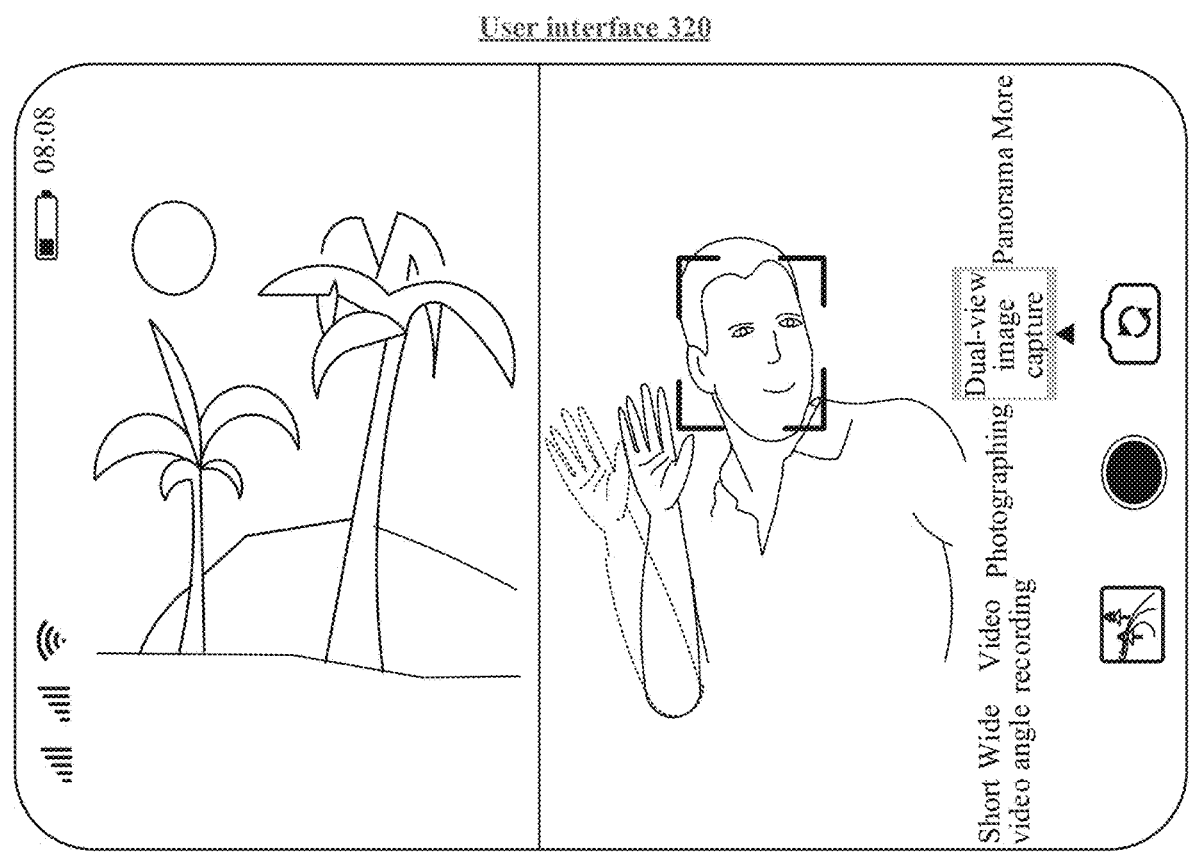
Figure 7E:
Figure 7F:
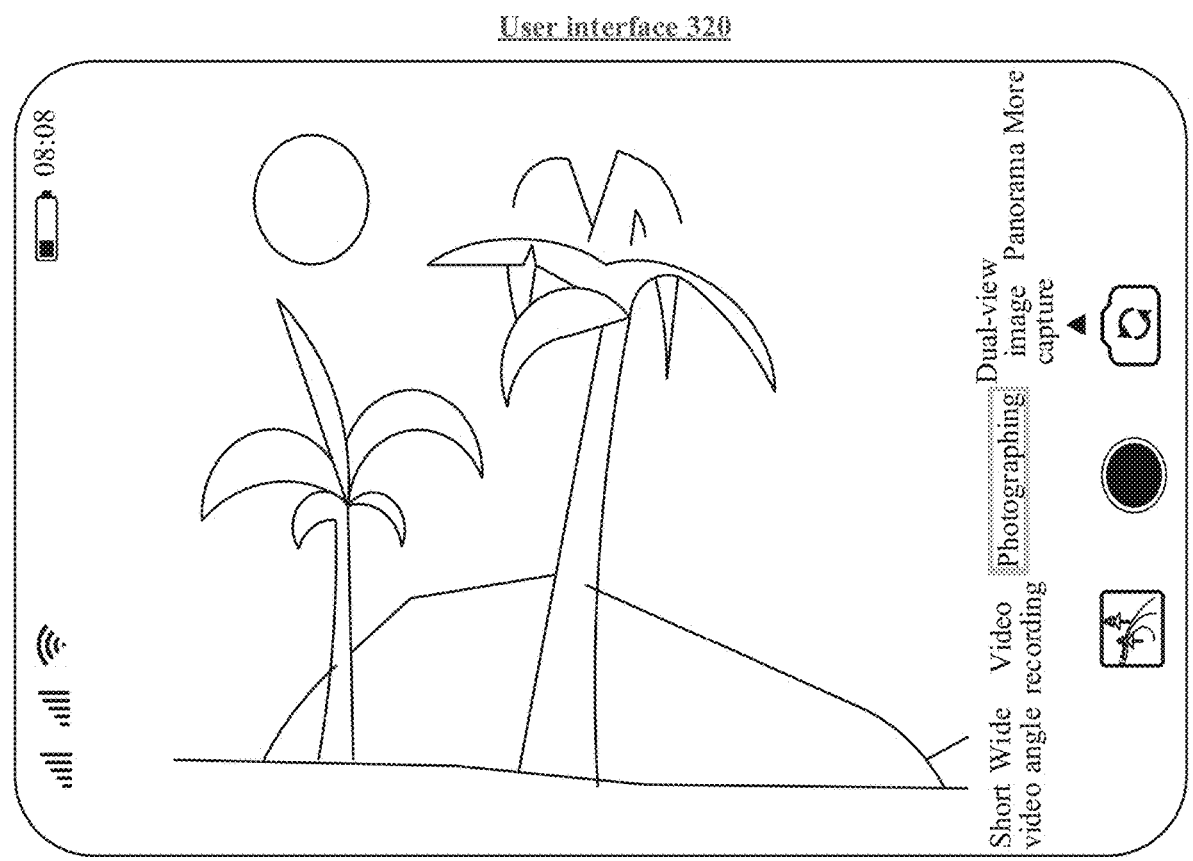

FIG. 7D to FIG. 7F exemplarily show a series of user interfaces displayed by the electronic device switching from front-rear image capture to rear-facing image capture.

As shown in FIG. 7D, a user interface 320 is similar to the user interface shown in FIG. 5H, so details are not described herein.

The electronic device may detect an air gesture inputted by a user in the user interface 320 shown in FIG. 7D, such as an air gesture of "moving a palm from left to right" that is inputted by the user when facing a display screen. In response to the operation, the electronic device switches an image capture mode from multi-lens image capture to single-lens image capture, and specifically switches front-rear image capture to rear-facing image capture shown in FIG. 7E.

FIG. 7E exemplarily shows a user interface displayed by the electronic device when switching from front-rear image capture to rear-facing image capture.

As shown in FIG. 7E, an image capture mode option 324 in a user interface 320) changes from multi-lens image capture 324E in FIG. 7D to photographing 324D to be selected. In addition, a display form of an image 321A and an image 321C displayed in a preview box 321 shown in FIG. 6B changes, which specifically includes that: the image 321C and the image 321A change from being originally displayed half on left and right sides of the preview box 321 shown in FIG. 6A to that: according to the air gesture of "moving the palm from left to right" inputted by the user, the image 321A on the right side of the preview box 321 correspondingly moves from left to right and gradually narrows a display area thereof until the image 321C stops being displayed on the right side of the preview box 321, while the image 321C correspondingly moves from left to right and gradually enlarges a display area thereof until the image 321C is finally displayed in an entire region of the preview box 321.

FIG. 7F exemplarily shows a user interface displayed by the electronic device after switching from front-rear image capture to rear-facing image capture.

As shown in FIG. 7F, the image 321C captured by a rear-facing camera is displayed in the preview box in the user interface 320.

Based on a single-lens image capture scene described in FIG. 7F, user interfaces for switching a camera in a single-lens image capture mode on the electronic device are introduced below.

Figure 8A:
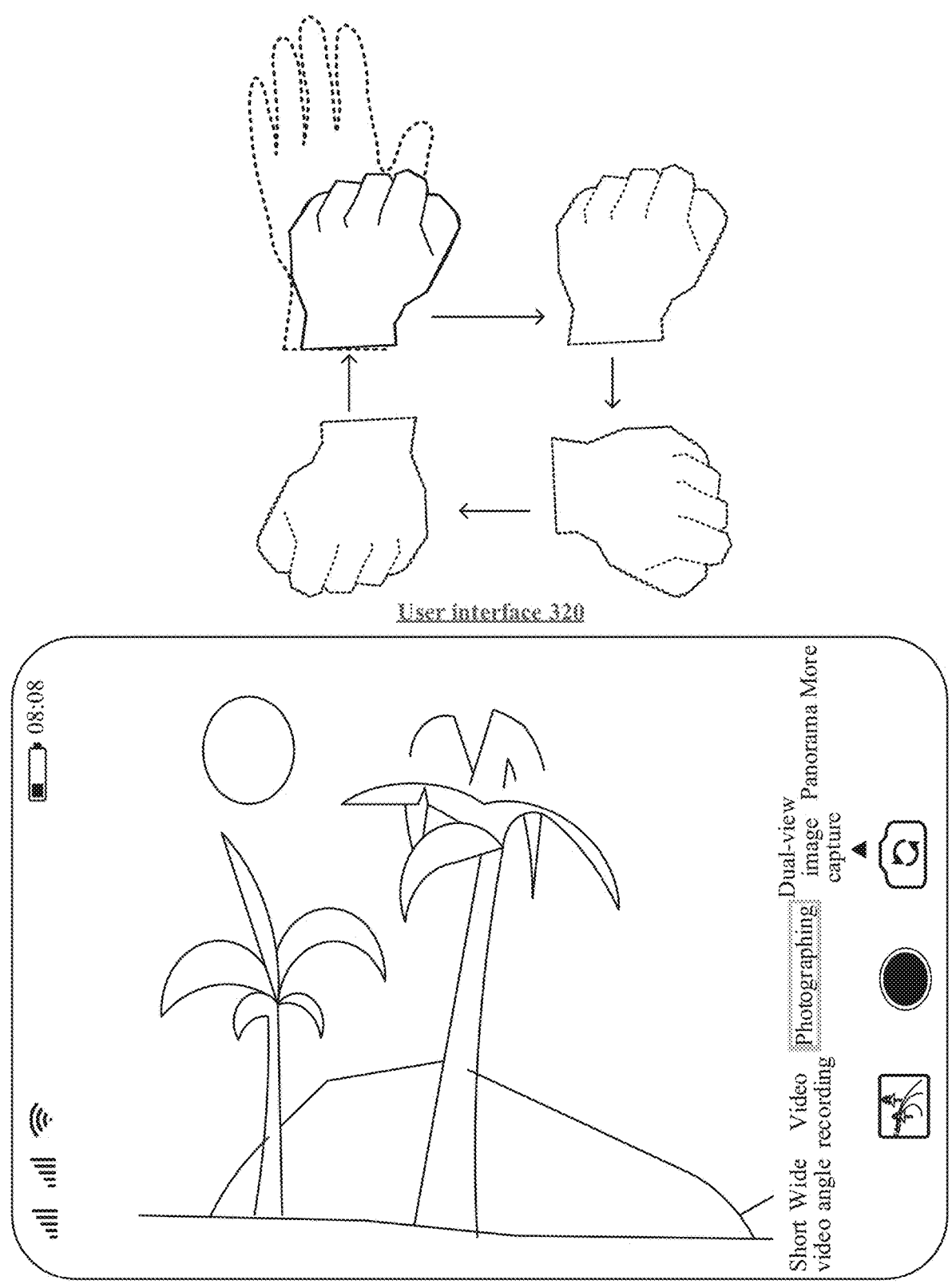
FIG. 8A and FIG. 8B are schematic diagrams of another group of interfaces according to an embodiment of this application.
Figure 8B:
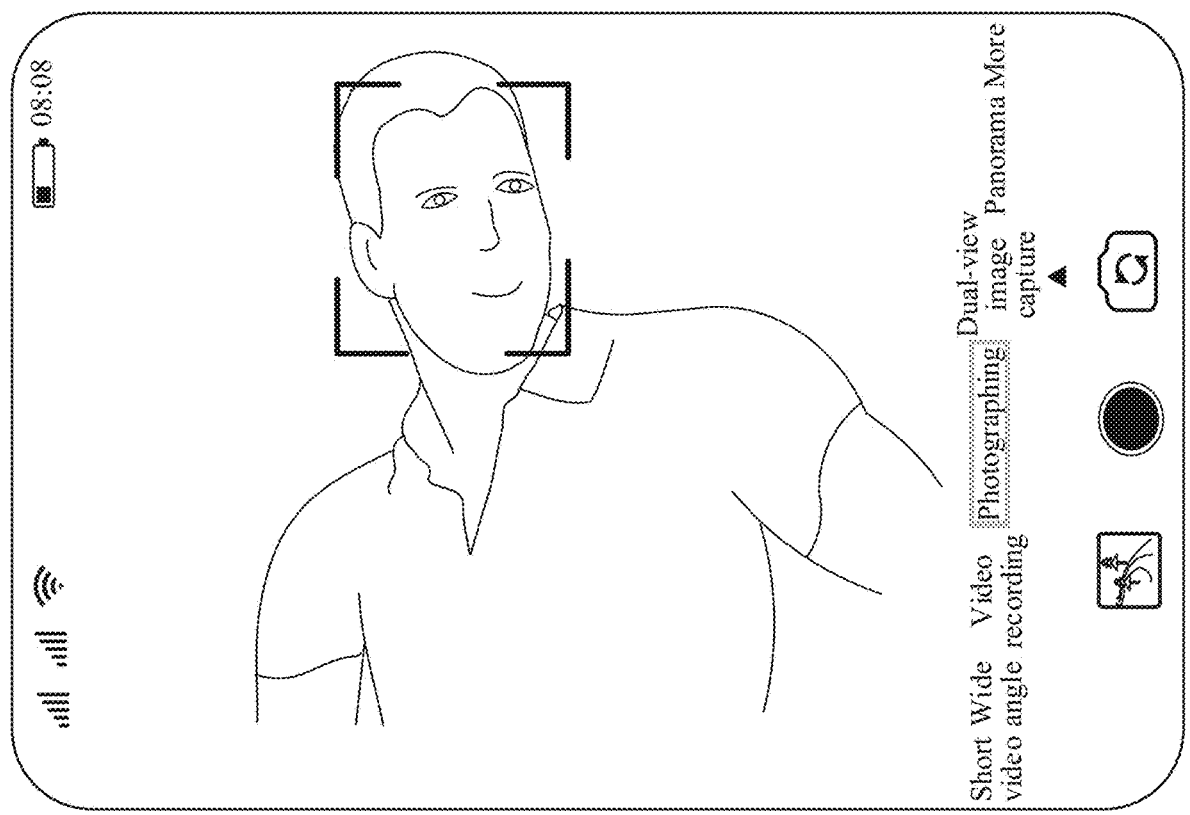

FIG. 8A and FIG. 8B exemplarily show a series of user interfaces displayed by an electronic device switching from rear-facing image capture to front-facing image capture.

As shown in FIG. 8A, a user interface 320 is similar to the user interface shown in FIG. 7F, so details are not described herein.

The electronic device may detect an air gesture inputted by a user in the user interface 320) shown in FIG. 8A, such as a consecutive air gesture of "stretching out a palm, then fisting, and circling around a wrist" that is inputted by the user when facing a display screen. In response to the operation, the electronic device switches rear-facing image capture to front-facing image capture, and the electronic device is still in a single-lens image capture mode and switches only a working camera in the single-lens mode, so that an image in a preview box 321 is switched from an image 321C shown in FIG. 8A to an image 321A shown in FIG. 8B.

As shown in FIG. 8B, a user interface 320 is the same as the user interface shown in FIG. 7C, so details are not described herein.

It is worth noting that, when the electronic device detects the foregoing consecutive air gesture of "stretching out the palm, then fisting, and circling around the wrist" in the single-lens image capture mode, for example, specifically in a rear-facing image capture mode, the electronic device may switch a rear-facing camera to a front-facing camera by default. Alternatively, when the electronic device has a plurality of rear-facing cameras, the electronic device may switch rear-facing image capture to another rear-facing camera to perform image capture. Similarly, when the electronic device detects the foregoing consecutive air gesture of "stretching out the palm, then fisting, and circling around the wrist" specifically in a front-facing image capture mode, the electronic device may switch a front-facing camera to a rear-facing camera by default. When the electronic device has a plurality of rear-facing cameras, the electronic device may switch the front-facing camera to a rear-facing main camera by default to perform image capture. This is not limited in this embodiment of this application.

In this embodiment of this application. "stretching out the palm, then fisting, and circling around the wrist" shown in FIG. 8A may be referred to as a fourth air gesture.

Based on a multi-lens image capture scene described in FIG. 5H, user interfaces for switching a working camera in a multi-lens image capture mode on the electronic device are introduced below.

It is worth noting that, when a quantity of front-facing cameras or rear-facing cameras of the electronic device is greater than or equal to two, the working camera can be switched in the multi-lens image capture mode. The following UI embodiments of this application use an example in which rear-facing cameras of the electronic device include two cameras, and specifically include: an ordinary camera and a wide-angle camera. The ordinary camera is a concept relative to the wide-angle camera, and has no other specific meaning. All images 321C captured by the rear-facing cameras in the foregoing embodiments are images captured by ordinary cameras.

In this embodiment of this application, the wide-angle camera has a larger viewfinder range (also referred to as a field of view (FOV)) than the ordinary camera. Therefore, when the electronic device simultaneously uses other rear-facing cameras such as the ordinary camera and the wide-angle camera to perform image capture, a same image displayed in the preview box has different viewfinder ranges.

Figure 9A:
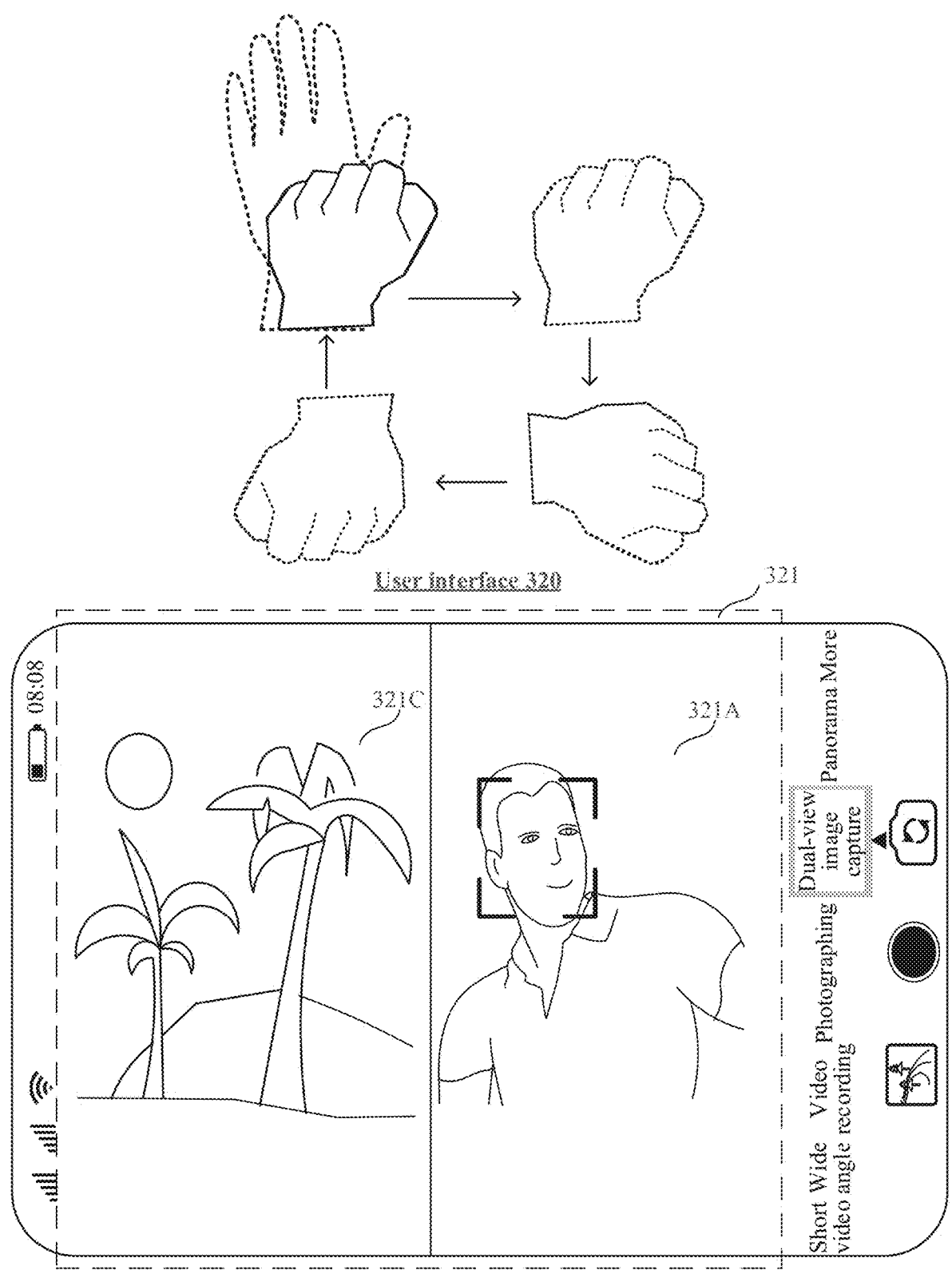
FIG. 9A and FIG. 9B are schematic diagrams of another group of interfaces according to an embodiment of this application.
Figure 9B:
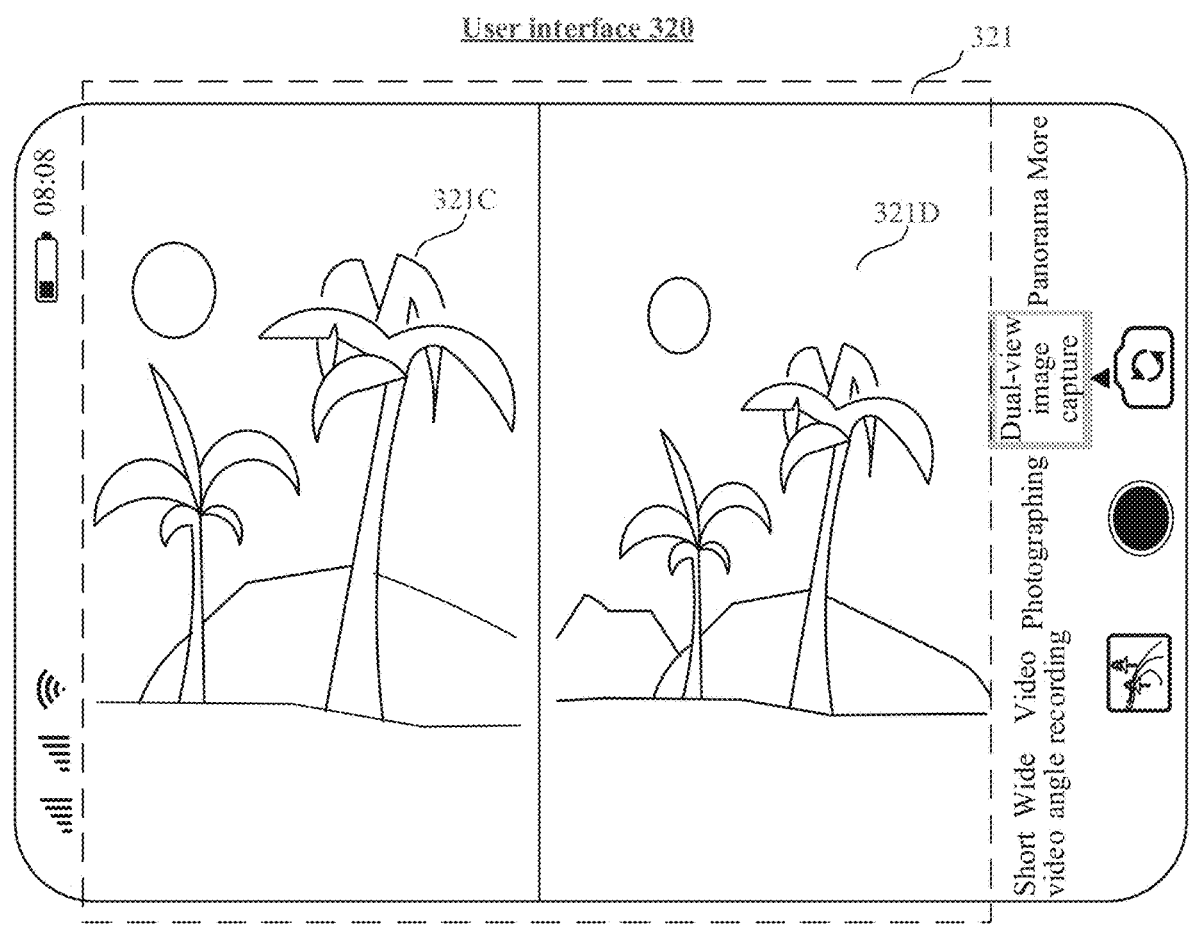

FIG. 9A and FIG. 9B exemplarily show a series of user interfaces displayed by an electronic device switching from front-rear image capture to rear-rear image capture.

As shown in FIG. 9A, a user interface 320 is similar to the user interface shown in FIG. 5H, so details are not described herein.

The electronic device may detect an air gesture inputted by a user in the user interface 320 shown in FIG. 9A, such as a consecutive air gesture of "stretching out a palm, then fisting, and circling around a wrist" that is inputted by the user when facing a display screen. In response to the operation, the electronic device switches front-rear image capture to rear-rear image capture or front-rear image capture, where original "front-rear" refers to a front-facing camera and an ordinary camera in rear-facing cameras respectively, and "rear-rear" after switching refers to the ordinary camera and a wide-angle camera in the rear-facing cameras respectively, or "front-rear" after switching refers to the front-facing camera and the wide-angle camera in the rear-facing cameras. That is, the electronic device may switch a working camera corresponding to an image on a right side of a preview box 321 before switching to next camera, or may also switch a working camera corresponding to an image on a left side of the preview box 321 to next camera. This is not limited in this embodiment of this application. Although the electronic device is still in the multi-lens image capture mode, the working camera in the multi-lens mode has changed, so that a user interface shown in FIG. 9B is displayed by the electronic device.

As shown in FIG. 9B, images displayed in a preview box 321 in the user interface 320 are switched from images 321C and 321A shown in FIG. 9A to images 321C and 321D. The image 321C is an image captured by the ordinary camera in the rear-facing cameras, and the image 321D is an image captured by the wide-angle camera in the rear-facing cameras. It can be seen that the image 321D has a larger viewfinder range than the image 321C.

In this embodiment of this application. "stretching out the palm, then fisting, and circling around the wrist" shown in FIG. 9A may be referred to as a fourth air gesture. The image 321C shown in FIG. 9B may also be referred to as a third image, and a camera configured to obtain the third image may be referred to as a fourth camera.

It may be understood that FIG. 9A and FIG. 9B show only an example of switching the working camera in the multi-lens image capture mode. When the front-facing camera or the rear-facing camera of the electronic device also includes a more quantity of other cameras, the electronic device may also switch the working camera in the multi-lens image capture mode to another camera according to the air gesture for switching the working camera. This is not described in this embodiment of this application.

Based on a multi-lens image capture scene described in FIG. 5H, user interfaces for photographing and picture saving on the electronic device are introduced below.

Figure 10A:
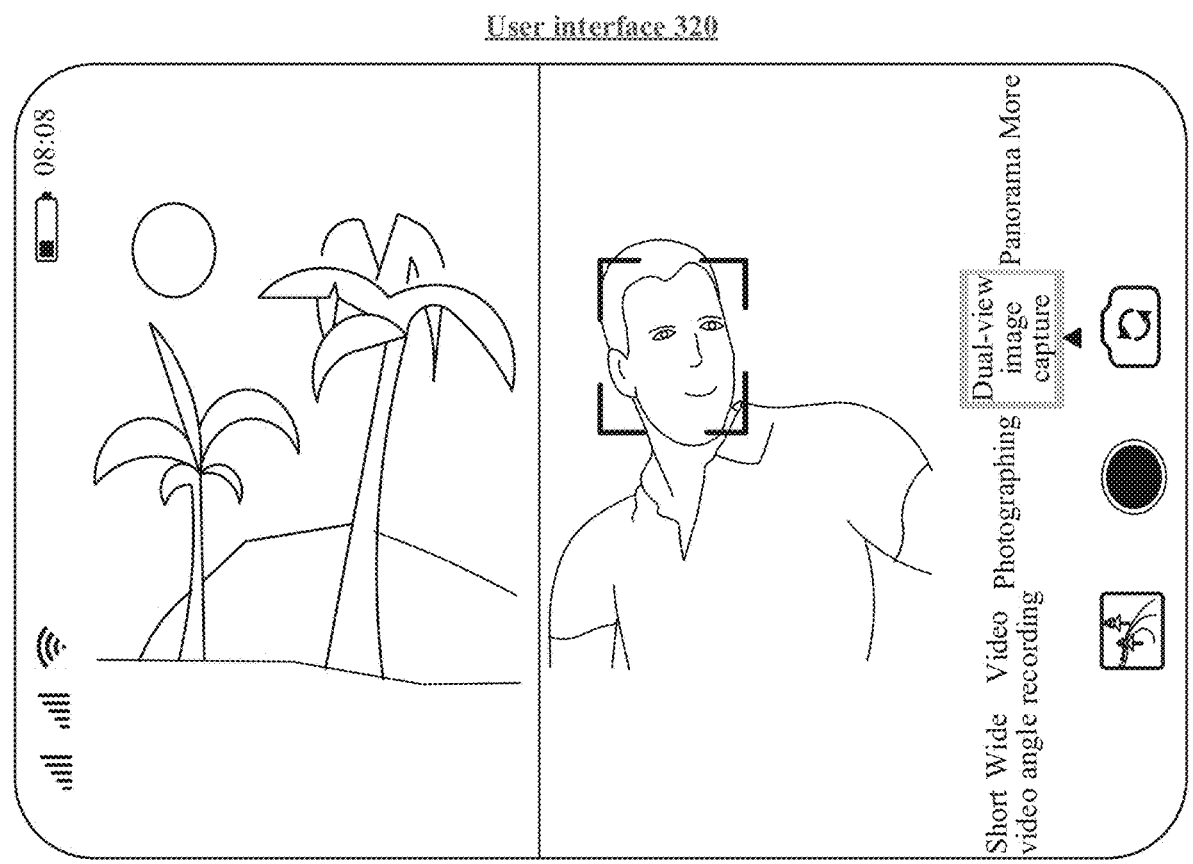
FIG. 10A to FIG. 10C are schematic diagrams of another group of interfaces according to an embodiment of this application.
Figure 10B:
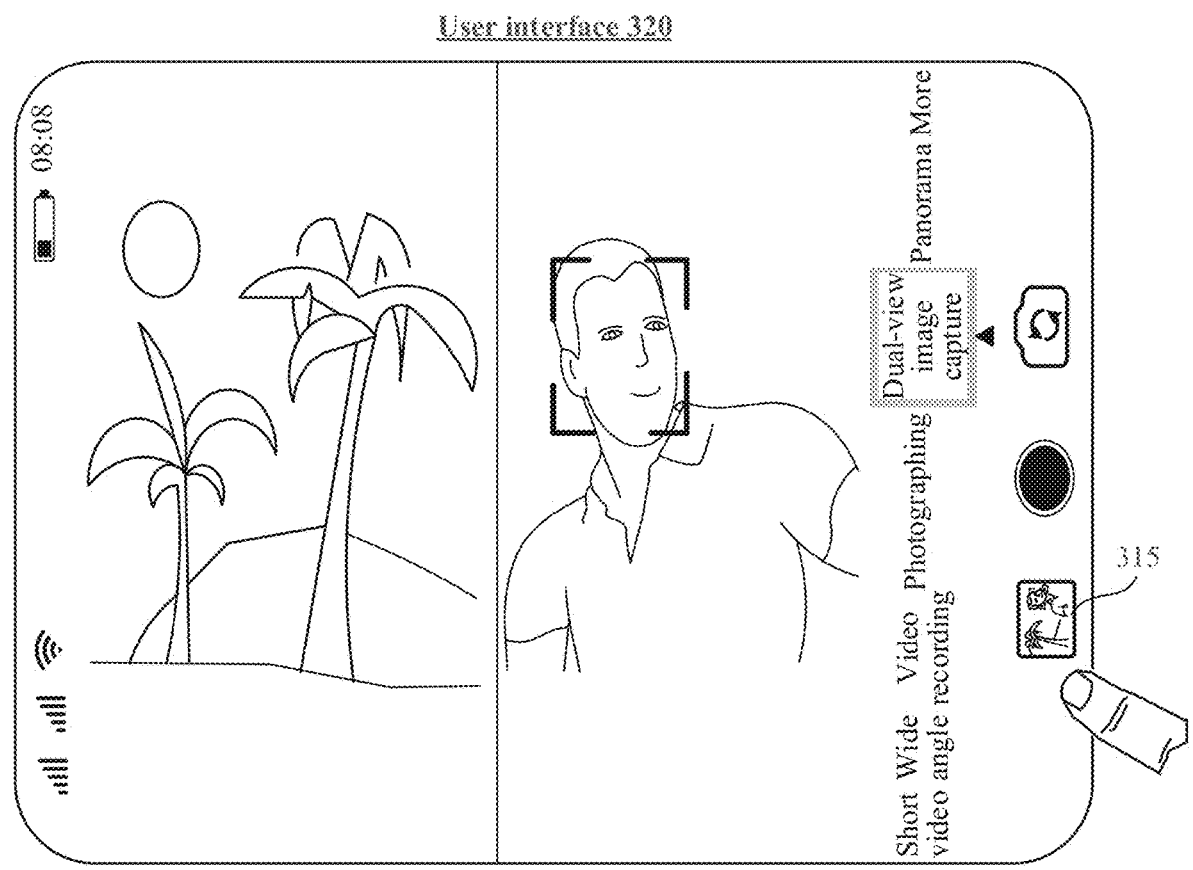
Figure 10C:
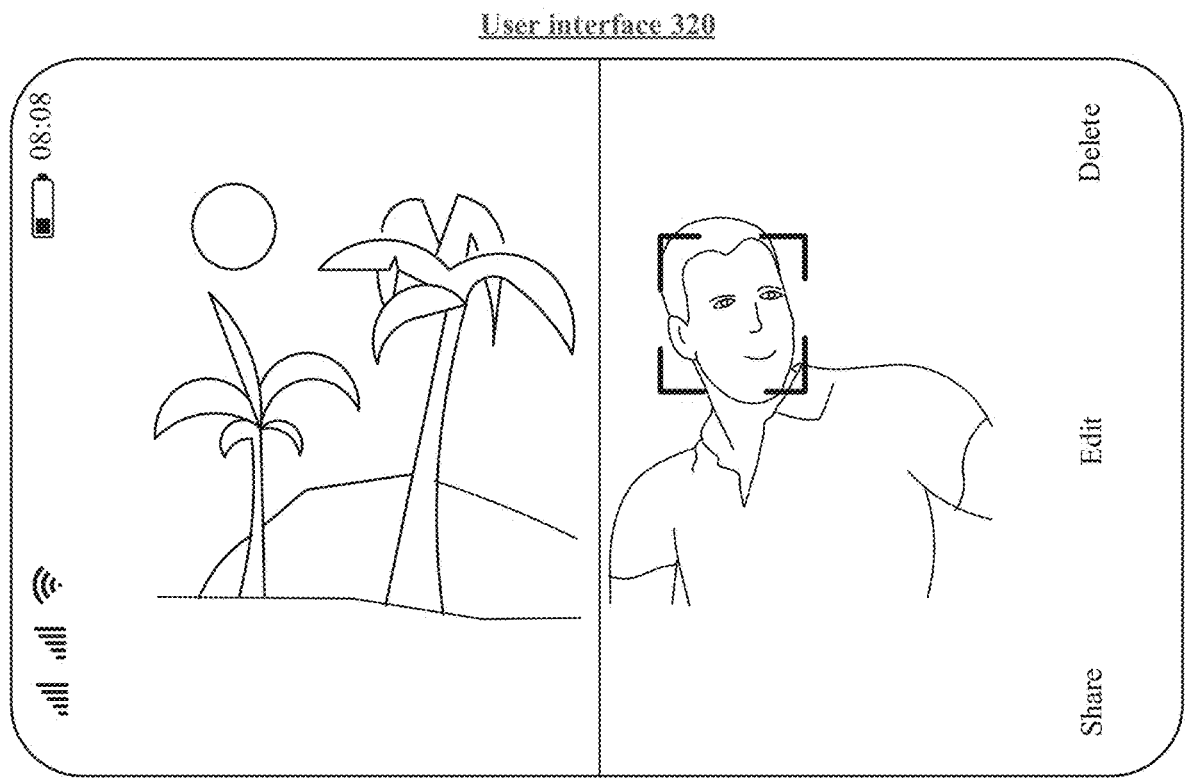

FIG. 10A to FIG. 10C exemplarily show a series of user interfaces displayed by an electronic device implementing photographing and picture saving.

As shown in FIG. 10A, a user interface 320 is similar to the user interface 320) shown in FIG. 5H, so details are not described herein.

The electronic device may detect an air gesture inputted by a user in the user interface shown in FIG. 10A, such as a consecutive air gesture of "stretching out a first and then moving in a rearward direction (facing a display screen)". The electronic device may save images currently displayed in a preview box, namely, an image 321A and an image 321C as a picture file, and display a thumbnail of the picture file on a gallery shortcut control 325. For details, refer to FIG. 10B.

As shown in FIG. 10B, the thumbnail on the gallery shortcut control 325 in a user interface 320 are the thumbnail of the picture obtained by photographing. The electronic device may detect an operation acted by the user on the gallery shortcut control 325 in the user interface shown in FIG. 10B. In response to the operation, the electronic device may open the picture file and display a user interface shown in FIG. 10C.

As shown in FIG. 10C, a recently saved image is displayed in a user interface 320, and the image simultaneously displays the image 321A and the image 321C.

Figure 11:
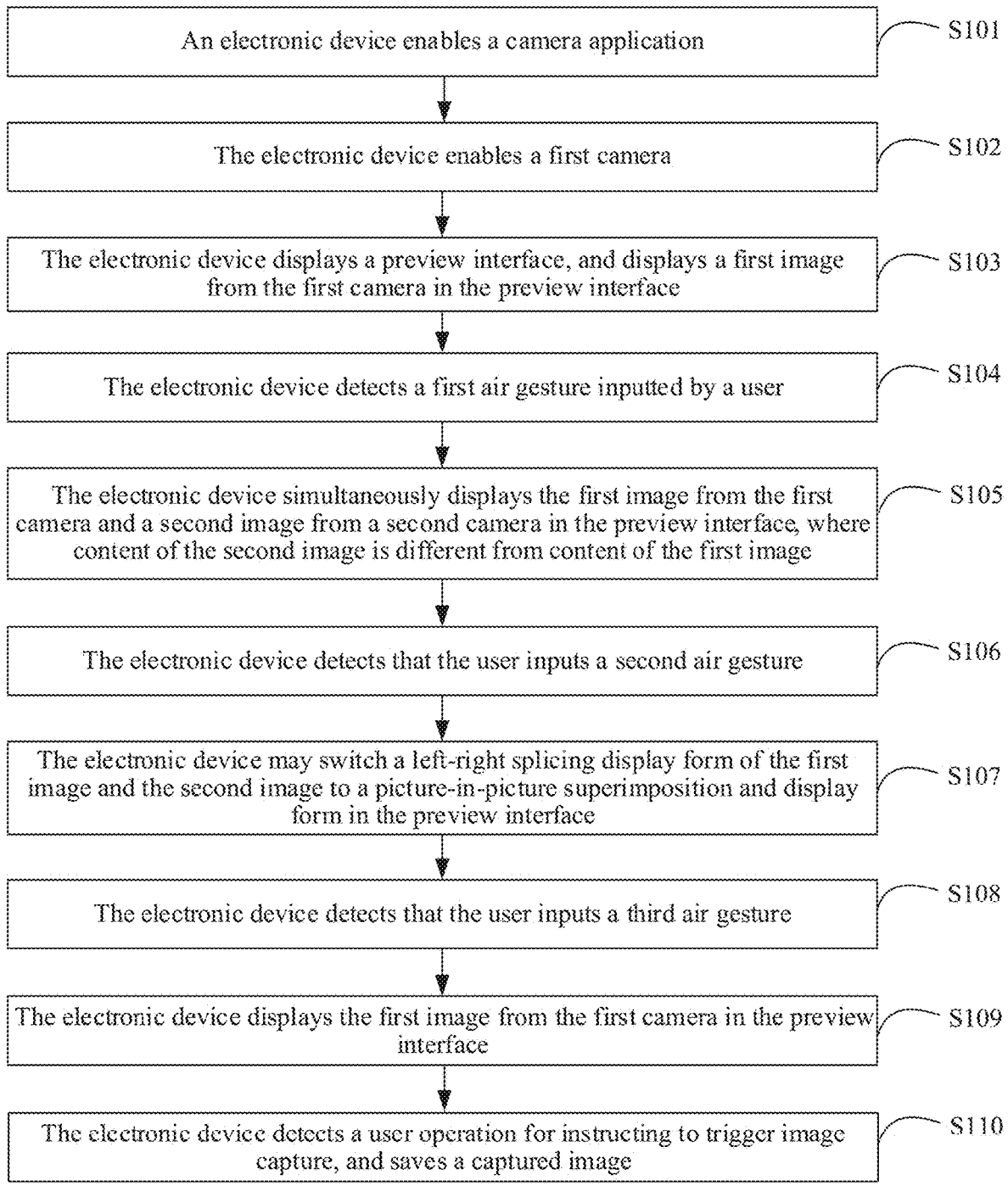
FIG. 11 is a flowchart of a method according to an embodiment of this application.

Based on the electronic device and the UI embodiments introduced in the foregoing content, the image capture method provided in this application is introduced in the following embodiments. As shown in FIG. 11, the method may include the following steps.

Stage 1 (S101 to S103): Open a photographing preview interface.

S101: An electronic device enables a camera application.

Exemplarily, the electronic device may detect a touch operation (such as a click operation on an icon 311) acted on a camera icon 311 shown in FIG. 3A, and enables the camera application in response to the operation.

S102: The electronic device enables a first camera.

Specifically, the first camera may be a front-facing camera, or may also be a rear-facing camera. Specifically, for example, in a front-facing image capture scene, the first camera is the front-facing camera, and is configured to capture a scenery facing a display screen; and in a rear-facing image capture scene, the first camera is the rear-facing camera, and is configured to capture a scenery opposite to a display screen.

S103: The electronic device displays a preview interface, and displays a first image from the first camera in the preview interface. The first image may be acquired by the first camera in real time, or may be cropped from an image acquired by the first camera.

As shown in FIG. 3B, a preview interface 320 includes a preview box 321, a flashlight control 322, a setting control 323, an image capture mode option 324, a gallery shortcut control 325, a shutter control 326, a camera switching control 327, and a plurality of other controls. For functions of these controls, reference may be made to the descriptions in the foregoing UI embodiments, and details are not described herein again.

By using the preview interface shown in FIG. 3B, the first image displayed in the preview box 321 may be from the first camera of the electronic device, for example, may be specifically an image 321A acquired by the front-facing camera of the electronic device.

Stage 2 (S104 to S105): Switch a single-lens image capture mode to a multi-lens image capture mode.

S104: The electronic device detects a first air gesture inputted by a user.

In some embodiments, the electronic device may acquire an image of the user according to a camera, and when the image of the user includes a hand image of the user, a processor of the electronic device may determine, according to a plurality of consecutive hand images acquired by the camera, that the user has inputted the first air gesture. The foregoing first air gesture may be the air gesture of the "palm", the air gesture of the "fist", the air gesture of "moving the palm from right to left", the air gesture of "moving the palm from left to right", or the like described in the foregoing embodiments.

Specifically, the camera used by the electronic device to determine the first air gesture inputted by the user may be the foregoing first camera, or may also be an independent low-power-consumption camera. The independent low-power-consumption camera may also be referred to as a third camera.

When the electronic device enables the low-power-consumption camera to work to recognize the air gesture, specifically, a frame rate of the low-power-consumption camera is lower than a frame rate of an ordinary camera that works in a non-low-power-consumption mode, and an outputted image is in a format of black and white. Generally, the ordinary camera may output 30 frames of images, 60 frames of images, 90 frames of images, and 240 frames of images in 1 second. However, the low-power-consumption camera may output, for example, 2.5 frames of images in 1 second, and when the camera captures a first image representing a same air gesture, the low-power-consumption camera may switch to output 10 frames of images in 1 second, so as to accurately recognize an operation instruction corresponding to the air gesture through a plurality of consecutive images. In addition, the low-power-consumption camera reduces power consumption compared with the ordinary camera when working in the low-power-consumption mode. The ordinary camera herein may be, for example, the first camera described above, and "ordinary" is relative to "low-power-consumption", and has no other meaning.

When the electronic device enables the first camera to work to recognize the air gesture, if the electronic device is in the rear-facing image capture scene in this case, for example, performs image capture by using a rear-facing ordinary camera or a rear-facing wide-angle camera, the first camera configured to acquire the hand image of the user is a front-facing ordinary camera, and the front-facing ordinary camera works in a low-power-consumption mode, where a working principle of which the front-facing camera works in the low-power-consumption mode is similar to a working principle of the foregoing low-power-consumption camera, and details are not described herein again; and if the electronic device is in the front-facing image capture scene, for example, performs image capture by using the front-facing ordinary camera, the first camera configured to acquire the hand image of the user is the front-facing ordinary camera, the front-facing ordinary camera works in the low-power-consumption mode, the first camera may acquire a scenery facing the display screen and may also acquire the hand image inputted by the user, and details are not described herein again.

It may be understood that the foregoing camera configured to acquire the image corresponding to the gesture of the user may start working by default when the electronic device enables the application, or start working by default when the first image acquired by the first camera is displayed in a first preview box, or start working after receiving an operation inputted by the user, for example, enabling an "air gesture recognition function" in settings, and may continue to work when the foregoing camera starts working, for example, continuously acquire images or periodically work, that is, start to continuously acquire images at regular intervals, a working time of the foregoing camera is not limited in this embodiment of this application.

In other embodiments of this application, the electronic device may acquire hand movement data of the user through an optical proximity sensor 180G emitting, for example, infrared rays, or may also acquire the hand movement data of the user through input devices such as gloves worn by the user. The processor of the electronic device may determine, according to the hand data, that the user has inputted the first air gesture. The foregoing first air gesture may be the air gesture of the "palm", the air gesture of the "fist", the air gesture of "moving the palm from right to left", the air gesture of "moving the palm from left to right", or the like described in the foregoing embodiments.

S105: The electronic device may display the first image from the first camera and a second image from a second camera in the preview interface, where content of the second image is different from content of the first image.

The foregoing second camera may be a front-facing camera, or may be a rear-facing camera. Details are as follows:

In step S103, when the first image acquired by the first camera is specifically a scenery that faces the display screen of the electronic device and that is acquired by a front-facing ordinary camera, the second image displayed in the preview interface in this case is an image acquired by another camera other than the front-facing ordinary camera, for example, may be a scenery acquired by any one or more cameras in a front-facing wide-angle camera, a rear-facing ordinary camera, a rear-facing wide-angle camera, or the like.

In step S103, when the first image acquired by the first camera is a scenery that is opposite to the display screen of the electronic device and that is acquired by a rear-facing ordinary camera, the second image displayed in the preview interface in this case is an image acquired by another camera other than the rear-facing ordinary camera, for example, may be a scenery acquired by any one or more cameras in the rear-facing ordinary camera, the front-facing wide-angle camera, the rear-facing wide-angle camera, or the like.

That is, regardless of whether the image captured by the front-facing ordinary camera or the image captured by the rear-facing ordinary camera is displayed in the preview interface of the electronic device in step S103, when the electronic device detects the first air gesture inputted by the user, the electronic device displays images simultaneously captured by a plurality of cameras in the preview interface.

It may be understood that the foregoing ordinary camera is relative to the low-power-consumption camera or the wide-angle camera or another camera. In other implementations of this application, the ordinary camera may also be referred to as a main camera, and the name is not limited in this application.

As shown in FIG. 4B and FIG. 4C, after the user inputs the first air gesture and the first air gesture is a "palm", the electronic device may switch front-facing image capture to front-rear image capture, and also switch an original image acquired by the front-facing ordinary camera to images acquired by the front-facing ordinary camera and the rear-facing ordinary camera to be displayed in the preview box, that is, the first image acquired by the first camera is switched to an image composited by the first image acquired by the first camera and the second image acquired by the second camera for display. A display form of the first image and the second image may be a left-right or up-down splicing manner. Moreover, in a process of switching images, switching may be directly performed, or a default switching effect may be displayed, for example, the first image gradually moves toward one side (a lower side or a left side) of the preview box and gradually narrows a display area thereof, and the second image gradually appears on another side (an upper side or a right side) of the preview box and gradually increases a display area thereof. For a specific implementation, reference may be made to the foregoing UI embodiment in FIG. 4B and FIG. 4C, and details are not described herein again.

As shown in FIG. 4D and FIG. 4E, after the user inputs the first air gesture and the first air gesture is a "fist", the electronic device may switch front-facing image capture to front-rear image capture, and also switch an original image acquired by the front-facing ordinary camera to images acquired by the front-facing ordinary camera and the rear-facing ordinary camera to be displayed in the preview box, that is, the first image acquired by the first camera is switched to an image composited by the first image acquired by the first camera and the second image acquired by the second camera for display. A display form of the first image and the second image may be a picture-in-picture superimposition manner. Moreover, in a process of switching images, switching may be directly performed, or a default switching effect may be displayed, for example, the first image gradually moves to an upper left corner of the preview box and gradually narrows a display area thereof, the second image gradually appears in the preview box and gradually increases a display area thereof, and the first image is superimposed and displayed in the second image. For a specific implementation, reference may be made to the foregoing UI embodiment in FIG. 4D and FIG. 4E, and details are not described herein again.

As shown in FIG. 5B to FIG. 5E, after the user inputs the first air gesture and the first air gesture is a consecutive air gesture of "moving a palm from right to left", the electronic device may switch front-facing image capture to front-rear image capture, and also switch an original image acquired by the front-facing ordinary camera to images acquired by the front-facing ordinary camera and the rear-facing ordinary camera to be displayed in the preview box, that is, the first image acquired by the first camera is switched to an image composited by the first image acquired by the first camera and the second image acquired by the second camera for display. A display form of the first image and the second image may be a left-right or up-down splicing manner. Moreover, in a process of switching images, a corresponding switching effect may be displayed according to a movement direction of the "palm" in the first air gesture inputted by the user. For example, according to the air gesture from right to left inputted by the user, the first image correspondingly moves from right to left and gradually reduces a display area thereof, and is finally displayed on a left side of the preview box 321; and the second image correspondingly moves from right to left and gradually increases a display area thereof, and is finally displayed on a right side of the preview box 321. For a specific implementation, reference may be made to the foregoing UI embodiment in FIG. 5B to FIG. 5E, and details are not described herein again.

As shown in FIG. 5F to FIG. 5H, after the user inputs the first air gesture and the first air gesture is a consecutive air gesture of "moving a palm from left to right", the electronic device may switch front-facing image capture to front-rear image capture, and also switch an original image acquired by the front-facing ordinary camera to images acquired by the front-facing ordinary camera and the rear-facing ordinary camera to be displayed in the preview box, that is, the first image acquired by the first camera is switched to an image composited by the first image acquired by the first camera and the second image acquired by the second camera for display. A display form of the first image and the second image may be a left-right or up-down splicing manner. Moreover, in a process of switching images, a corresponding switching effect may be displayed according to a movement direction of the "palm" in the first air gesture inputted by the user. For example, according to the air gesture from left to right inputted by the user, the first image correspondingly moves from left to right and gradually reduces a display area thereof, and is finally displayed on a right side of the preview box 321, while the second image correspondingly moves from left to right and gradually increases a display area thereof, and is finally displayed on a left side of the preview box 321. For a specific implementation, reference may be made to the foregoing UI embodiment in FIG. 5F to FIG. 5H, and details are not described herein again.

Stage 3 (S106 to S107): Switch a display form of a plurality of images in the multi-lens image capture mode.

S106: The electronic device detects that the user inputs a second air gesture.

For a method in which the electronic device detects the second air gesture inputted by the user, reference may be specifically made to the method for detecting the first air gesture described above, and details are not described herein again. Next, only detection by using a camera is used as an example for illustration. Specifically, the electronic device may detect, according to an image of the user acquired by the camera, that the user inputs the second air gesture. Specifically, the electronic device may acquire a hand image of the user by using a camera. When the image of the user includes an image of a palm, the electronic device may determine, according to a plurality of consecutive hand images acquired by the camera, that the user inputs the second air gesture. The foregoing second air gesture may be the consecutive air gesture of "stretching out the palm and then fisting" described in the foregoing UI embodiments.

S107: The electronic device may switch a left-right splicing display form of the first image and the second image to a picture-in-picture superimposition and display form in the preview interface.

As shown in FIG. 6A to FIG. 6C, when the electronic device is in the multi-lens image capture mode and displays the first image from the first camera and the second image from the second camera in the preview interface, in response to the detected second air gesture, the electronic device may switch the original left-right splicing display form of the first image and the second image to the picture-in-picture superimposition form in the preview interface. In a process of switching a display form of images, a switching effect may be that: the first image and the second image change from being originally displayed half on left and right sides of the preview box 321 shown in FIG. 6A to that: a display area of the first image captured by a front-facing camera in the preview box 321 is gradually narrowed and the first image moves toward an upper left corner of the preview box 321, while a display area of the second image captured by the rear-facing ordinary camera in the preview box 321 is gradually enlarged and the second image moves toward the middle of the preview box 321 until the second image is finally displayed in an entire region of the preview box 321. It is worth noting that, in a process of switching the display form of the first image and the second image, the first image is superimposed and displayed in a partial region of the second image. For a specific implementation, reference may be made to the foregoing UI embodiment in FIG. 6A to FIG. 6C, and details are not described herein again.

Stage 4 (S108 to S109): Switch the multi-lens image capture mode to the single-lens image capture mode.

S108: The electronic device detects that the user inputs a third air gesture.

For a method in which the electronic device detects the third air gesture inputted by the user, reference may be specifically made to the method for detecting the first air gesture described above, and details are not described herein again. Next, only detection by using a camera is used as an example for illustration. Specifically, the electronic device may detect, according to an image of the user acquired by the camera, that the user inputs the third air gesture. Specifically, the electronic device may acquire a hand image of the user by using a camera. When the image of the user includes an image of a palm, the electronic device may determine, according to a plurality of consecutive hand images acquired by the first camera, that the user shows the third air gesture. The foregoing third air gesture may be the air gesture of "moving the palm from right to left", the air gesture of "moving the palm from left to right", or the like described in the foregoing embodiments.

S109: The electronic device may display the first image from the first camera in the preview interface.

Specifically, the electronic device may switch the original image composited by the first image acquired by the first camera and the second image acquired by the second camera simultaneously displayed in the preview interface to the first image from the first camera.

As shown in FIG. 7A to FIG. 7C, after the user inputs the third air gesture and the third air gesture is a consecutive air gesture of "moving a palm from right to left", the electronic device may switch front-rear image capture to front-facing image capture, and also switch the original images acquired by the front-facing ordinary camera and the rear-fronting ordinary camera to the image acquired by the front-facing ordinary camera to be displayed in the preview box, that is, the image composited by the first image acquired by the first camera and the second image acquired by the second camera is switched to the first image acquired by the first camera for display. Moreover, in a process of switching images, a corresponding switching effect may be displayed according to a movement direction of the "palm" in the third air gesture inputted by the user. For example, according to the air gesture from right to left inputted by the user, the second image correspondingly moves from right to left and gradually reduces a display area thereof, and finally stops being displayed on a left side of the preview box 321, while the first image correspondingly moves from right to left and gradually increases a display area thereof, and is finally displayed in an entire region of the preview box 321. For a specific implementation, reference may be made to the foregoing UI embodiment in FIG. 7A to FIG. 7C, and details are not described herein again.

As shown in FIG. 7D to FIG. 7F, after the user inputs the third air gesture and the third air gesture is a consecutive air gesture of "moving a palm from left to right", the electronic device may switch front-rear image capture to front-facing image capture, and also switch the original images acquired by the front-facing ordinary camera and the rear-fronting ordinary camera to the image acquired by the front-facing ordinary camera to be displayed in the preview box, that is, the image composited by the first image acquired by the first camera and the second image acquired by the second camera is switched to the first image acquired by the first camera for display. Moreover, in a process of switching images, a corresponding switching effect may be displayed according to a movement direction of the "palm" in the third air gesture inputted by the user. For example, according to the air gesture from left to right inputted by the user, the first image correspondingly moves from left to right and gradually reduces a display area thereof, and finally stops being displayed on a right side of the preview box 321; and the second image correspondingly moves from left to right and gradually increases a display area thereof, and is finally displayed in an entire region of the preview box 321. For a specific implementation, reference may be made to the foregoing UI embodiment in FIG. 7D to FIG. 7F, and details are not described herein again.

Stage 5 (S110): Trigger image capture, and save an image.

S110: The electronic device detects a user operation for instructing to trigger image capture, and saves a captured image.

The foregoing user operation for instructing to trigger image capture may include triggering photographing and video recording, and may specifically include a click operation acted on the shutter control 326 shown in FIG. 3B. Alternatively, the foregoing user operation for instructing to trigger image capture may also be that the electronic device acts on a control set in a selfie stick, for example, presses a photographing control or a video recording control, to trigger the electronic device to photograph and save a picture, or perform video recording and save a video. Alternatively, the foregoing user operation for instructing to trigger image capture may be that the electronic device triggers photographing by detecting that the user inputs the fourth air gesture, triggers starting to perform video recording by detecting a fifth air gesture, and detects the fifth air gesture herein to trigger finishing video recording and save a video.

The foregoing fourth air gesture may be that: the electronic device may detect, according to an image of the user acquired by a camera, that the user inputs the fourth air gesture. Specifically, the electronic device may acquire a hand image of the user by using a camera. When the image of the user includes an image of a fist, the electronic device may determine, according to a plurality of consecutive hand images acquired by the first camera, that the user inputs the fourth air gesture. The foregoing fourth air gesture may be the consecutive air gesture of "stretching out the palm and then moving in a rearward direction (facing the display screen)" described in the foregoing UI embodiments.

As shown in FIG. 10A to FIG. 10C, when the electronic device is in the multi-lens image capture mode and displays the first image from the first camera and the second image in the preview interface, in response to the detected fourth air gesture, the electronic device may save the first image and the second image currently displayed in the preview interface as a picture file. After the electronic device detects that the acted gallery shortcut control 325, the saved recently picture file may be opened, and the picture file simultaneously displays the first image and the second image, and the first image and the second image are in a left-right splicing form. For a specific implementation, reference may be made to the foregoing UI embodiment in FIG. 6A to FIG. 6C, and details are not described herein again.

The foregoing fifth air gesture may be the consecutive air gesture of "stretching out a palm and then moving in a frontward direction (toward the display screen)" described in the foregoing UI embodiments. For a detailed process in which the electronic device detects the fifth air gesture to trigger starting to perform video recording and detects the fifth air gesture again to trigger finishing video recording and save the video, details are not described herein.

In this embodiment of this application, the foregoing operation for triggering starting to perform video recording may be referred to as a first operation, and an operation for finishing video recording may also be referred to as a second operation.

This embodiment of this application does not limit a time when the electronic device detects the user operation for instructing to trigger image capture. For example, after the foregoing stage 2, that is, after the single-lens image capture mode is switched to the multi-lens image capture mode, the electronic device may detect the user operation for instructing to trigger image capture. Alternatively, after the foregoing stage 3, that is, after the display form of the plurality of images in the multi-lens image capture mode is switched, or after the foregoing stage 4, that is, after the multi-lens image capture mode is switched to the single-lens image capture mode, the electronic device may detect the user operation for instructing to trigger image capture. After the foregoing stage 2 and then the foregoing stage 4, that is, after the single-lens image capture mode is switched to the multi-lens image capture mode and then the multi-lens image capture mode is switched to the single-lens image capture mode, the electronic device may detect the user operation for instructing to trigger image capture. After the foregoing stage 4 and then the foregoing stage 2, that is, after the multi-lens image capture mode is switched to the single-lens image capture mode and then the single-lens image capture mode is switched to the multi-lens image capture mode, the electronic device may also detect the user operation for instructing to trigger image capture.

In some other embodiments of this application, the foregoing method further includes: switching a working camera, and specifically includes switching, in a single-lens image capture scene, a working camera to another camera for work, or switching, in a multi-lens image capture scene, any one or more of a plurality of working cameras to any other one or more cameras. A specific implementation is as follows:

The electronic device may detect that the user inputs a sixth air gesture. Specifically, the electronic device may acquire a hand image of the user by using a camera. When the image of the user includes an image of a palm, the electronic device may determine, according to a plurality of consecutive hand images acquired by the camera, that the user inputs the sixth air gesture. The foregoing sixth air gesture may be the consecutive air gesture of "stretching out the palm, then fisting, and circling around a wrist" described in the foregoing UI embodiments.

As shown in FIG. 8A and FIG. 8B, before the electronic device switches the working camera, when the second image from the second camera, that is, an image 321C captured by a rear-facing camera, is displayed in the preview interface, in response to the detected sixth air gesture, the electronic device may switch, in the preview interface, the original second image from the second camera to the first image from the first camera, that is, the image 321A captured by the front-facing camera. For a specific implementation, reference may be made to the foregoing UI embodiment in FIG. 8A and FIG. 8B, and details are not described herein again.

As shown in FIG. 9A and FIG. 9B, before the electronic device switches the working camera, when the image composited by the first image from the first camera and the second image from the second camera is displayed in the preview interface, in response to the detected sixth air gesture, the electronic device may switch, in the preview interface, the original image composited by the first image from the first camera and the second image from the second camera to an image composited by the second image from the second camera and the third image from the third camera. The second image is still an image captured by the rear-facing ordinary camera, while the third image may be an image captured by the rear-facing wide-angle camera. For a specific implementation, reference may be made to the foregoing UI embodiment in FIG. 8A and FIG. 8B, and details are not described herein again.

It may be understood that when the foregoing electronic device is in different image capture scenes, a series of gestures for controlling the electronic device to switch an image capture mode are not limited to the gestures given in the foregoing examples, for example, during switching the working camera through the sixth gesture, the foregoing sixth gesture, that is, the consecutive air gesture of "stretching out the palm, then fisting, and circling around the wrist", may also be replaced with another gesture. For example, a gesture of "stretching out a palm and then flipping the palm" which includes flipping from the palm to the back of the hand or flipping from the back of the hand to the palm is used to control switching of the working camera.

It can be seen that the image capture method provided in this embodiment of this application can enable a user to switch an image capture mode of an electronic device through an air and one-handed air gesture, and specifically includes being able to perform free switching between single-lens image capture and multi-lens image capture, switching one of working cameras in a single-lens image capture mode or a multi-lens image capture mode, and the like. Especially for a scene in which a camera such as a front-facing camera is used to perform image capture, the user generally stretches out his arm or uses a selfie stick to perform image capture. In this case, when the user intends to switch to multi-lens image capture and capture himself and others or himself and a scenery simultaneously to record beautiful moments, the image capture method provided in this embodiment of this application is implemented, so that the user can conveniently switch the image capture mode, so that an image displayed in a preview box changes from an original image captured by a front-facing camera to an image including images simultaneously captured by a front-facing camera and a rear-facing camera. In this way, the user does not need to adjust the image capture mode of the electronic device by repeatedly bringing the electronic device close and touching a screen of the electronic device with a finger.

The implementations of this application may be randomly combined to achieve different technical effects.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

In short, the foregoing descriptions are only embodiments of the technical solutions of the present disclosure, but are not intended to limit the protection scope of the present disclosure. Any modification, equivalent substitution, and improvement made according to the disclosure of the present disclosure shall fall within the protection scope of the present disclosure.

What is claimed is:

1. An image capture method, comprising:
    enabling, by an electronic device, a first camera, wherein the electronic device includes a display screen, the first camera, and a second camera;
    displaying, by the electronic device, a first image from the first camera in a first region of a preview interface of the display screen, wherein the first region is an entire region of the preview interface, and wherein displaying the first image from the first camera in the first region of the preview interface corresponds to a single-lens image capture mode;
    displaying, by the electronic device, first prompt information in the preview interface, wherein the first prompt information indicates one or more gestures for switching between the single-lens image capture mode and a multi-lens image capture mode;
    detecting, by the electronic device, a first gesture of the one or more gestures inputted by a user without being in contact with the display screen;
    enabling, by the electronic device, the second camera in response to the first gesture; and
    dividing, by the electronic device in response to the first gesture, the first region of the preview interface into a second region and a third region, displaying the first image from the first camera in the second region, and displaying a second image from the second camera in the third region, wherein the second region and the third region do not overlap, and wherein displaying the first image from the first camera in the second region and displaying the second image from the second camera in the third region corresponds to the multi-lens image capture mode.

2. The method according to claim 1,
    wherein the first gesture is a gesture moving from a first side to a second side; and wherein in the process of controlling, by the electronic device, a display region corresponding to the first camera in the preview interface to narrow from the first region to the second region, the electronic device controls the second region to move in a direction from the first side to the second side.

3. The method according to claim 1,
wherein the electronic device further includes a third camera; and
wherein the detecting, by the electronic device, the first gesture inputted by the user without being in contact with the display screen comprises:
   detecting, by the electronic device, the first gesture by using the third camera, wherein a frame rate of the third camera is lower than frame rates of the first camera and the second camera, or a quantity of pixels of the third camera is lower than quantities of pixels of the first camera and the second camera, or the third camera outputs an image whose colors are black and white.

4. The method according to claim 1, wherein after the displaying, by the electronic device, the first image from the first camera in the second region, and displaying the second image from the second camera in the third region, the method further comprises:
   detecting, by the electronic device, a first operation:
   displaying, by the electronic device in response to the first operation, an image capture interface, and starting to record a video;
   detecting, by the electronic device, a second operation; and
   finishing, by the electronic device in response to the second operation, recording the video, and generating a video file.

5. The method according to claim 1, wherein after the displaying, by the electronic device, the first image from the first camera in the second region, and displaying the second image from the second camera in the third region, the method further comprises:
   detecting, by the electronic device, a second gesture inputted by the user without being in contact with the display screen; and
   displaying, by the electronic device in response to the second gesture, the first image from the first camera in a fourth region of the preview interface, and displaying the second image from the second camera in a fifth region, wherein the fourth region is located in the fifth region.

6. The method according to claim 1, wherein after the displaying, by the electronic device, the first image from the first camera in the second region, and displaying the second image from the second camera in the third region, the method further comprises:
   detecting, by the electronic device, a third gesture inputted by the user without being in contact with the display screen; and
   stopping, by the electronic device in response to the third gesture, displaying the second image from the second camera, and displaying the first image from the first camera in the first region of the preview interface.

7. The method according to claim 1,
wherein the electronic device further includes a fourth camera; and
wherein after the displaying, by the electronic device, the first image from the first camera in the second region, and displaying the second image from the second camera in the third region, the method further comprises:
   detecting, by the electronic device, a fourth gesture inputted by the user without being in contact with the display screen:
   enabling, by the electronic device, the fourth camera; and
   switching, by the electronic device, the second image from the second camera displayed in the third region to a third image from the fourth camera.

8. The method according to claim 1, wherein before the enabling, by the electronic device, the first camera, the method further comprises:
   displaying, by the electronic device, a fourth image from a fifth camera in the first region of the preview interface; and
   detecting, by the electronic device, a fourth gesture inputted by the user, and stopping, by the electronic device, displaying the fourth image in the first region of the preview interface.

9. An electronic device, comprising:
a display screen;
M cameras, wherein M≥2, and M is a positive integer;
one or more processors; and
one or more memories coupled to the one or more processors, wherein the one or more memories are configured to store computer program code, wherein the computer program code comprises computer instructions, and when the one or more processors execute the computer instructions, the electronic device is enabled to perform steps comprising:
enabling a first camera;
displaying a first image from the first camera in a first region of a preview interface of the display screen, wherein the first region is an entire region of the preview interface, and wherein displaying the first image from the first camera in the first region of the preview interface corresponds to a single-lens image capture mode;
displaying first prompt information in the preview interface, wherein the first prompt information indicates one or more gestures for switching between the single-lens image capture mode and a multi-lens image capture mode;
detecting a first gesture of the one or more gestures inputted by a user without being in contact with the display screen;
enabling a second camera in response to the first gesture; and
dividing, in response to the first gesture, the first region of the preview interface into a second region and a third region, displaying the first image from the first camera in the second region, and displaying a second image from the second camera in the third region, wherein the second region and the third region do not overlap, and wherein displaying the first image from the first camera in the second region and displaying the second image from the second camera in the third region corresponds to the multi-lens image capture mode.

10. The electronic device according to claim 9, wherein the dividing, the first region of the preview interface into a second region and a third region specifically comprises:
   controlling, by the electronic device, a display region corresponding to the first camera in the preview interface to narrow from the first region to the second region, wherein a region other than the second region in the preview interface is the third region.

11. The electronic device according to claim 10, wherein the first gesture is a gesture moving from a first side to a second side; and
wherein in the process of controlling a display region corresponding to the first camera in the preview interface to narrow from the first region to the second region, the electronic device controls the second region to move in a direction from the first side to the second side.

12. The electronic device according to claim 9, wherein the detecting, the first gesture inputted by the user without being in contact with the display screen comprises:
detecting, the first gesture by using a third camera, wherein a frame rate of the third camera is lower than frame rates of the first camera and the second camera, or a quantity of pixels of the third camera is lower than quantities of pixels of the first camera and the second camera, or the third camera outputs an image whose colors are black and white.

13. The electronic device according to claim 9, wherein after the displaying the first image from the first camera in the second region, and displaying the second image from the second camera in the third region, the electronic device is further enabled to perform the following steps:
detecting a first operation;
displaying, in response to the first operation, an image capture interface, and starting to record a video;
detecting a second operation; and
finishing, in response to the second operation, recording the video, and generating a video file.

14. The electronic device according to claim 9, wherein after the displaying the first image from the first camera in the second region, and displaying the second image from the second camera in the third region, the electronic device is further enabled to perform the following steps:
detecting a second gesture inputted by the user without being in contact with the display screen; and
displaying, in response to the second gesture, the first image from the first camera in a fourth region of the preview interface, and displaying the second image from the second camera in a fifth region, wherein the fourth region is located in the fifth region.

15. The electronic device according to claim 9, wherein after the displaying the first image from the first camera in the second region, and displaying the second image from the second camera in the third region, the electronic device is further enabled to perform the following steps:
detecting a third gesture inputted by the user without being in contact with the display screen; and
stopping, in response to the third gesture, displaying the second image from the second camera, and displaying the first image from the first camera in the first region of the preview interface.

16. The electronic device according to claim 9, wherein after the displaying the first image from the first camera in the second region, and displaying the second image from the second camera in the third region, the electronic device is further enabled to perform the following steps:
detecting a fourth gesture inputted by the user without being in contact with the display screen;
enabling a fourth camera; and
switching the second image from the second camera displayed in the third region to a third image from the fourth camera.

17. The electronic device according to claim 9, wherein before the enabling the first camera, the electronic device is further enabled to perform the following steps:
displaying a fourth image from a fifth camera in the first region of the preview interface; and
detecting a fourth gesture inputted by the user, and stopping, by the electronic device, displaying the fourth image in the first region of the preview interface.

18. A non-transitory computer-readable storage medium storing instructions that, when run on an electronic device, enable the electronic device to perform steps comprising:
enabling a first camera;
displaying a first image from the first camera in a first region of a preview interface of a display screen, wherein the first region is an entire region of the preview interface, and wherein displaying the first image from the first camera in the first region of the preview interface corresponds to a single-lens image capture mode;
displaying first prompt information in the preview interface, wherein the first prompt information indicates one or more gestures for switching between the single-lens image capture mode and a multi-lens image capture mode;
detecting a first gesture of the one or more gestures inputted by a user without being in contact with the display screen;
enabling a second camera in response to the first gesture; and
dividing, in response to the first gesture, the first region of the preview interface into a second region and a third region, displaying the first image from the first camera in the second region, and displaying a second image from the second camera in the third region, wherein the second region and the third region do not overlap, and wherein displaying the first image from the first camera in the second region and displaying the second image from the second camera in the third region corresponds to the multi-lens image capture mode.

* * * * *

UNITED STATES PATENT AND TRADEMARK OFFICE
CERTIFICATE OF CORRECTION

PATENT NO. : 12,335,601 B2  
APPLICATION NO. : 18/025726  
DATED : June 17, 2025  
INVENTOR(S) : Yi et al.

Page 1 of 1

It is certified that error appears in the above-identified patent and that said Letters Patent is hereby corrected as shown below:

In the Claims

Claim 4, Column 45, Line 27: "detecting, by the electronic device, a first operation:" should read -- detecting, by the electronic device, a first operation; --.

Claim 7, Column 46, Line 6: "display screen:" should read -- display screen; --.

Signed and Sealed this  
Twenty-second Day of July, 2025

Coke Morgan Stewart  
*Acting Director of the United States Patent and Trademark Office*